US011307678B2

(12) United States Patent
Lee et al.

(10) Patent No.: US 11,307,678 B2
(45) Date of Patent: Apr. 19, 2022

(54) ELECTRONIC PEN, ELECTRONIC DEVICE, AND METHOD OF CONTROLLING THE SAME

(71) Applicant: NEOLAB CONVERGENCE INC., Seoul (KR)

(72) Inventors: Sang Gyu Lee, Seoul (KR); Ji Wan Park, Seoul (KR); Bong Ki Park, Yongin-si (KR); Sung Hoon Ha, Suwon-si (KR); Sang Ho Kim, Seoul (KR); Sang Won Cho, Suwon-si (KR)

(73) Assignee: NEOLAB CONVERGENCE INC., Seoul (KR)

( * ) Notice: Subject to any disclaimer, the term of this patent is extended or adjusted under 35 U.S.C. 154(b) by 0 days.

(21) Appl. No.: 17/286,454

(22) PCT Filed: Oct. 18, 2019

(86) PCT No.: PCT/KR2019/013741
§ 371 (c)(1),
(2) Date: Apr. 17, 2021

(87) PCT Pub. No.: WO2020/080878
PCT Pub. Date: Apr. 23, 2020

(65) Prior Publication Data
US 2021/0389831 A1 Dec. 16, 2021

Related U.S. Application Data

(60) Provisional application No. 62/748,217, filed on Oct. 19, 2018.

(30) Foreign Application Priority Data

Jul. 18, 2019 (KR) .................. 10-2019-0087054
Jul. 18, 2019 (KR) .................. 10-2019-0087055
(Continued)

(51) Int. Cl.
*G06F 3/0354* (2013.01)
*G06F 3/038* (2013.01)
(Continued)

(52) U.S. Cl.
CPC ........ *G06F 3/03542* (2013.01); *G06F 3/0304* (2013.01); *G06F 3/0383* (2013.01);
(Continued)

(58) Field of Classification Search
CPC .. G06F 3/03542; G06F 3/0304; G06F 3/0383; G06F 3/0386
(Continued)

(56) References Cited

U.S. PATENT DOCUMENTS 10,091,338 B2 * 10/2018 Amit .................. G06F 1/1626
10,310,639 B2   6/2019 Zimmerman et al.
(Continued)

FOREIGN PATENT DOCUMENTS

KR   10-2018-0033278 A   8/2014
KR   10-1431688 B1       8/2014
(Continued)

OTHER PUBLICATIONS

KR Office Action dated Oct. 21, 2020 as received in Application No. 10-2019-0087054.
(Continued)

*Primary Examiner* — Calvin C Ma
(74) *Attorney, Agent, or Firm* — Maschoff Brennan

(57) ABSTRACT

According to one embodiment of the present invention, there is provided an electronic pen including a first pen module which includes a first pen core including a writing material used for a medium and a pattern sensing unit configured to acquire a handwritten image of a user in order for the electronic pen to acquire first location information that is location information of the electronic pen with respect
(Continued)

to the medium, a second pen module which generates at least one of a magnetic field and an electronic field in order for the electronic pen to acquire second location information that is location information of the electronic pen with respect to an electronic device, a main body in which the first pen module is disposed at a first end portion thereof and the second pen module is fixed to at least one of the first end portion and a second end portion thereof and which has a cavity therein, and a control unit which generates a signal for controlling the first pen module and the second pen module.

14 Claims, 42 Drawing Sheets

(30) Foreign Application Priority Data

Jul. 18, 2019 (KR) .................. 10-2019-0087056
Jul. 18, 2019 (KR) .................. 10-2019-0087057

(51) Int. Cl.
*G06F 3/14* (2006.01)
*G06F 3/03* (2006.01)
*G06F 3/0488* (2013.01)
*G06F 3/04883* (2022.01)

(52) U.S. Cl.
CPC ........ *G06F 3/0386* (2013.01); *G06F 3/04883* (2013.01); *G06F 3/1423* (2013.01)

(58) Field of Classification Search
USPC .................................................. 345/173, 179
See application file for complete search history.

(56) References Cited

U.S. PATENT DOCUMENTS 10,474,253 B2 * 11/2019 Kamiyama ........... G06F 3/0383
10,739,873 B2    8/2020 Tamura
10,775,905 B2 *  9/2020 Han ........................ G06F 3/018

FOREIGN PATENT DOCUMENTS

KR    10-2016-0045540 A    4/2016
KR    10-2017-0072231 A    6/2017
KR    10-2018-0105853 A    10/2018

OTHER PUBLICATIONS

KR Office Action dated Oct. 21, 2020 as received in Application No. 10-2019-0087055.
KR Office Action dated Oct. 22, 2020 as received in Application No. 10-2019-0087056.
KR Office Action dated Jan. 5, 2021 as received in Application No. 10-2019-0087054.
KR Office Action dated Mar. 4, 2021 as received in Application No. 10-2019-0087055.
KR Decision to Grant dated Mar. 11, 2021 as received in Application No. 10-2019-0087056.
KR Decision to Grant dated Apr. 6, 2021 as received in Application No. 10-2019-0087055.

* cited by examiner

3000

(a)  (b)  (c)  (d)

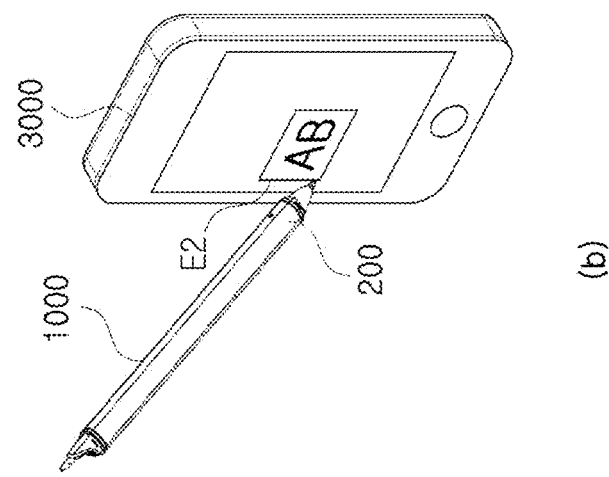
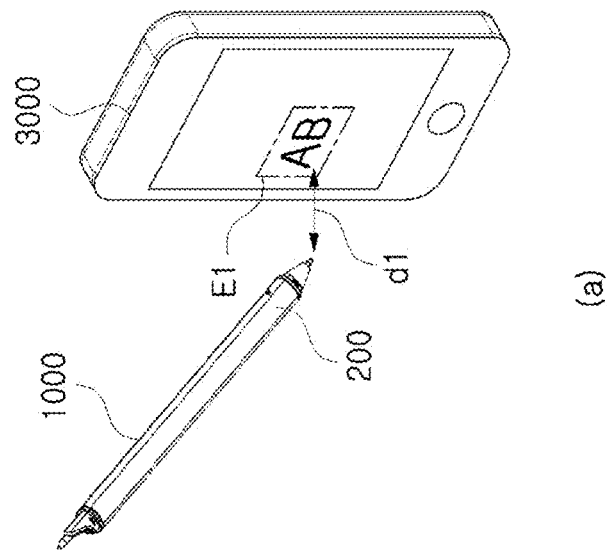
FIG. 38 ic # ELECTRONIC PEN, ELECTRONIC DEVICE, AND METHOD OF CONTROLLING THE SAME

TECHNICAL FIELD

The present invention relates to an electronic pen and a method of controlling the same, and more particularly, to an electronic pen which reproduces a user's handwritten content on a medium and provides a user input to an input surface of an electronic device, and a method of controlling the same.

BACKGROUND ART

Recently, technologies and products capable of recognizing a user's writing using an electronic pen and digitizing and storing recognized contents are being commercialized. However, since the development of a method of providing handwritten content that is recognized and digitized using such an electronic pen in a meaningful manner to a user is still unsatisfactory, there is a need to develop a method of enabling the user to more effectively utilize the digitized handwritten contents.

In particular, attempts have been made to make lecture materials composed of videos using an electronic pen which are still mostly performed in a computer that provides a touch screen. However, content produced through direct handwriting in a computer causes fatigue of writing the content in a digital device to users who are still accustomed to using paper, and content produced through handwriting on paper is difficult to correct later.

Therefore, research is being conducted on an electronic pen usable in both computer and paper.

DISCLOSURE

Technical Problem

The present invention is directed to providing an electronic pen for providing a user input to a surface of a medium and an electronic device, an electronic device, and a method of controlling the same.

The present invention is also directed to providing an electronic pen provided with at least two pen modules so as to provide a user input to a surface of a medium and an electronic device.

The present invention is also directed to providing an electronic pen which stores pen data including at least one of handwritten content and location information so as to be used in a medium and an electronic device.

The present invention is also directed to providing a method of controlling an electronic pen which supplies power to at least two pen modules in order to provide a user input to a surface of a medium and an electronic device.

The present invention is also directed to providing a method of controlling communication between an electronic pen and an electronic device in order to provide a user input to a surface of a medium and an electronic device, and a communication unit using the same.

The present invention is also directed to providing a method of controlling an electronic device which provides a memo function when a user input is provided to a surface of a medium and an electronic device.

The present invention is also directed to providing a method of controlling color information when a user input is provided to a surface of a medium and an electronic device.

The objects of the present invention are not limited to the aforementioned objects, and other objects which are not described herein should be clearly understood by those skilled in the art, to which the present invention belongs, from the present specification and the accompanying drawings.

Technical Solution

According to an aspect of the invention, an electronic pen comprising: a first pen module including a first pen tip and a pattern sensing unit, wherein the first pen tip contains a material used for writing which is used for a medium, and wherein the pattern sensing unit is configured to obtain a handwritten image in order for the electronic pen to obtain first location information, wherein the handwritten image is an image made by a user with the first pen tip, and wherein the first location information is defined as a location of the electronic pen with respect to the medium; a second pen module including a second pen tip, wherein the second pen tip is configured to generate at least one of a magnetic field and an electric field in order for an electronic device to obtain second location information, and wherein the second location information is defined as a location of the electronic pen with respect to the electronic device; a main body which has a cavity, wherein the first pen module is disposed at a first end of the main body and the second pen module is fixed to at least one of the first end and a second end which is an opposite end of the main body, wherein the first end includes a first pen tip accommodating part and a light transmitting unit, and wherein the first pen tip is supported by being inserted into the first pen tip accommodating part so that a part of the first pen tip is exposed, and wherein the pattern sensing unit is positioned and fixed coaxially with the light transmitting unit; and a control unit which is configured to generate a signal for controlling the first pen module and the second pen module, can be provided.

According to another aspect of the invention, an electronic pen comprising: a battery; a first pen module including a first pen tip and a pattern sensing unit, wherein the first pen module is configured to receive power from the battery, wherein the first pen tip contains a material used for writing which is used for a medium, and wherein the pattern sensing unit is configured to obtain a handwritten image in order for the electronic pen to obtain first location information, wherein the handwritten image is an image made by a user with the first pen tip, and wherein the first location information is defined as a location of the electronic pen with respect to the medium; a second pen module including a second pen tip, wherein the second pen module is configured to receive power from the battery, wherein the second pen tip is configured to generate at least one of a magnetic field and an electric field in order for an electronic device to obtain second location information, and wherein the second location information is defined as a location of the electronic pen with respect to the electronic device; a main body in which the battery is disposed between a first end and a second end, wherein the first pen module is disposed at the first end of the main body and the second pen module is fixed to the second end which is an opposite end of the main body, and wherein the first end includes a first pen tip accommodating part; and a control unit which is configured to control power supply to the first pen module and the second pen module, wherein controlling power supply to the first pen module is to generate pen data, and wherein controlling power supply to the second pen module is to generate a first electric field, can be provided.

According to another aspect of the invention, an electronic pen comprising: a first pen module including a first pen tip and a pattern sensing unit, wherein the first pen tip contains a material used for writing which is used for a medium, and wherein the pattern sensing unit is configured to obtain a handwritten image in order for the electronic pen to obtain first location information, wherein the handwritten image is an image made by a user with the first pen tip, and wherein the first location information is defined as a location of the electronic pen with respect to the medium; a second pen module including a second pen tip, wherein the second pen tip is configured to generate at least one of a magnetic field and an electric field in order for an electronic device to obtain second location information, and wherein the second location information is defined as a location of the electronic pen with respect to the electronic device; a main body in which the battery is disposed between a first end and a second end, wherein the first pen module is disposed at a first end of the main body and the second pen module is fixed to at least one of the first end and a second end which is an opposite end of the main body, wherein the first end includes a first pen tip accommodating part; and a communication unit which is configured to transmit pen data to the electronic device, wherein the pen data is used to reproduce the user's writing on the medium based on the handwritten image, can be provided.

According to another aspect of the invention, a method of controlling an electronic device, wherein the electronic device obtains second location information which is defined as a location of the electronic pen with respect to the electronic device, and wherein the electronic device receives pen data including first location information which is defined as a location of the electronic pen with respect to a medium, comprising: receiving memo area identification information form a first pen module, wherein the first pen module includes a first pen tip and a pattern sensing unit, wherein the first pen tip contains a material used for writing which is used for the medium, and wherein the pattern sensing unit is configured to obtain a handwritten image made with the first pen tip; determining at least a part of the handwritten image as a memo area based on the memo area identification information; determining a location where the memo area is displayed based on a signal received from a second pen module, wherein the second pen module includes a second pen tip which is configured to generate at least one of a magnetic field and an electric field, can be provided.

According to another aspect of the invention, an electronic pen capable of providing a user's input to the surface of a medium and electronic device, comprising: a first pen module including a first pen tip and a pattern sensing unit, wherein the first pen tip contains a material used for writing which is used for a medium, and wherein the pattern sensing unit is configured to obtain a handwritten image which is made by a user with the first pen tip; a second pen module which is used on the electronic device including a second pen tip, wherein the second pen tip is configured to generate at least one of a magnetic field and an electric field in order for an electronic device to obtain location information, and wherein the location information is defined as a location of the electronic pen; and a control unit which is configured to transmit information to the electronic device; wherein an image based on the handwritten image and first color information is displayed on the electronic device when the first pen module is used for the medium, wherein an image based on the location information and second color information is displayed when the second pen module is used on the electronic device, and wherein the control unit is configured to provide the first color information to the electronic device so that the second color information is set corresponding to the first color information, when the second pen module is used after the first pen module is used, can be provided.

According to another aspect of the invention, an electronic device which is configured to receive user input and display an image comprising: a control module which is configured to control an image displayed on the electronic device; and a display which is configured to provide an image to a user; wherein the control module is used for a medium and displays an image on the display based on a handwritten image and first color information, wherein the handwritten image is obtained from a first pen module, wherein the control module includes a pattern sensing unit which is configured to obtain the handwritten image of the user, wherein the electronic device obtains location information of a second pen module based on at least one of a magnetic field and an electric field provided by the second pen module, displays an image on the display based on the location information and second color information, and displays an image on the display based on the location information and third color information corresponding to the first color information when the second pen module is used after the first pen module is used, can be provided.

According to another aspect of the invention, a writing system in which an image is displayed on the electronic device when a user input is provided to surface of at least a medium and an electronic device, comprising: a control module which is configured to control an image displayed on the electronic device; a first pen module including a first pen tip and a pattern sensing unit, wherein the first pen tip contains a material used for writing which is used for a medium, and wherein the pattern sensing unit is configured to obtain a handwritten image which is made by a user with the first pen tip; and a second pen module which is used on the electronic device including a second pen tip, wherein the second pen tip is configured to generate at least one of a magnetic field and an electric field in order for the control module to obtain location information; wherein the control module obtains the handwritten image from the first pen module and displays an image on the electronic device based on the handwritten image and first color information when the first pen module is used for the medium, wherein the writing system is configured to display an image on the electronic device based on the location information and the second color information when the second pen module is used on the electronic device, and wherein the writing system is configured to obtain the first color information from the first pen module and set the second color information to correspond to the first color information when the first pen module is used, can be provided.

Technical solutions of the present invention may not be limited to the above, and other technical solutions which are not described herein should be clearly understood by those skilled in the art, to which the present invention belongs, from the present specification and the accompanying drawings.

Advantageous Effects

According to the present invention, it is possible to provide an electronic pen capable of providing a user input to a surface of a medium and an electronic device, an electronic device, and a method of controlling the same.

According to the present invention, a user can provide a user input on a surface of a medium and an electronic device with one electronic pen without using a separate pen.

According to the present invention, when a user uses an electronic pen, the electronic pen can store pen data including at least one of handwritten content and location information and can provide a user input to a medium and an electronic device using the pen data.

According to the present invention, since power is appropriately supplied to a plurality of pen modules included in an electronic pen, the electronic pen can provide a user input to a medium and an electronic device.

According to the present invention, since communication between an electronic pen and an electronic device is controlled, a user input provided to a surface of a medium or the electronic device can be displayed through the electronic device.

According to the present invention, since a user uses a memo function using a medium and an electronic device, handwriting efficiency can be increased.

According to the present invention, when an electronic pen is used, color information can be controlled, thereby reducing a sense of difference felt by a user when a user input is provided to a surface of a medium and an electronic device.

Effects of the present invention may not be limited to the above, and other effects which are not described herein should be clearly understood by those skilled in the art, to which the present invention belongs, from the present specification and the accompanying drawings.

DESCRIPTION OF DRAWINGS

FIG. 38 shows diagrams for describing a form in which an image reflecting a memo area is displayed based on a distance between an electronic pen and an electronic device according to embodiments of the present invention.

MODES OF THE INVENTION

Figure 1:
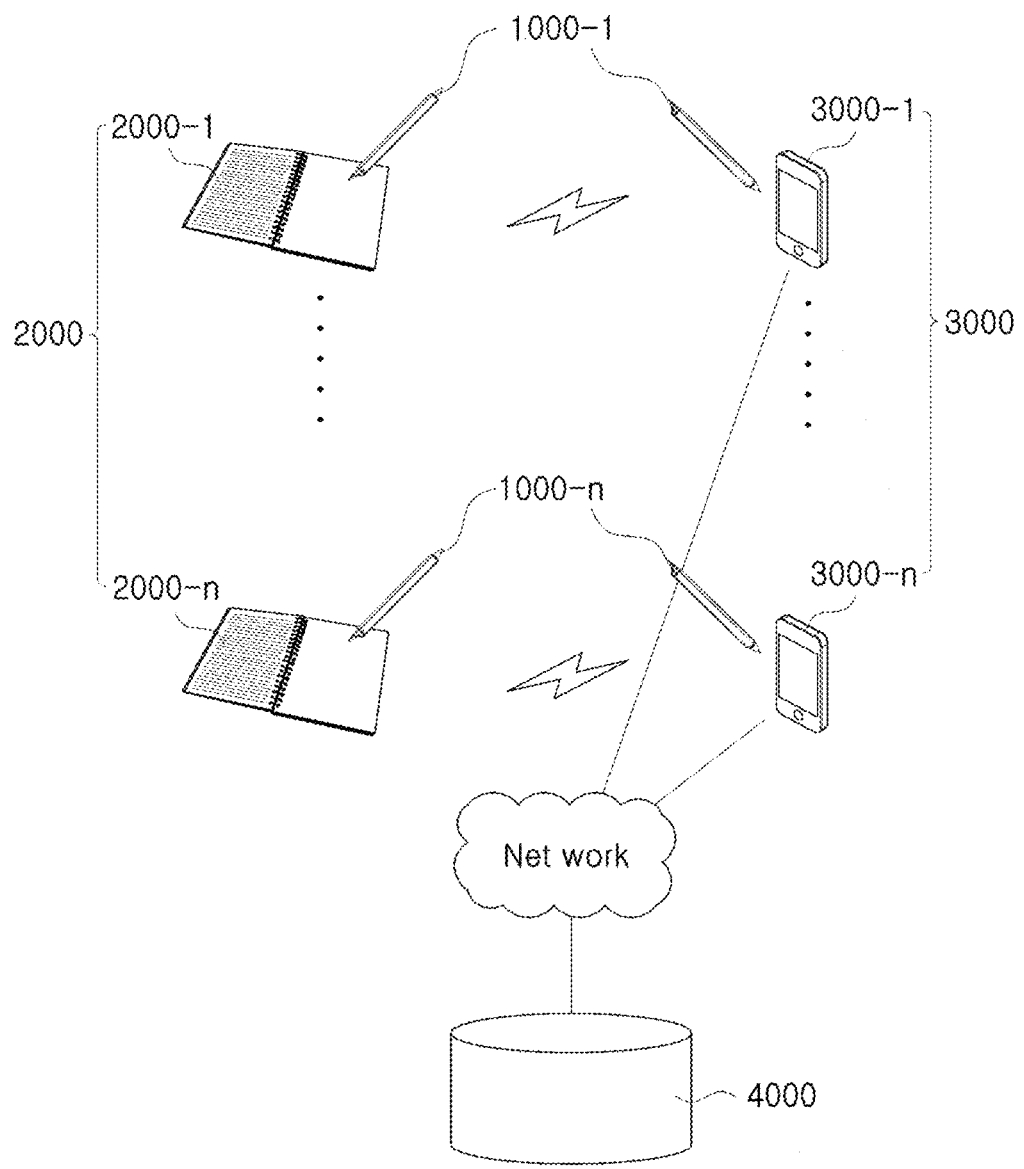
FIG. 1 is a schematic diagram for describing a system including an electronic pen and an electronic device interworking with the electronic pen related to embodiments of the present invention.

Embodiments described in this specification are made to clearly explain the scope of the present invention to those having ordinary skill in the art and are not intended to limit the present invention. It should be interpreted that the present invention may include substitutions and modifications within the technical scope of the present invention.

The terms used in this specification are selected from general terms, which are widely used currently, based on functions of components according to the embodiment of the present invention, and may have meanings varying according to the intentions of those skilled in the art, the custom in the field of art or advent of new technology. If a specific term is used with a specific meaning, the meaning of the term will be described specifically. Accordingly, the terms used in this specification should not be defined as simple names of the components but should be defined based on the actual meaning of the terms and the whole context throughout the present specification.

The accompanying drawings are to facilitate the explanation of the present invention and the shape in the drawings may be exaggerated for the purpose of convenience of explanation, so the present invention should not be limited to the drawings.

In addition, the details of the generally known function and structure, which make the subject matter of the present invention unclear, will be omitted.

According to one aspect of the invention, an electronic pen comprising: a first pen module including a first pen tip and a pattern sensing unit, wherein the first pen tip contains a material used for writing which is used for a medium, and wherein the pattern sensing unit is configured to obtain a handwritten image in order for the electronic pen to obtain first location information, wherein the handwritten image is an image made by a user with the first pen tip, and wherein the first location information is defined as a location of the electronic pen with respect to the medium; a second pen module including a second pen tip, wherein the second pen tip is configured to generate at least one of a magnetic field and an electric field in order for an electronic device to obtain second location information, and wherein the second location information is defined as a location of the electronic pen with respect to the electronic device; a main body which has a cavity, wherein the first pen module is disposed at a first end of the main body and the second pen module is fixed to at least one of the first end and a second end which is an opposite end of the main body, wherein the first end includes a first pen tip accommodating part and a light transmitting unit, and wherein the first pen tip is supported by being inserted into the first pen tip accommodating part so that a part of the first pen tip is exposed, and wherein the pattern sensing unit is positioned and fixed coaxially with the light transmitting unit; and a control unit which is configured to generate a signal for controlling the first pen module and the second pen module, can be provided.

The control unit may generate pen data used to reproduce a user's handwritten content on the medium based on the handwritten image.

The second pen core may include a first electrode which generates a first electric field having a first effective distance, and the second pen module may include a second electrode which is disposed to be spaced apart from the first electrode along a central axis of the main body in a direction of the first pen core and generates a second electric field having a second effective distance. The control unit may further generate stylus data including angle information that indicates an angle of the electronic pen with respect to an input surface of the electronic device.

The electronic pen may further include a first pressure sensor which is electrically connected to one unexposed end portion of the first pen core inside the main body to sense a first pressure applied to the first pen core and a second pressure sensor which is disposed in the second pen module and electrically connected to the second pen core to sense a second pressure applied to the second pen core. The pen data may further include first pressure information that is information on the first pressure, and the stylus data may further include second pressure information that is information on the second pressure.

The electronic pen may further include a substrate connected to the pattern sensing unit, and the substrate may include a first substrate which is disposed close to the first end portion of the main body at which the first pen core is exposed and a second substrate which is disposed close to the second end portion of the main body.

The electronic pen may further include a battery which supplies power to the first pen module and the second pen module.

The control unit may include a first control unit which controls power supply from the battery to the first pen module and a second control unit which controls power supply from the battery to the second pen module.

The first control unit may be disposed on the first substrate, and the second control unit may be disposed on the second substrate.

The electronic pen may further include a cap which includes a magnet and has a predetermined inner space into which at least one of the first end portion and the second end portion of the main body is inserted to protect at least one of the first pen core and the second pen core, and at least one magnet sensor which is disposed in at least one of the first end portion and the second end portion and is capable of detecting the magnet.

The electronic pen may further include a vibration unit which is mounted on the main body and generates vibration when a predetermined condition is satisfied, and the predetermined condition may refer to a state in which pressure is sensed from the first pressure sensor, but the handwritten image is not acquired by the pattern sensing unit The first pen core may be spaced apart from a center of a longitudinal axis of the main body to an outer surface of the main body and inserted into the main body, and the second pen core may be inserted into the second pen module in a center direction of the longitudinal axis of the main body so that a longitudinal axis of the first pen core and a longitudinal axis of the second pen core may be spaced apart from each other.

The electronic pen may further include at least one of a first display and a second display, wherein the first display is disposed at one side of the main body adjacent to the first end portion and outputs visible light based on information of the first pen module, and the second display is disposed at the other side of the main body adjacent to the second end portion and outputs visible light based on information of the second pen module.

The information of the first pen module may include first color information recognized through the first pen module, and the information of the second pen module may include second color information recognized based on the first electric field transmitted from the second pen module.

The control unit may control at least one of the first display and the second display based on the user input.

According to another aspect of the invention, an electronic pen comprising: a battery; a first pen module including a first pen tip and a pattern sensing unit, wherein the first pen module is configured to receive power from the battery, wherein the first pen tip contains a material used for writing which is used for a medium, and wherein the pattern sensing unit is configured to obtain a handwritten image in order for the electronic pen to obtain first location information, wherein the handwritten image is an image made by a user with the first pen tip, and wherein the first location information is defined as a location of the electronic pen with respect to the medium; a second pen module including a second pen tip, wherein the second pen module is configured to receive power from the battery, wherein the second pen tip is configured to generate at least one of a magnetic field and an electric field in order for an electronic device to obtain second location information, and wherein the second location information is defined as a location of the electronic pen with respect to the electronic device; a main body in which the battery is disposed between a first end and a second end, wherein the first pen module is disposed at the first end of the main body and the second pen module is fixed to the second end which is an opposite end of the main body, and wherein the first end includes a first pen tip accommodating part; and a control unit which is configured to control power supply to the first pen module and the second pen module, wherein controlling power supply to the first pen module is to generate pen data, and wherein controlling power supply to the second pen module is to generate a first electric field, can be provided.

The second pen core may include a first electrode which generates the first electric field having a first effective distance, and the second pen module may include a second electrode which is disposed to be spaced apart from the first electrode along a central axis of the main body in a direction of the first pen core and generates a second electric field having a second effective distance. The second electrode may be electrically connected to the battery to receive power from the battery.

The electronic pen may further include a first pressure sensor which is electrically connected to one unexposed end portion of the first pen core inside the main body to sense a first pressure applied to the first pen core and a second pressure sensor which is disposed in the second pen module and electrically connected to the second pen core to sense a second pressure applied to the second pen core. The first pressure sensor and the second pressure sensor may be electrically connected to the battery to receive power from the battery.

The control unit may control power supply from the battery to the first pen module based on first pressure information.

When a time for another first pressure information to be acquired after the first pressure information is acquired exceeds a first time, the control unit may reduce an amount of power supplied from the battery to the first pen module so as to be smaller than an amount of power supplied before the first time.

When a time for the first pressure information to be acquired again after the first pressure information is acquired exceeds a second time longer than the first time, the control unit may cut off power supply from the battery to the first pen module.

The control unit may control power supply of the battery to the second pen module based on proximity information, and the proximity information may include at least one of second pressure information that is information on the second pressure measured by the second pressure sensor, response information on the first electric field, and response information on the second electric field.

When a time for another piece of proximity information to be acquired after the proximity information is acquired exceeds a third time, the control unit may reduce an amount of power supplied from the battery to the second pen module so as to be smaller than an amount of power supplied before the third time.

When the time for another piece of proximity information to be acquired after the proximity information is acquired exceeds a fourth time longer than the third time, the control unit may reduce an amount of power supplied from the battery to the second pen module so as to be smaller than an amount of power supplied within the third time and the fourth time.

The electronic pen may further include a cap which includes a magnet and has a predetermined inner space into which the first end portion of the main body is inserted to protect the first pen core or the second end portion is inserted to protect the second pen core, and at least one magnet sensor which is capable of detecting the magnet in the main body when the cap is inserted on the main body. The control unit may control power supply of the battery based on whether the cap detected by the magnetic sensor is inserted.

The electronic pen further includes an attachment detecting sensor that detects a coupling between the electronic pen and the electronic device, and the control unit may cut off power supply of the battery to at least one of the first pen module and the second pen module based on a signal acquired from the attachment detecting sensor.

According to another aspect of the invention, an electronic pen comprising: a first pen module including a first pen tip and a pattern sensing unit, wherein the first pen tip contains a material used for writing which is used for a medium, and wherein the pattern sensing unit is configured to obtain a handwritten image in order for the electronic pen to obtain first location information, wherein the handwritten image is an image made by a user with the first pen tip, and wherein the first location information is defined as a location of the electronic pen with respect to the medium; a second pen module including a second pen tip, wherein the second pen tip is configured to generate at least one of a magnetic field and an electric field in order for an electronic device to obtain second location information, and wherein the second location information is defined as a location of the electronic pen with respect to the electronic device; a main body in which the battery is disposed between a first end and a second end, wherein the first pen module is disposed at a first end of the main body and the second pen module is fixed to at least one of the first end and a second end which is an opposite end of the main body, wherein the first end includes a first pen tip accommodating part; and a communication unit which is configured to transmit pen data to the electronic device, wherein the pen data is used to reproduce the user's writing on the medium based on the handwritten image, can be provided.

The second pen core may include a first electrode which generates the first electric field having a first effective distance, and the second pen module may include a second electrode which is disposed to be spaced apart from the first electrode along a central axis of the main body in a direction of the first pen core and generates a second electric field having a second effective distance. The communication unit may further transmit stylus data, which includes angle information indicating an angle of the electronic pen with respect to an input surface of the electronic device, to the electronic device.

The electronic pen may further include a first pressure sensor which is electrically connected to one unexposed end portion of the first pen core inside the main body to sense a first pressure applied to the first pen core and a second pressure sensor which is disposed in the second pen module and electrically connected to the second pen core to sense a second pressure applied to the second pen core. The pen data may further include first pressure information that is information on the first pressure, and the stylus data may further include second pressure information that is information on the second pressure.

According to another aspect of the invention, a method of controlling an electronic device, wherein the electronic device obtains second location information which is defined as a location of the electronic pen with respect to the electronic device, and wherein the electronic device receives pen data including first location information which is defined as a location of the electronic pen with respect to a medium, comprising: receiving memo area identification information form a first pen module, wherein the first pen module includes a first pen tip and a pattern sensing unit, wherein the first pen tip contains a material used for writing which is used for the medium, and wherein the pattern sensing unit is configured to obtain a handwritten image made with the first pen tip; determining at least a part of the handwritten image as a memo area based on the memo area identification information; determining a location where the memo area is displayed based on a signal received from a second pen module, wherein the second pen module includes a second pen tip which is configured to generate at least one of a magnetic field and an electric field, can be provided.

The memo area identification information may be generated based on an input to an input unit of the electronic pen.

The memo area identification information may be generated by detecting the handwritten image through the first pen module.

The handwritten image may be a preset identification code.

The method of controlling the electronic device may further include transmitting, by the electronic device, information reflecting the memo area to a temporary storage space.

The memo area may be determined in further consideration of a signal received from the second pen module.

The memo area may be determined in further consideration of the pen data.

The signal received from the second pen module may include a first electric field, and a location at which the memo area is inserted may be determined based on a first electric field cross area.

The signal received from the second pen module may further include a second electric field, and a location at which the memo area is displayed may be determined in further consideration of a second electric field cross area.

The signal received from the second pen module may further include second pressure information that is information on a pressure applied to the second pen core, and the location at which the memo area is displayed may be determined in further consideration of the second pressure information.

The method of controlling the electronic device may further include displaying a preview image reflecting the memo area based on the first electric field.

The electronic device may change transparency of the preview image reflecting the memo area.

The method of controlling the electronic device may further include correcting the memo area based on the signal received from the second pen module.

According to another aspect of the present invention, there may be provided a recording medium recording a program for executing the method of controlling the electronic device.

According to another aspect of the invention, an electronic pen capable of providing a user's input to the surface of a medium and electronic device, comprising: a first pen module including a first pen tip and a pattern sensing unit, wherein the first pen tip contains a material used for writing which is used for a medium, and wherein the pattern sensing unit is configured to obtain a handwritten image which is made by a user with the first pen tip; a second pen module which is used on the electronic device including a second pen tip, wherein the second pen tip is configured to generate at least one of a magnetic field and an electric field in order for an electronic device to obtain location information, and wherein the location information is defined as a location of the electronic pen; and a control unit which is configured to transmit information to the electronic device; wherein an image based on the handwritten image and first color information is displayed on the electronic device when the first pen module is used for the medium, wherein an image based on the location information and second color information is displayed when the second pen module is used on the electronic device, and wherein the control unit is configured to provide the first color information to the electronic device so that the second color information is set corresponding to the first color information, when the second pen module is used after the first pen module is used, can be provided.

In the electronic pen, when the first pen module is used after the second pen module is used, the control unit may transmit the second color information to the electronic device such that the first color information is set to correspond to the second color information.

The electronic pen may include a memory in which color information is stored, and the control unit may store at least one of the first color information and the second color information in the memory.

When the second pen module is used, the control unit may acquire the second color information from the electronic device.

According to another aspect of the present invention, there may be provided an electronic device, which receives a user input to display an image, including a control module configured to control an image displayed on the electronic device and a display configured to provide an image to a user, wherein the control module acquires a handwritten image from a first pen module to display an image on the display based on the handwritten image and first color information, wherein the first pen module is used on a medium and includes a pattern sensing unit configured to acquire the handwritten image of a user, and the control module acquires location information of a second pen module based on at least one of a magnetic field and an electric field provided by the second pen module, displays an image on the display based on the location information and second color information, and displays an image on the display based on the location information and third color information corresponding to the first color information when the second pen module is used after the first pen module is used.

The third color information may be identical to the first color information or may be included in a color range similar to that of the first color information.

When the first pen module is used after the second pen module is used, the electronic device may display an image on the display based on the handwritten image and fourth color information corresponding to the second color information.

The first pen module may include a communication unit, and the control module may acquire the first color information from the communication unit when the first pen module is used.

The electronic device may include a memory module which stores at least one of the first color information and the second color information.

According to another aspect of the invention, a writing system in which an image is displayed on the electronic device when a user input is provided to surface of at least a medium and an electronic device, comprising: a control module which is configured to control an image displayed on the electronic device; a first pen module including a first pen tip and a pattern sensing unit, wherein the first pen tip contains a material used for writing which is used for a medium, and wherein the pattern sensing unit is configured to obtain a handwritten image which is made by a user with the first pen tip; and a second pen module which is used on the electronic device including a second pen tip, wherein the second pen tip is configured to generate at least one of a magnetic field and an electric field in order for the control module to obtain location information; wherein the control module obtains the handwritten image from the first pen module and displays an image on the electronic device based on the handwritten image and first color information when the first pen module is used for the medium, wherein the writing system is configured to display an image on the electronic device based on the location information and the second color information when the second pen module is used on the electronic device, and wherein the writing system is configured to obtain the first color information from the first pen module and set the second color information to correspond to the first color information when the first pen module is used, can be provided.

First, an environment, in which an electronic pen and an electronic device interworking with the electronic pen related to some embodiments of the present invention are operated, will be briefly described, and then, the electronic pen, the electronic device interworking with the electronic pen, a method of controlling the electronic pen and a method of controlling the electronic device according to embodiments of the present invention will be described in detail.

FIG. 1 is a schematic diagram for describing a system including an electronic pen and an electronic device interworking with the electronic pen related to embodiments of the present invention.

The system may include one or more media 2000, one or more electronic pens 1000, one or more electronic devices 3000, and one or more servers 4000.

The medium 2000 provides a surface or space on which a user writes a desired article using the electronic pen 1000 according to embodiments of the present invention.

The medium 2000 may be provided as various materials. According to an example, the medium 2000 may be provided as paper. According to another example, the medium 2000 may be provided as plastic. According to still another example, the medium 2000 may be provided as a metal.

When the electronic pen 1000 according to the embodiment of the present invention is the electronic pen 1000 implemented using an optical component that includes a camera module 121 and the like, the medium 2000 may have a code pattern that is recognizable by the electronic pen 1000. The code pattern may be provided to the medium 2000 through a method such as a printing method. The code pattern will be described in detail below.

Meanwhile, even when the electronic pen 1000 uses the optical component, the medium 2000 may not have the code pattern. For example, when the electronic pen 1000 is used on the medium 2000 and irradiates light and detects reflected light to acquire location information, the medium 2000 does not need to have the code pattern, and furthermore, an arbitrary object may become the medium 2000.

Figure 2:
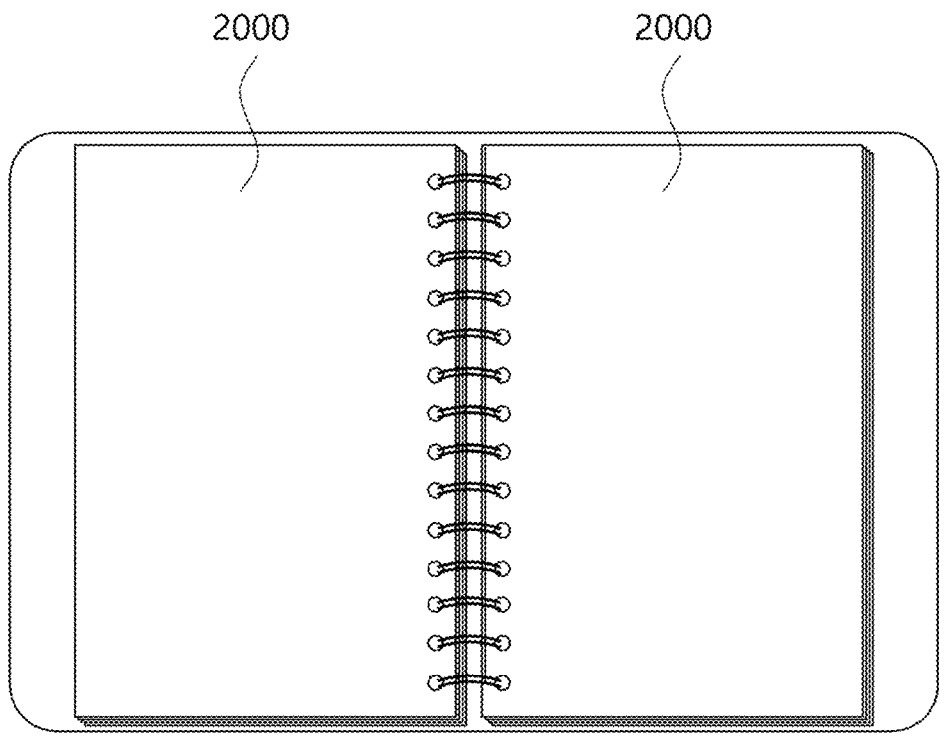
FIG. 2 is a diagram illustrating one embodiment of a medium related to embodiments of the present invention.

FIG. 2 is a diagram illustrating one embodiment of a medium related to embodiments of the present invention.

Referring to FIG. 2, a notebook or book may include a plurality of media 2000. As shown in FIG. 2, according to some embodiments of the present invention, at least some pages constituting the notebook or book may be implemented as the medium 2000 according to embodiments of the present invention. For example, when an electronic pen 1000 is implemented as an optical electronic pen 1000, a code pattern according to embodiments of the present invention may be provided on at least some of the pages constituting the notebook or book.

Meanwhile, only at least a partial area of a whole surface of the page constituting the notebook or book may be implemented as the medium 2000 according to embodiments of the present invention. For example, when the electronic pen 1000 is implemented as the optical electronic pen 1000, the code pattern may be provided only on the partial area rather than the whole surface of the page constituting the notebook or book.

Meanwhile, although not shown in the drawing, the medium 2000 according to embodiments of the present invention may be implemented in the form of a blackboard or the like. That is, the medium 2000 according to embodiments of the present invention may be implemented in the form of a blackboard (electronic blackboard) on which a code pattern is provided.

In addition, meanwhile, since the electronic pen 1000 is used, the medium 2000 may be implemented as an arbitrary object capable of giving a writing sense to a user by applying friction to the electronic pen 1000. For example, not only paper and notebooks, but also floors, desks, walls, glass, and parts of human or animal bodies may become the medium 2000.

Meanwhile, the medium 2000 may be omitted from a system. For example, when the electronic pen 1000 acquires location information by detecting the movement of the electronic pen 1000 using a sensor or the like that is provided therein, the medium 2000 may be omitted.

The electronic pen 1000 may acquire first location information that is location information of the electronic pen 1000 with respect to the medium 2000. Here, when a pattern sensing unit 120 of the electronic pen 1000 acquires a code pattern provided from the medium 2000, the electronic pen

1000 may acquire the first location information. Alternatively, when the pattern sensing unit 120 of the electronic pen 1000 detects a change in relative location of the electronic pen 1000 with respect to the medium 2000, the electronic pen 1000 may acquire the first location information.

The electronic pen 1000 may generate pen data by detecting information on a user's writing. The pen data may be used to generate stroke data or the like on the user's writing. The pen data will be described in detail below.

The electronic pen 1000 may generate a first electric field having a first effective distance. Here, based on the first electric field, an electronic device 3000 may acquire second location information that is location information of the electronic pen 1000 with respect to the electronic device 3000.

The electronic pen 1000 may provide stylus data to the electronic device 3000 through an input surface of the electronic device 3000. The stylus data may include angle information of the electronic pen 1000 with respect to the input surface of the electronic device 3000 and pressure information on a pressure applied to the electronic device 3000 by the electronic pen 1000. In addition, the stylus data may include an electrical signal that is required for the electronic device 3000 to acquire location information of the electronic pen 1000. The stylus data will be described in detail below.

The electronic device 3000 may receive the pen data from the electronic pen 1000 to analyze the pen data. According to the analysis of the pen data, a stroke data may be generated. The stroke data is data related to a trajectory of the electronic pen 1000 on the medium 2000 divided by a stroke unit. Here, the stroke refers to a line drawn on a writing surface by a pen until the pen is detached from the writing surface after being brought into contact with the writing surface and may also be referred to as a "pen stroke." That is, "A" is generally composed of three strokes, "B" is generally composed of two strokes, "C" is generally composed of one stroke, "D" is generally composed of two strokes, and "'E" is generally composed of three strokes.

The electronic device 3000 may determine location information of the electronic pen 1000 with respect to the electronic device 3000 based on an electric field provided from the electronic pen 1000.

The electronic device 3000 may receive the stylus data from the electronic pen 1000 and may analyze the stylus data. In this case, the stylus data may include angle information, pressure information, and the like of the electronic pen 1000.

The electronic device 3000 may include a capacitive touch sensor to sense an electric field. Here, the electronic device 3000 may determine angle information of the electronic pen 1000 by sensing the first electric field generated by a first electrode 220 of the electronic pen 1000 and the second electric field generated by a second electrode 230 thereof.

Of course, the electronic device 3000 may acquire the stylus data including the angle information of the electronic pen 1000 based on an electric field provided from the electronic pen 1000.

The electronic device 3000 may appropriately process the analyzed stroke data to reproduce and display a user's writing in real time according to the stroke data through a display or the like provided in the electronic device 3000.

When the electronic pen 1000 is used by a user, the electronic device 3000 may display an image based on the pen data and/or the stylus data. An image displayed on the electronic device 3000 may include a stroke according to a user's writing, an image representing the location information of the electronic pen 1000 with respect to the medium 2000 or the electronic device 3000, and an image generated by processing the pen data and/or the stylus data.

In addition, the electronic device 3000 may store the stroke data generated based on the pen data in a memory 600 or the like provided in the electronic device 3000 and may process at least one of the pen data and the stroke data according to a user's request or the like.

The electronic device 3000 may be connected to a server 4000 through a network to transmit or receive necessary information. The server 4000 will be described in detail below.

The server 4000 may be connected to the electronic device 3000 through the network to receive or transmit necessary information.

The server 4000 may be connected to at least one electronic device 3000 to store at least one of the pen data and stylus pen data received from the electronic device 3000 in a database.

The server 4000 may be connected to at least one electronic pen 1000 to store at least one of the pen data and the stylus data received from the electronic pen 1000 in the database.

The server 4000 may appropriately process the pen data stored in the database according to a request of the electronic device 3000 or a user's request.

The server 4000 may share and perform some or all of the above-described functions of the electronic device 3000. For example, the electronic device 3000 may receive the pen data from the electronic pen 1000 and directly transmit the pen data to the server 4000 without performing a special processing procedure on the pen data. In this case, the server 4000 may receive the pen data to perform an operation of generating the stroke data, an operation of storing the stroke data, and an operation of additionally processing the stroke data.

The medium 2000 and the electronic pen 1000 may variously correspond to each other. In FIG. 1, one medium 2000 is illustrated as corresponding to one electronic pen 1000, but the medium 2000 and the electronic pen 1000 may correspond to each other according to a corresponding relationship of 1:N or N:1.

In addition, in FIG. 1, one electronic pen 1000 is illustrated as corresponding to one electronic device 3000, but the electronic pen 1000 and the electronic device 3000 may correspond to each other according to a corresponding relationship of 1:N or N:1

Furthermore, in FIG. 1, the plurality of electronic devices 3000 are illustrated as being connected to one server 4000, but the system according to embodiments of the present invention may include two or more servers 4000.

Meanwhile, FIG. 1 illustrates that the electronic pen 1000 performs communication with the electronic device 3000, and the electronic device 3000 performs communication with the electronic pen 1000 and the server 4000, but if necessary, the electronic pen 1000 may perform communicate directly with the server 4000.

Next, the electronic pen 1000 according to embodiments of the present invention will be described.

Figure 3:
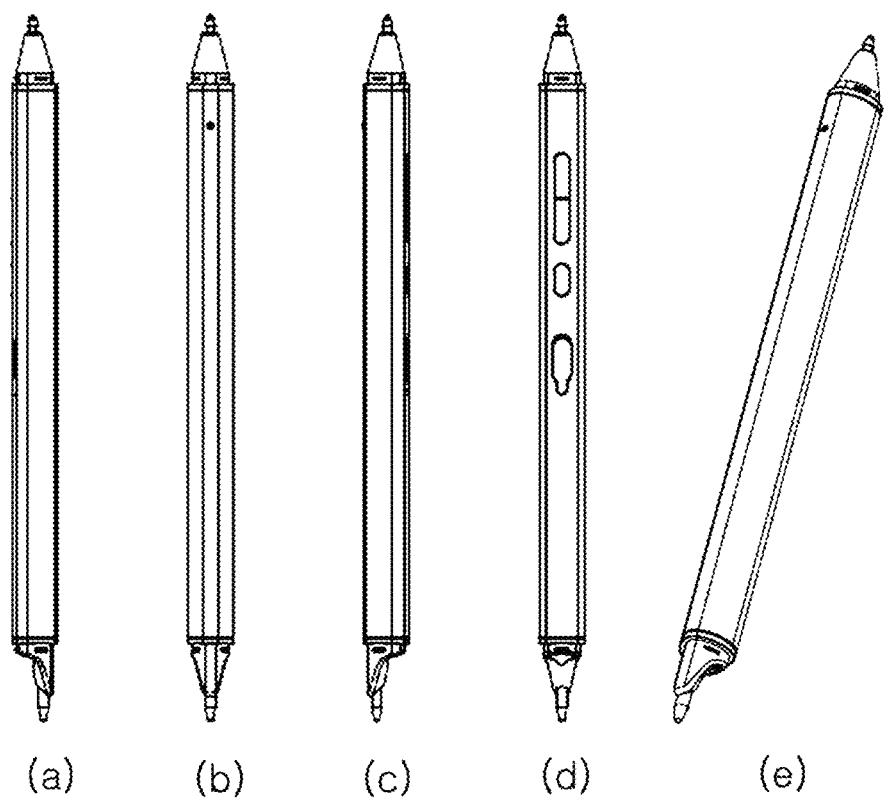
FIG. 3 shows diagrams illustrating an exemplary exterior of an electronic pen according to embodiments of the present invention.
Figure 4:
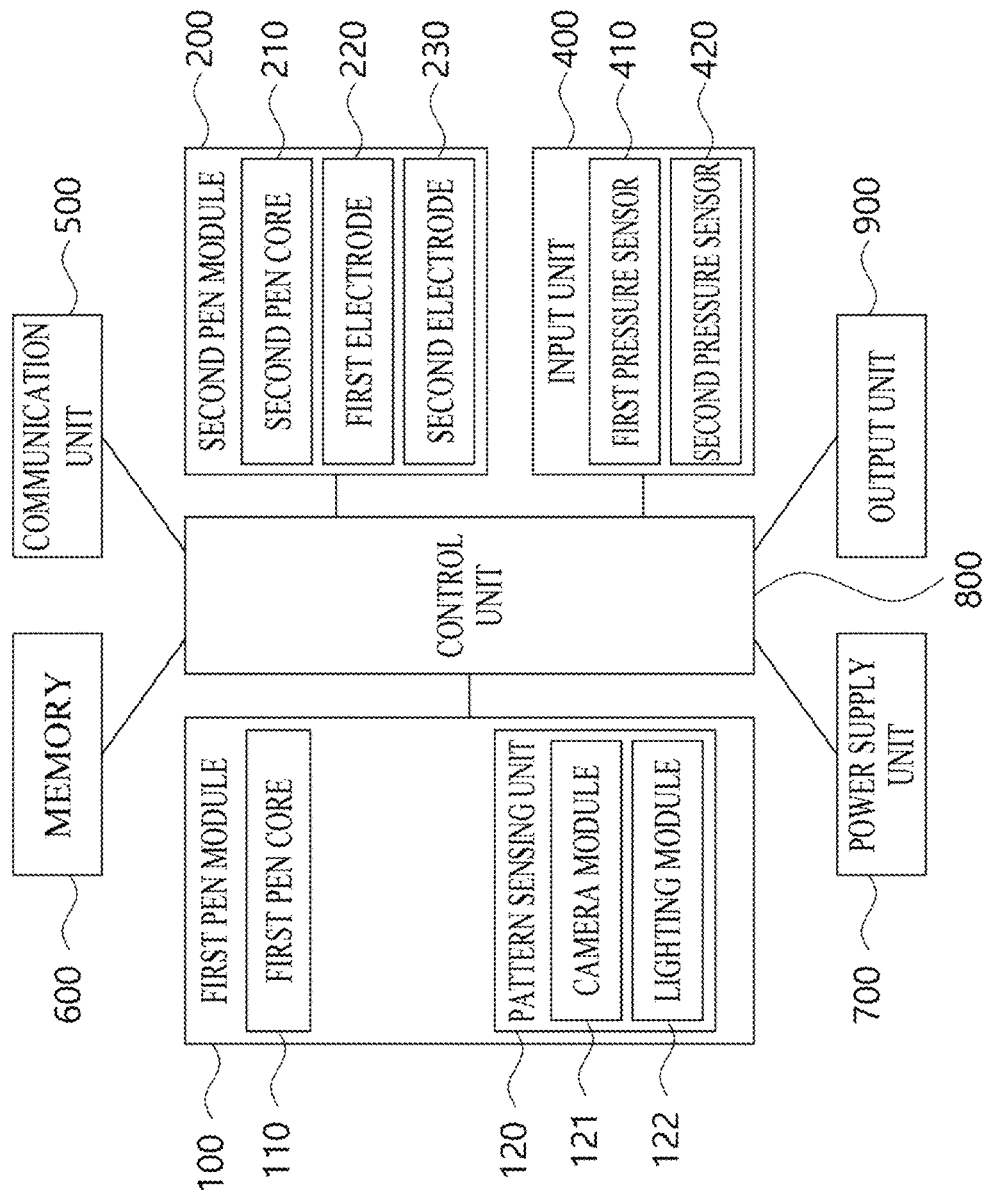
FIG. 4 is a block diagram for describing components of the electronic pen according to embodiments of the present invention.

FIG. 3 shows diagrams illustrating an exemplary exterior of an electronic pen according to embodiments of the present invention, and FIG. 4 is a block diagram for describing components of the electronic pen according to embodiments of the present invention.

Referring to FIG. 3, an electronic pen 1000 may mainly include a first pen core 110 which includes a writing material used for a medium 2000, a second pen core 210 in which a first electrode 220 for generating a first electric field is located, and a main body 300.

The main body 300 is a component that may be inserted to expose a part of the first pen core 110 and to support the first pen core 110. Here, the main body 300 may function as a grip that may be gripped by a user with a hand. In addition, the main body 300 may include components of the electronic pen 1000 therein, such as a power supply unit 700, a memory 600, and a communication unit.

Referring to FIG. 4, the electronic pen 1000 according to one embodiment of the present invention may include a first pen module 100, a second pen module 200, an input unit 400, an output unit 900, a communication unit 500, the memory 600, the power supply unit 700, and a control unit 800. However, since the components illustrated in FIG. 4 are not essential, the electronic pen 1000 may be implemented to include more components than the illustrated components or have fewer components than the illustrated components.

Hereinafter, each of the components of the electronic pen 1000 will be described.

The electronic pen 1000 may write on a medium 2000 through the first pen module 100. In addition, the electronic pen 1000 may acquire first location information through the first pen module 100. Here, the first location information is location information of the electronic pen 1000 with respect to the medium 2000. More specifically, the first location information is location information of the electronic pen 1000 at a specific time point with respect to the medium 2000. The first location information will be described in more detail in the operation of the electronic pen 1000.

Meanwhile, the first location information may include at least one of rotation information, acceleration information, and information on a location change over time of the electronic pen 1000.

The first pen module 100 may include the first pen core 110 and a pattern sensing unit 120. Here, the components of the first pen module 100 may be provided to be physically spaced apart from each other.

The first pen core 110 is a component that enables writing on the medium 2000. The first pen core 110 may include a first pen tip which is located at a first end portion of the first pen core 110 and contacts in direct with the medium 2000 for writing and a first pen rod which is located in a direction opposite to the first end portion and is inserted into the main body 300 so that the first pen core 110 is supported. Here, the first pen rod 112 may include a writing material.

Various materials which enable writing on the medium 2000 may be used as the writing materials. According to one embodiment of the present invention, the writing material may include a ball and ink, and the ink may include various inks such as an oil-based ink, a water-based ink, and a neutral ink. According to another embodiment of the present invention, the writing material may be a graphite core used for a pencil.

Alternatively, according to still another embodiment of the present invention, when writing does not need to be visually displayed, the writing material may be omitted.

The first pen rod 112 may be made of various materials which can support the first pen core 110. According to one embodiment of the present invention, the first pen rod 112 may be made of plastic. According to another embodiment of the present invention, the first pen rod 112 may be made of a metal.

According to one embodiment of the present invention, the first pen core 110 may be made of graphite. In this case, a user may not only write on the medium 2000 through the first pen core 110 but also provide an electric field to an input surface of an electronic device 3000 through the first pen core 110.

The pattern sensing unit 120 may detect a location of the electronic pen 1000 with respect to the medium 2000. For example, the pattern sensing unit 120 may detect a code pattern in which location information for determining the location of the electronic pen 1000 with respect to the medium 2000 is encoded. In addition, for example, the pattern sensing unit 120 may detect an amount of a change in relative location of the electronic pen 1000 with respect to the medium 2000. To this end, the pattern sensing unit 120 includes a camera module 121 and a lighting module 122.

The camera module 121 may acquire an image of a code pattern provided to the medium 2000. While the electronic pen 1000 moves according to a user's writing or the like on the medium 2000, the camera module 121 may acquire an image of a partial area of the code pattern provided to the medium 2000 based on a preset time interval. Thus, according to a method of analyzing a code pattern to be described below, the electronic pen 1000 may analyze information on a unit cell included in the acquired image to analyze a location of the electronic pen 1000 with respect to the medium 2000 in the form of coordinates.

Meanwhile, while the electronic pen 1000 moves according to a user's writing or the like on the medium 2000, the camera module 121 may acquire an image based on light reflected from the medium 2000 based on a preset time interval. Specifically, the camera module 121 may acquire an image of a reflection pattern of at least a partial area of the medium 2000 by receiving light reflected according to a material or a surface condition of the medium 2000. Here, the reflection pattern may include a pattern that varies for each irradiation area due to light being irregularly reflected according to a non-uniform surface due to a material or component of the medium 2000 and foreign materials when light is irradiated onto the medium 2000. Accordingly, the electronic pen 1000 may track a change in relative location of the electronic pen 1000 by comparing and analyzing images based on reflected light acquired by the camera module 121 over time.

Here, the preset time interval may be variously provided. According to an example, the camera module 121 may acquire an image of the code pattern every $1/60^{th}$ of a second. According to another example, the camera module 121 may acquire an image of the code pattern every $1/240^{th}$ of a second. According to still another example, the camera module 121 may acquire an image based on light reflected from the medium 2000 every $1/4,000^{th}$ of a second. Here, the image of the code pattern or the image based on the reflected light of the medium 2000 may be defined as a handwritten image.

The lighting module 122 may irradiate light having a preset specific wavelength toward the medium 2000 such that an image of an image reflection pattern with respect to a code pattern may be acquired through the camera module 121. The code pattern provided to the medium 2000 according to the embodiment of the present invention may be printed using an ink that absorbs infrared light. In this case, the lighting module 122 may irradiate light, which has a wavelength well absorbed by the ink, onto the medium 2000. In this case, the camera module 121 may be configured to capture an image in an infrared band, and to this end, the camera module 121 may include an infrared filter that selectively transmits only the infrared band.

According to another embodiment of the present invention, as a wavelength of light irradiated by the lighting module 122 becomes longer, a pattern reflected by the medium 2000 becomes easier to analyze. Thus, the lighting module 122 may irradiate light in a visible or infrared band. In this case, the camera module 121 may be configured to receive light corresponding to a wavelength of light irradiated by the lighting module 122 and may include a filter that selectively transmits only the light corresponding to the wavelength.

The electronic device 3000 may acquire second location information through the second pen module 200. Here, the second location information is location information of the electronic pen 1000 with respect to the electronic device 3000.

The second pen module 200 may include the first electrode 220 and the second pen core 210. In addition, the second pen module 200 may further include a second electrode. Here, the components of the second pen module 200 may be provided to be physically connected to each other.

The first electrode 220 may generate the first electric field used for the electronic device 3000 to acquire location information of the electronic pen 1000. More specifically, the first electrode 220 may generate the first electric field. Here, when the second pen core 210 is placed on the input surface of the electronic device 3000, the first electric field may cross the input surface. In this case, the electronic device may detect the first electric field and may acquire the second location information based on a location at which the first electric field is detected. Here, the second location information indicates a location of the electronic pen 1000 with respect to the electronic device 3000. More specifically, the second location information is location information of the electronic pen 1000 at a specific time point with respect to the electronic device 3000.

The first electrode 220 may generate the first electric field having a first effective distance. The first effective distance is a distance to a point to which the first electric field is effectively transmitted from the first electrode 220. The first effective distance may be variously set within a range in which the electronic device 3000 can determine a movement of the first electrode 220. According to one embodiment of the present invention, the first effective distance may be in a range of 0 cm to 3 cm. According to another embodiment of the present invention, the first effective distance may be in a range of 0 cm to 1.5 cm. The determining of the location of the electronic pen 1000 will be described in detail below.

The second pen core 210 is a component that provides the first electric field to the electronic device 3000 through the input surface of the electronic device 3000. Here, the first electrode 220 may be located in the second pen core 210. Here, the second pen core 210 may be made of a conductive material, and thus, the first electric field generated by the first electrode 220 may be provided to the input surface of the electronic device 3000 through the second pen core 210.

More specifically, the first electrode 220 may be located at a first end portion of the second pen core 210 which is exposed to the outside, thereby allowing the user and the electronic device 3000 to interact with each other. In this case, the first end portion of the second pen core 210 may have a sharp shape like a pen to allow the user to control the electronic pen 1000 at high precision. However, the location of the first electrode 220 is not limited to the end portion of the second pen core 210, and the first electrode 220 may be located without limitation as long as the first electrode 220 may be located in the second pen module 200 to provide the first electric field to the input surface of the electronic device 3000.

Here, the electronic device 3000 may acquire the location information of the electronic pen 1000 with respect to the electronic device 3000 through the electronic pen 1000 having a form in which the first electrode 220 and the second pen core 210 are combined. According to one embodiment of the present invention, the second pen core 210 may be omitted, and there may be provided an electronic pen that provides an electric field to the input surface of the electronic device 3000 through the first electrode 220. However, even in this case, when the first electrode 220 is located at one end portion of the electronic pen 1000 like a pen core of a general pen so that writing is performed in a general writing style, the first electrode 220 may be considered to function as the second pen core. That is, even though the first electrode 220 is integrated with the second pen core 210 and used, when the first electrode 220 functions like a pen core of a general pen, it may be considered that the first electrode 220 includes the first electrode 220 and the second pen core 220.

A user may provide an electric field to the electronic device 3000 by bringing the second pen core 210 of the electronic pen 1000 in proximity to the input surface of the electronic device 3000. That is, by using the electronic pen 1000 in a manner similar to a writing manner of a general pen, a user's aversion to the electronic pen 1000 can be reduced.

Here, the proximity to the input surface means that the second pen core 210 is brought into direct contact with the input surface as well as that the second pen core 210 being spaced apart from the input surface by the first effective distance in which the first electric field may be transmitted to the input surface.

The second pen core 210 may be made of a material that is more ductile than the input surface. In this case, the second pen core 210 may be made of silicone, rubber, plastic, nylon, a fluoroelastomer, conductive or dielectric foam, any other suitable materials, or a combination of materials.

Meanwhile, the second pen core 210 may include a resonance circuit in place of the first electrode 220 or together with the first electrode 220. Here, the resonance circuit may include an LC resonance circuit including an inductor and a capacitor. When the electronic device 3000 operates as an electro-magnetic resonance (EMR) type, the resonance circuit may generate a current by a magnetic field formed from the electronic device 3000 and may emit the current again as a magnetic field having a resonant frequency. More specifically, the resonant circuit may include an inductor and a capacitor, and a current may be generated in the inductor by a magnetic field formed from the electronic device 3000 and may be charged in the capacitor, and then, the charged current may be emitted again in the form of a magnetic field through the inductor. In this case, the electronic device 3000 may detect the magnetic field provided from the resonance circuit of the electronic pen 1000 to acquire the second location information of the electronic pen 1000.

The second electrode 230 may generate a second electric field used to acquire angle information. Here, the angle information indicates an angle of the electronic pen 1000 with respect to the input surface of the electronic device 3000.

More specifically, the second electrode 230 may generate the second electric field having a second effective distance.

In this case, the second effective distance may be longer than the first effective distance of the first electric field. Here, a power consumed by the second electrode may be greater than a power consumed by the first electrode.

Here, the second electrode 230 may be disposed to be spaced apart from the first electrode 220 along a central axis of the main body 300 in the direction of the first pen core 110. More specifically, the second electrode 230 may be disposed at a location that is farther from a first end portion of the main body 300 than the first electrode 220 and that is close to a second end portion of the main body 300. Here, the second electrode 230 may be disposed inside the second pen core 210 or may be disposed in the second pen module 200 outside the second pen core 210. More specifically, the second electrode 230 may be disposed between the first electrode 220 and a second pressure sensor 420.

According to one embodiment of the present invention, the electronic device may detect the second electric field and may determine an angle of the electronic pen 1000 based on a location at which the second electric field is detected. More specifically, a spacing distance between the first electrode 220 and the second electrode 230 is fixed without change, but a distance is changed between the location at which the first electric field acquired from the electronic device 3000 is detected and the location at which the second electric field is detected. Therefore, the electronic device 3000 may determine the angle of the electronic pen 1000 with respect to the input surface based on a trigonometric identity.

According to another embodiment of the present invention, the electronic pen 1000 may determine an angle of the electronic pen 1000 by itself. More specifically, when the first electrode 220 and the second electrode 230 of the electronic pen 1000 receive electrical signals from the electronic device 3000, the electronic pen 1000 may determine an angle of the electronic pen 1000 based on the above-described method of determining the angle of the electronic pen 1000.

The main body 300 may be a component that supports or fixes the components of the electronic pen 1000 and may mean a type of grip that may be gripped by a user with his or her hand.

The main body 300 may be provided as various types as long as the first pen module 100 may be disposed therein and the second pen module 200 may be fixed thereto.

The main body 300 may include the first end portion, the second end portion, and a cavity.

Here, the communication unit 500, the memory 600, the power supply unit 700, and the control unit 800 of the electronic pen 1000 may be located in the cavity of the main body 300.

The first pen module 100 may be disposed at the first end portion of the main body 300. Here, the first end portion may include a first pen core 110 accommodating part in which the first pen core 110 is accommodated and a light transmitting member 304 through which infrared light may pass.

The second pen module 200 may be fixed to the second end portion of the main body 300.

According to one embodiment of the present invention, a part of the first pen core 110 may be inserted into the first end portion of the main body 300 so as to be exposed so that the first pen core 110 is supported, and the second pen core 210 may be disposed at the second end portion of the main body 300 located in a direction opposite to the first end portion.

According to another embodiment of the present invention, the main body 300 may include a first main body on which the first pen core 110 may be supported and a second main body in which the second pen core 110 may be disposed. Here, the second main body may be provided in a form attachable to or detachable from the first main body. In this case, the first main body and the second main body may be electrically connected through a universal serial bus (USB) port. In addition, the first main body and the second main body may be mechanically connected through an interference fitting structure or a frictional force due to an insertion.

Here, a part of the first pen core 110 may be inserted into a first end portion of the first main body so as to be exposed so that the first pen core 110 is supported, and a first connector may be provided at a second end portion of the first main body. The second pen module 200 may be fixed to a third end portion of the second main body, and a second connector may be provided at a fourth end portion of the second main body. In this case, the first connector and the second connector may be coupled through female-male coupling. More specifically, the first connector may be a USB female terminal, and the second connector may be a USB male terminal.

Since the first main body and the second main body are electrically connected through the USB port, the control unit 800 located in the first main body may control power supply to components located in the first main body and may also control power supply to components located in the second main body.

According to one embodiment of the present invention, even when the control unit 800 is located in the first main body, the control unit 800 may control power supply to the pattern sensing unit 120 located in the first main body and may also control power supply to the second pen module located in the second main body. The power supply will be described in detail below.

In addition, since the first main body and the second main body are electrically connected through the USB port, the communication unit 500 located in the first main body may control communication of the components located in the first main body and may also control communication of the components located in the second main body. According to one embodiment of the present invention, even when the communication unit 500 is located in the first main body, the communication unit 500 may transmit pen data generated by the control unit located in the first main body to the electronic device 3000 and may also transmit stylus data generated by the second pen module located in the second main body to the electronic device 3000. A communication method will be described in detail below.

The detailed structure of the main body 300 will be described with respect to the structure of the electronic pen 1000.

The input unit 400 may receive a user input from a user. The user input may be performed as various types such as a button input, a key input, a touch input, a voice input, and a movement of the electronic pen 1000. For example, the electronic pen 1000 may control power-on/off of the electronic pen 1000 by receiving a button input from the user.

The input unit 400 may be provided as various types. That is, the input unit 400 may be a comprehensive concept which includes all of traditional types of a button and a jog wheel as well as a touch sensor configured to detects a user's touch, a microphone configured to receive a voice signal, a camera configured to recognize a gesture or the like through image recognition, a proximity sensor including an illuminance sensor or infrared sensor configured to detect user approach, a motion sensor configured to recognize a user's motion through a gyro sensor or the like, and various types of input units configured to detect or receive various other types of user inputs.

The input unit 400 may include a power button 401 and a function button 402. The power button 401 and the function button 402 will be described in detail below.

In addition, the input unit 400 may sense a variety of information. Here, the variety of information may be used to generate a control signal for controlling the operation of the electronic pen 1000 and may be used to generate pen data generated by the electronic pen 1000. The variety of information sensed through the input unit 400 may be provided to the electronic device 3000 or the server 4000.

Here, the input unit 400 may include a pressure sensor, a pen core sensor, and an acceleration sensor.

The pressure sensor may sense a pressure applied to a pen core. The pressure sensor may include a first pressure sensor 410 that senses a pressure applied to the first pen core 110.

According to one embodiment of the present invention, the first pressure sensor 410 may sense a pressure applied to the first pen core 110 which is generated at the time of writing on the medium 2000.

According to another embodiment of the present invention, the first pressure sensor 410 may sense a pressure applied to the first pen core 110 which is generated when the electronic pen 1000 writes on a surface rather than the medium 2000. Here, when a pressure value is obtained in the first pressure sensor but an image of a code pattern or an image based on reflected light is not acquired through the pattern sensing unit 120, the electronic pen 1000 may determine gesture execution of the electronic pen 1000 as a trigger signal.

The pressure sensor may include a second pressure sensor 420 that senses a pressure applied to the second pen core 210. According to one embodiment of the present invention, the second pressure sensor may sense a pressure applied to the second pen core 210 when the electronic pen 1000 is brought into contact with the input surface of the electronic device 3000. According to another embodiment of the present invention, the second pressure sensor 420 may sense a pressure applied to the second pen core 210 which is generated when the electronic pen 1000 writes on a surface rather than the input surface of the electronic device 3000. Here, when a pressure value is obtained in the second pressure sensor but information from the electronic device 3000 is not transmitted, the electronic pen 1000 may determine gesture execution of the electronic pen 1000 as a trigger signal.

The pressure sensor may sense a pressure value by measuring an applied force based on a resistance value generated due to deformation by the force.

According to one embodiment of the present invention, when a user writes using the electronic pen 1000, the electronic pen 1000 is brought into contact with the medium 2000, and pressure is generated. In this case, the generated pressure may be sensed by the first pressure sensor 410. Here, the first pressure sensor 410 may be connected to the first pen rod 112 of the first pen core 110 mounted on the electronic pen 1000 to sense pressure. The electronic pen 1000 may use a pressure value sensed through the first pressure sensor 410 to generate pen data. In this case, the pressure value included in the pen data is processed into first pressure information that is pressure information on a pressure applied to the medium 2000 by a user at the time of writing, thereby being used in reproducing content handwritten by the user. In addition, according to one embodiment of the present invention, a signal output through the first pressure sensor 410 may be used as a trigger signal for turning a state of the electronic pen 1000 on. In addition, the signal output through the first pressure sensor 410 may also be used as a trigger signal for executing a gesture of the electronic pen 1000.

According to another embodiment of the present invention, when a user inputs information to the electronic device 3000 using the electronic pen 1000, the electronic pen 1000 is brought into contact with the input surface of the electronic device 3000, and pressure is generated. In this case, the generated pressure may be sensed by the second pressure sensor 420. Here, the second pressure sensor 420 may be disposed inside the second pen module 200 to sense a pressure applied to the second pen core 210. In the electronic pen 1000, a pressure value sensed through the second pressure sensor 420 is processed into second pressure information that is pressure information on a pressure applied to the input surface of the electronic device 3000 by the user, thereby being used for the electronic device 3000 to process data input by the electronic pen 1000. Here, the second pressure information may be included in stylus data and transmitted to the electronic device 3000.

In addition, a signal output through the second pressure sensor 420 may be used as a trigger signal for executing a gesture of the electronic pen 1000. In addition, the signal output through the second pressure sensor 420 may also be used as a trigger signal for executing a gesture of the electronic pen 1000.

The pen core sensor may detect a pen core identifier for indicating a type of the first pen core 110 mounted on the electronic pen 1000. For example, the pen core identifier for indicating a color of the first pen core 110 may be provided outside the first pen core 110 mounted on the electronic pen 1000, and in this case, the pen core sensor may detect the pen core identifier through an optical method/magnetic method or various other available methods. A value sensed by the pen core sensor or information on a pen core analyzed from the sensed value may be provided to the electronic device 3000, and the electronic device 3000 may use the received information to reproduce content handwritten by a user.

The acceleration sensor is a sensor used to determine whether to automatically change the electronic pen 1000 in an on state into an off state. The acceleration sensor may detect a state of the electronic pen 1000. Whether the electronic pen 1000 moves may be detected through the acceleration sensor. When it is determined that the electronic pen 1000 does not move for a preset time based on a value sensed through the acceleration sensor, the electronic pen 1000 may be automatically changed to the off state.

An attachment detecting sensor is a sensor used to determine whether a pen is in use. The attachment detecting sensor may detect whether the electronic pen 1000 is attached to or detached from the electronic device 3000. According to one embodiment of the present invention, it is possible to detect whether the electronic pen 1000 is attached to the electronic device 3000 through the attachment detecting sensor.

A magnetic sensor is a sensor used to determine whether a pen is in use. The magnetic sensor may detect whether a cap 310 is inserted on the electronic pen 1000. According to one embodiment of the present invention, the cap 310 attached to the electronic pen 1000 may be sensed by sensing a magnet of the cap 310 through the magnetic sensor. The cap 310 will be described in detail below.

The output unit 900 may provide a variety of information to a user. The output unit 900 may be provided as various types. The output unit 900 should be interpreted as a comprehensive concept that includes all of various types of output units.

According to one embodiment of the present invention, it is possible to provide a display that outputs visible light perceivable through a sense of sight of a user. Here, the output unit 900 may include a display for providing information on an operation state of the electronic pen 1000 to the user. Here, the display may refer to a first display 901 installed adjacent to the first end portion of the main body 300 and a second display 902 installed adjacent to the second end portion of the main body 300. In addition, the first display 901 and the second display 902 may each include a light-emitting diode (LED) lamp.

According to another embodiment of the present invention, it is possible to provide a speaker that outputs a sound perceivable through an auditory sense of a user. Here, the electronic pen 1000 may include a buzzer that provides information to the user on whether to turn power on or whether to turn power off. In this case, the buzzer may output a preset sound.

According to still another embodiment of the present invention, it is possible to provide a haptic device perceivable through a tactile sense of a user.

The cap 310 may have a predetermined inner space into which the first end portion or the second end portion of the main body 300 is inserted so as to protect the first pen core 110 or the second pen core 210.

The cap 310 may be provided with the magnet. Here, the magnet provided in the cap 310 may be sensed by the attachment detecting sensor. In this case, according to whether the cap 310 is inserted on the first end portion or the second end portion of the main body 300, power supply may be changed. The power supply based on the insertion of the cap 310 will be described in detail below.

The memory 600 may store a variety of information. The memory 600 may temporarily or semi-permanently store data. An operating program such as firmware for driving the electronic pen 1000 may be stored in the memory 600. The memory 600 may store information, commands, and data necessary for driving the electronic pen 1000, such as pen data generated by the electronic pen 1000 and a pressure value output by the input unit 400. Details of the variety of information stored in the memory 600 will be described below.

The memory 600 may be provided as various types. Examples of the memory 600 may include a flash memory, a read only memory (ROM), and a random access memory (RAM).

The power supply unit 700 may provide power required for the operation of each of the components of the electronic pen 1000. More specifically, according to one embodiment of the present invention, the power supply unit 700 may supply power to the control unit 800. According to another embodiment of the present invention, the power supply unit 700 may supply power to the first pen module 100. According to still another embodiment of the present invention, the power supply unit 700 may supply power to the second pen module 200.

The power supply unit 700 may be provided as various types. According to one embodiment of the present invention, the power supply unit 700 may be implemented as a rechargeable battery 710. In this case, when the communication unit 500 of the electronic pen 1000 includes a charging port, and when the electronic pen 1000 is connected to the electronic device 3000 or an external power source through the charging port, power may be supplied from the electronic device 3000 or the external power source, and accordingly, the battery 710 may be charged. According to another embodiment of the present invention, the power supply unit 700 may be implemented as a replaceable battery 710.

The control unit 800 controls the overall operation of the electronic pen 1000. To this end, the control unit 800 may compute and process various types of information and may control the operations of the components of the electronic pen 1000.

In addition, the control unit 800 may analyze an image of a code pattern acquired by the pattern sensing unit 120 to decode pieces of information encoded in a unit cell included in the acquired image of the code pattern. Furthermore, the control unit 800 may acquire location coordinates of the electronic pen 1000 with respect to the medium 200 and identification information on the medium 2000 (for example, book information or page information) from the decoded information.

The control unit 800 may generate pen data based on pieces of information acquired by decoding the pieces of information encoded in the unit cell. As described above, the generated pen data may be stored in the memory 600 or may be transmitted to at least one of the electronic device 3000 and the server 4000 through the communication unit 500.

Alternatively, the control unit 800 may analyze an image of a reflection pattern acquired by the pattern sensing unit 120 and may acquire data on a location change of the electronic pen 1000 over time to store the acquired data on the location change in the memory 600 or transmit the acquired data on the location change to at least one of the electronic device 3000 and the server 4000 through the communication unit 500.

The control unit 800 may control the generation of at least one of the first electric field generated by the first electrode 220 and the second electric field generated by the second electrode 230.

The control unit 800 may generate stylus data based on an electrical signal generated through the second pen module 200. The stylus data may include angle information and the second pressure information.

More specifically, the control unit 800 may generate the second pressure information based on a pressure value sensed by the second pressure sensor 420.

In addition, the angle information may be generated based on electrical signals of the electronic device 3000 received by the first electrode 220 and the second electrode 230.

Here, the control unit 800 may transmit the stylus data to at least one of the electronic device 3000 and the server 4000 through at least one of the first electrode 220, the second electrode 230, and the communication unit 500. The communication unit 500 will be described in detail below.

The control unit 800 may control power supply to the components of the electronic pen 1000. Here, the control unit 800 may control a degree of power supplied from the power supply unit 700 based on a state of the electronic pen 1000.

The control unit 800 may include a power management integrated circuit. The power management integrated circuit may perform various functions for power management of the electronic pen 1000. According to one embodiment of the present invention, the power management integrated circuit may boost or drop a direct current (DC) voltage. In this case, the power management integrated circuit may supply various voltages required by the components of the electronic pen 1000. According to another embodiment of the present invention, the power management integrated circuit may charge the battery 710. According to still another embodiment of the present invention, the power management integrated circuit may control an amount of a current transmitted to the components of the electronic pen 1000. The control of the power supply will be described in detail below. According to yet another embodiment of the present invention, the power management integrated circuit may control power transmitted to each of the components of the electronic pen 1000, thereby changing power consumed by the first pen module 100 and the second pen module 200.

The control unit 800 may include a first control unit which controls the general operation of the electronic pen 1000 and a second control unit which analyzes an image acquired by the pattern sensing unit 120, decodes information necessary for a unit cell, and generates the above-described pen data. In addition, the control unit 800 may further include a third control unit which generates an electrical signal used to generate an electric field.

In this case, the control unit 800 may be logically divided into the first control unit, the second control unit, and the third control unit and may also be implemented in a form in which the first control unit, the second control unit, and the third control unit are physically separated from each other.

The control unit 800 may be implemented as a computer or a device similar thereto according to hardware, software, or a combination thereof.

A hardware-type control unit 800 may be provided in the form of an electronic circuit which performs a control function by processing an electrical signal. A software-type control unit 800 may be provided in the form of a program which drives the hardware-type control unit 800.

Meanwhile, in the following description, unless otherwise specified, the operation of the electronic pen 1000 may be interpreted as being performed under control of the control unit 800.

The communication unit 500 may perform communication with an external device. For example, the electronic pen 1000 may perform communication with at least one of the electronic device 3000 and the server 4000 through the communication unit 500. Here, the electronic pen 1000 may transmit and receive various types of information to and from the external device. According to one embodiment of the present invention, the electronic pen 1000 may transmit and receive information to and from the electronic device 3000 through the communication unit 500. According to another embodiment of the present invention, the electronic pen 1000 may transmit and receive information to and from the server 4000 through the communication unit 500.

More specifically, the electronic pen 1000 may transmit pen data generated by the electronic pen 1000 to at least one of the electronic device 3000 and the server 4000 through the communication unit 500. In addition, the electronic pen 1000 may not only provide stylus data to the electronic device 3000 through the second pen module 200 but also transmit the stylus data to at least one of the electronic device 3000 and the server 4000 through the communication unit 500.

That is, the electronic pen 1000 may transmit the pen data and the stylus data to at least one of the electronic device 3000 and the server 4000 through one communication unit 500.

A method of transmitting pen data and stylus data of the communication unit 500 may be variously set. According to one embodiment of the present invention, while the pen data is transmitted to the electronic device 3000 through the communication unit 500, when the stylus data is transmitted to the electronic device 3000 through the communication unit 500, the electronic pen 1000 may first transmit the stylus data that is input later and then may transmit the pen data that is being transmitted first. According to another embodiment of the present invention, while the pen data is transmitted to the electronic device 3000 through the communication unit 500, when the stylus data is transmitted to the electronic device 3000 through the communication unit 500, the electronic pen 1000 may first transmit the pen data that is being transmitted first, and then transmit the stylus data that is input later.

In addition, according to still another embodiment of the present invention, while the stylus data is transmitted to the electronic device 3000 through the communication unit 500, when the pen data is transmitted to the electronic device 3000 through the communication unit 500, the electronic pen 1000 may first transmit the stylus data that is input first and then may transmit the pen data that is input later. According to yet another embodiment of the present invention, while the stylus data is transmitted to the electronic device 3000 through the communication unit 500, when the pen data is transmitted to the electronic device 3000 through the communication unit 500, the electronic pen 1000 may first transmit the pen data that is input later and then may transmit the stylus data that is input first.

Here, the above-described contents of the transmission of the pen data or stylus data to the electronic device 3000 may also be applied to the transmission of the pen data or stylus data to the server 4000.

In addition, the electronic pen 1000 may receive at least one of commands and data for controlling the operation of the electronic pen 1000 or for providing necessary information to the electronic pen 1000 from at least one of the electronic device 3000 and the server 4000 through the communication unit 500.

The communication unit 500 may include a wired module and a wireless module.

The wired module is a module for transmitting and receiving data to and from the external devices in a wired manner. The wired module may include a component such as a USB port, a PS/2 port, a parallel port, or a serial port that may transmit and receive data to and from the external device. Furthermore, the wired module may include an Ethernet port or the like for accessing the Internet or the like through a local area network (LAN).

The wireless module may include a mobile communication module 3300 which transmits and receives data by accessing a mobile communication network through a mobile communication base station and a short-range communication module 3300 which uses a wireless local area network (WLAN) communication method such as Wi-Fi or a wireless personal area network (WPAN) communication method such as Bluetooth or Zigbee.

Next, the electronic device 3000 according to embodiments of the present invention will be described.

Figure 5:
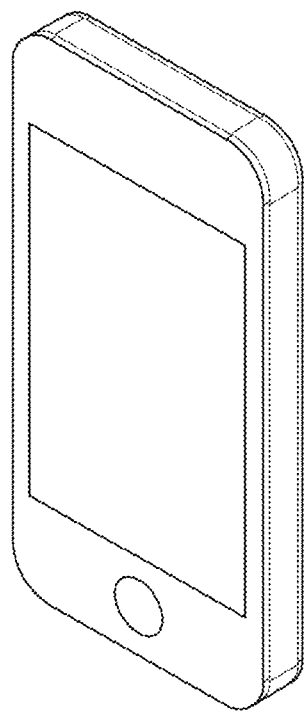
FIG. 5 is a diagram illustrating an exemplary exterior of an electronic device according to embodiments of the present invention.
Figure 6:
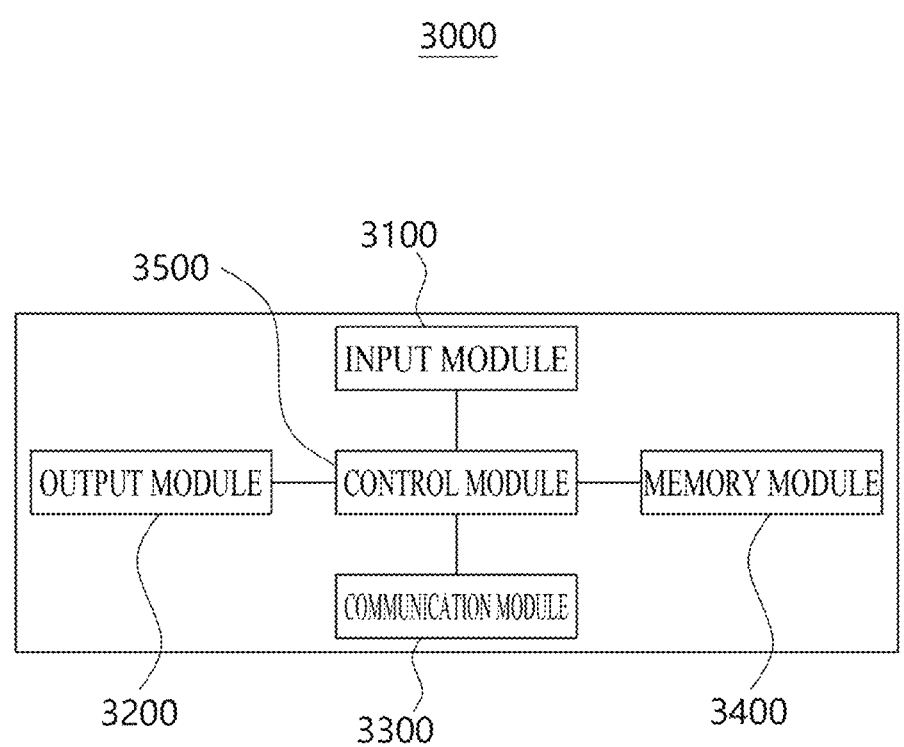
FIG. 6 is a block diagram for describing components of the electronic device according to embodiments of the present invention.

FIG. 5 is a diagram illustrating an exemplary exterior of an electronic device according to embodiments of the present invention, and FIG. 6 is a block diagram for describing components of the electronic device according to embodiments of the present invention.

Referring to FIGS. 5 and 6, an electronic device 3000 may include an input module 3100, an output module 3200, a communication module 3300, a memory module 3400, and a control module 3500. However, since the components illustrated in FIG. 6 are not essential, the electronic device 3000 may be implemented to include more components than the illustrated components or have fewer components than the illustrated components.

Hereinafter, each of the components of the electronic device 3000 will be described in sequence.

The input module 3100 may receive a user input from a user. The user input may be performed as various types of input such as a key input, a touch input, and a voice input. An example of the input module 3100 capable of receiving such a user input may be a comprehensive concept which includes all of traditional types of a keypad, keyboard, and a mouse as well as a touch sensor configured to detect a user's touch, a microphone configured to receive a voice signal, a camera configured to recognize a gesture or the like through image recognition, a proximity sensor including an illuminance sensor or infrared sensor configured to detect user approach, a motion sensor configured to recognize a user's motion through a gyro sensor or the like, and various types of input units configured to detect or receive various other types of user inputs.

The touch sensor may be located on an input surface of the electronic device 3000. Here, the touch sensor may be implemented as a piezoelectric or capacitive touch sensor which detects a touch through a touch panel or touch film attached to a display panel or may be implemented as an optical touch sensor which detects a touch through an optical method. Here, the capacitive touch sensor may be an active electrostatic touch sensor that includes a plurality of conducting wires to recognize a touch point to which an electrical signal is applied. When the electronic device 3000 includes the active electrostatic touch sensor, the electronic device 3000 may detect an electrical signal generated from an electronic pen 1000. More specifically, the touch sensor may receive a first electric field generated by a first electrode 220 included in a second pen module 200 of the electronic pen 1000. In addition, the touch sensor may receive a second electric field generated by a second electrode 230 included in the second pen module 200 of the electronic pen 1000.

Meanwhile, the electronic device 3000 may include an electromagnetic resonance touch sensor. Here, the electromagnetic resonance touch sensor may include a digitizer sensor substrate. Here, the digitizer sensor substrate may include a plurality of loop coils to emit a magnetic field and may detect an externally formed magnetic field. More specifically, the digitizer sensor substrate may include a plurality of loop coils configured to generate a magnetic field having a preset resonance frequency, may receive alternating current (AC) power to generate a magnetic field, and may detect a magnetic field formed by the electronic pen 1000 in response to the generated magnetic field, thereby acquiring second location information of the electronic pen 1000.

According to one embodiment of the present invention, the electronic device 3000 may determine the second location information by receiving the first electric field through the input module 3100.

According to one embodiment of the present invention, the electronic device 3000 may determine the second location information by detecting a magnetic field having a preset resonance frequency through the input module 3100.

According to one embodiment of the present invention, the electronic device 3000 may acquire angle information included in stylus data by receiving the second electric field through the input module 3100. According to another embodiment of the present invention, the electronic device 3000 may determine the angle information by receiving the second electric field through the input module 3100.

According to one embodiment of the present invention, the electronic device 3000 may acquire second pressure information included in stylus data by receiving the second electric field through the input module 3100.

The output module 3200 may output various types of information and provide the various types of information to a user. The output module 3200 is a comprehensive concept which includes all of a display configured to output visible light perceivable a sense of sight of the user, a speaker configured to output a sound perceivable through an auditory sense of the user, a haptic device configured to generate vibration perceivable through a tactile sense of the user, and various other types of input units.

The display is a broad concept which refers to image display devices including all of a liquid crystal display (LCD), a light-emitting diode (LED) display, an organic light-emitting diode (OLED) display, a flat panel display (FPD), a transparent display, a curved display, a flexible display, a three-dimensional (3D) display, a holographic display, a projector, and various other types of devices capable of performing an image output function. Such a display may be a type of a touch display integrated with the touch sensor of the input module 3100. That is, according to one embodiment of the present invention, the input module 3100 and the output module 3200 may be provided as independent components. According to another embodiment of the present invention, the input module 3100 and the output module 3200 may share a component which receives a user input from a user and outputs various types of information to provide the various types of information to the user.

The communication module 3300 may perform communication with an external device. For example, the electronic device 3000 may perform communication with the electronic pen 1000 or a server 4000 through the communication module 3300. Accordingly, the electronic device 3000 may transmit and receive various types of information to and from the external device. For example, the electronic device 3000 may receive pen data generated by the electronic pen 1000 through the communication module 3300 and may transmit necessary information to the electronic pen 1000. Here, the necessary information may include color information, line width information, brush type information, and the like of the electronic pen 1000, and each information will be described below.

In addition, the electronic device 3000 may transmit pen data received from the electronic pen 1000 and stroke data acquired by analyzing the pen data to at least one of another electronic device 3000 and the server 4000 through the communication module 3000 and may receive necessary information from at least one of another electronic device 3000 and the server 4000.

The communication module 3300 may be provided as a wired communication module 3300 including a LAN port for accessing the Internet or the like through a LAN, a USB port, a PS/2 port, a parallel port, a serial port, or the like, a mobile communication module 3300 for transmitting and receiving data by accessing a mobile communication network through a mobile communication base station, a short-range communication module 3300 using a WLAN communication method such as Wi-Fi or a WPAN communication method such as Bluetooth or Zigbee, a satellite communication module 3300 using a global navigation satellite system (GNSS) such as a global positioning system (GPS), or a combination thereof.

The memory module 3400 may store various types of information. The memory module 3400 may temporarily or semi-permanently store data. The memory module 3400 may store an operating system (OS) for driving the electronic device 3000. If necessary, the memory module 3400 may store various types of data received from the electronic pen 1000 and an application or the like for processing the various types of data received from the electronic pen 1000. The memory module 3400 may be provided as various types. Examples of the memory module 3400 may include a hard disk drive (HDD), a solid state disk (SSD), a flash memory, a ROM, a RAM, and the like.

The control module 3500 controls the overall operation of the electronic device 3000. To this end, the control module 3500 may compute and process various types of information and may control the operations of the components of the electronic device 3000.

The control module 3500 may be implemented as a computer or a device similar thereto according to hardware, software, or a combination thereof. A hardware-type control module 3500 may be provided in the form of an electronic circuit which performs a control function by processing an electrical signal. A software-type control module 3500 may be provided in the form of a program which drives the hardware-type control module 3500.

The control module 3500 may determine the second location information of the electronic pen 1000 based on the first electric field generated by the first electrode 220 of the electronic pen 1000. More specifically, when the first electric field is transmitted to the input module 3100 of the electronic device 3000 through the input surface of the electronic device 3000, the control module 3500 may determine the second location information that is location information of the electronic pen 1000 with respect to the electronic device 3000.

In addition, the control module 3500 may determine angle information of the electronic pen 1000 based on the first electric field generated by the first electrode 220 of the electronic pen 1000 and the second electric field generated by the second electrode 230.

The control module 3500 may determine information on the electronic pen 1000 using stylus pen data provided from the electronic pen 1000. Here, the control module 3500 may acquire first pressure information and second pressure information generated by the electronic pen 1000. In addition, when angle information is generated from a stylus, the control module 3500 may acquire the angle information generated from the stylus.

Meanwhile, in the following description, unless otherwise specified, the operation of the electronic device 3000 may be interpreted as being performed under control of the control module 3500.

Hereinafter, the operation of the electronic pen 1000 according to embodiments of the present invention will be described.

A user may write on a medium 2000 according to some embodiments of the present invention using the electronic pen 1000 according to embodiments of the present invention.

In addition, the electronic pen 1000 according to embodiments of the present invention may acquire an image of at least a partial area of a code pattern included in the medium 2000 according to some embodiments of the present invention and may acquire location information by analyzing information encoded in a unit cell included in the acquired image. While a user is writing, the electronic pen 1000 may continuously acquire an image of a code pattern and location information analyzed therefrom and may perform at least one of processing and storing thereon, thereby generating basic data for later analyzing along which trajectory the user has written on the medium 2000.

Hereinafter, a code pattern according to embodiments of the present invention, which allows location information or the like to be encoded, will be described first, and a method, in which the electronic pen 1000 analyzes location information or the like encoded in the code pattern using an image of the code pattern, will be described.

However, since the electronic pen 1000 according to embodiments of the present invention uses a commonly used pen core, it is not necessarily only possible to write on the medium 2000 according to some embodiments of the present invention, but it is also possible to write on a general medium (for example, paper on which a code pattern is not provided).

Meanwhile, in addition to a method of analyzing an image of a code pattern, the electronic pen 1000 according to embodiments of the present invention may irradiate light onto the medium 2000 and may compare and analyze pattern images of reflected light over time to acquire relative location information of the electronic pen 1000 with respect to the medium 2000, thereby generating basic data enabling an analysis of writing performed on the medium 2000 by a user.

A code pattern according to one embodiment of the present invention is formed in a manner in which one unit cell is repeatedly disposed in a two-dimensional manner according to a desired size.

Figure 7:
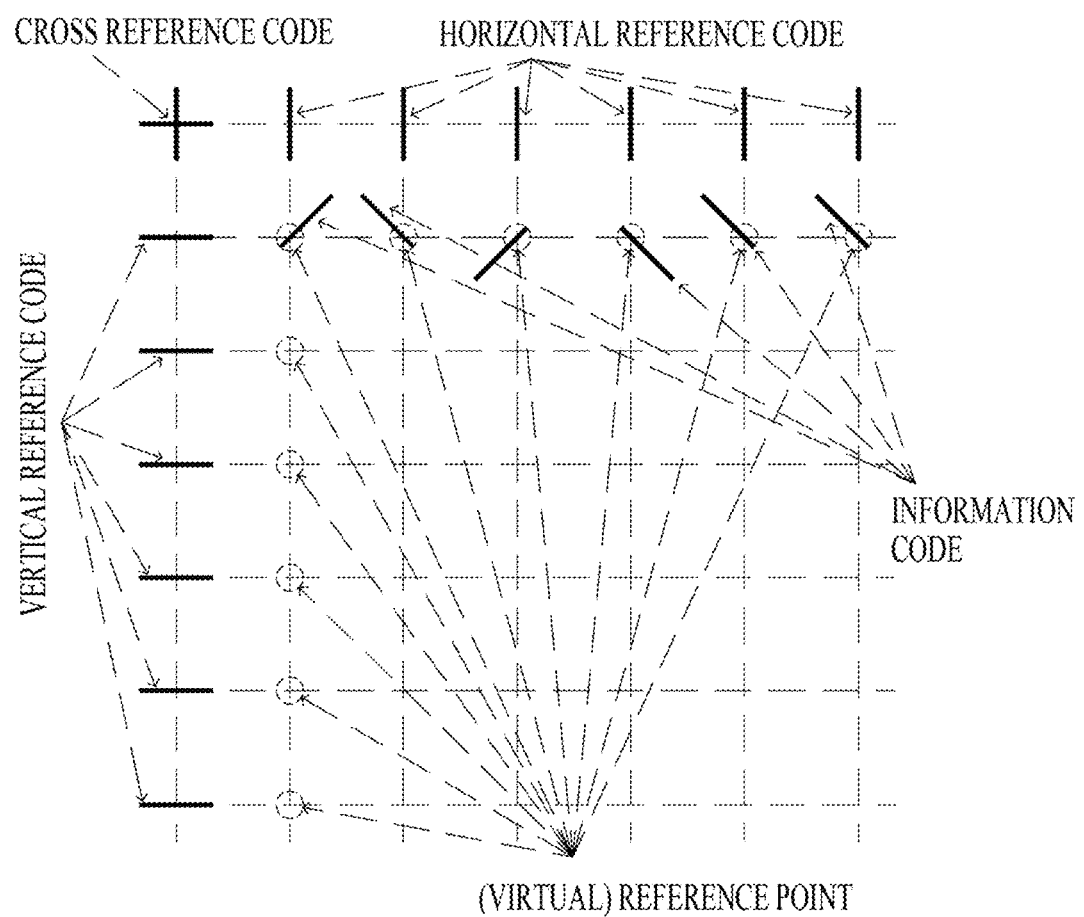
FIGS. 7 and 8 are exemplary diagrams illustrating unit cells constituting a code pattern according to one embodiment of the present invention.
Figure 8:
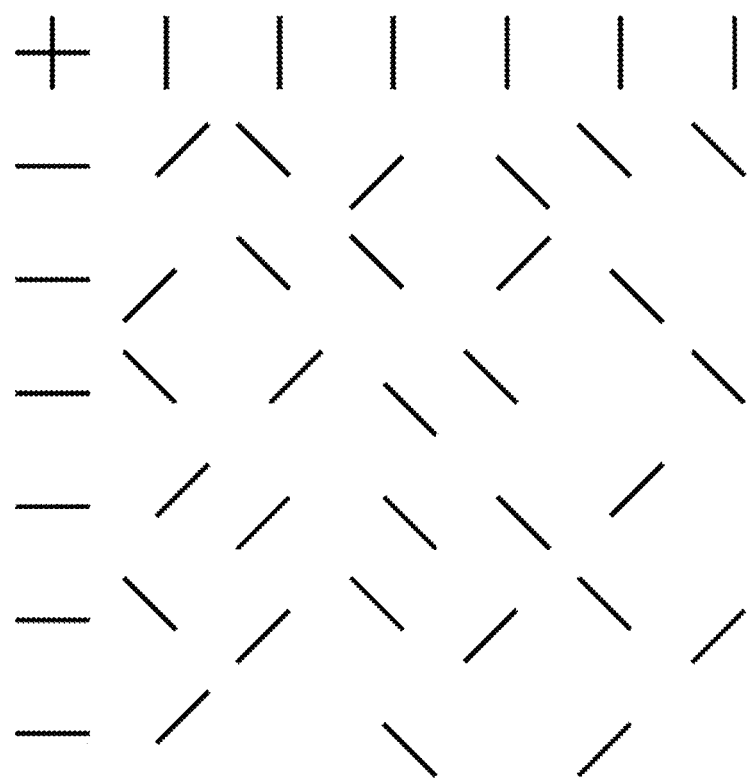

FIGS. 7 and 8 are exemplary diagrams illustrating unit cells constituting a code pattern according to one embodiment of the present invention.

Referring to FIGS. 7 and 8, each of the unit cells includes codes in the form of a line segment, and the codes in the form of the line segment may be mainly classified into reference codes and information codes.

The reference code includes a horizontal reference code, a vertical reference code, and a cross reference code.

When the code pattern is decoded, the reference code has a function of confirming an area of the unit cell.

The information code performs a function of indicating information to be encoded in the unit cell through a method to be described below.

The remaining reference codes excluding the cross reference codes and the information codes all have the same geometric shape. That is, the reference codes excluding the cross reference codes and the information codes have a rotationally symmetrical shape and have the form of a "line segment."

Unlike other reference codes and information codes, the cross reference code has a cross-like geometric shape.

Meanwhile, virtual lines may be defined in the unit cell and may include a plurality of horizontal virtual lines extending in a lateral direction and a plurality of vertical virtual lines extending in a vertical direction. In describing some embodiments of the present invention, a component referred to as the "virtual line" may be actually printed on a medium 2000 but may not be printed.

The plurality of horizontal virtual lines are parallel to each other and are disposed to be spaced apart from each other by a predetermined interval.

In addition, the plurality of vertical virtual lines are parallel to each other and are disposed to be spaced apart from each other by a predetermined interval.

Any one of the plurality of horizontal virtual lines is orthogonal to any one of the plurality of vertical virtual lines.

A plurality of crossing points are formed due to meetings between the plurality of horizontal virtual lines and the plurality of vertical virtual lines. Hereinafter, the plurality of crossing points will be referred to as virtual reference points. In describing some embodiments of the present invention, a component referred to as the "virtual point" may actually be printed on the medium 2000 but may not be printed.

Referring to FIG. 7, one unit cell is illustrated as having a total of seven horizontal virtual lines and a total of seven vertical virtual lines. Among the virtual lines, the horizontal reference codes are illustrated as being disposed on a horizontal virtual line disposed at the uppermost side, and the vertical reference codes are illustrated as being disposed on a vertical virtual line disposed at the leftmost side.

The reference codes are placed at the virtual reference points. In particular, the reference codes are disposed such that the center of mass thereof is located at the virtual reference point. That is, the horizontal reference codes and the vertical reference codes are disposed such that the virtual reference point may be located at a center between both ends of each of the reference codes. In addition, the cross reference code having a cross-like geometric shape is disposed such that a center of a cross is located at the virtual reference point.

The information codes are also disposed at the virtual reference point. In particular, unlike the reference codes, the information codes are disposed such that the center of mass thereof is not disposed at the virtual reference point. That is, the virtual reference point is not disposed at a center between both ends of the information codes. In the case of the information code, one end of both ends thereof is disposed near the virtual reference point, and the other end thereof is disposed at a location, which is determined according to a value to be encoded in a corresponding information code and which is different from that of the virtual reference point. This will be described in detail through a method of encoding information in the information codes.

The code pattern having the above-described shape and components is formed on the medium 2000, and the code pattern being actually formed on the medium 2000 may be implemented through a printing method or a method similar thereto. In this case, when the code pattern is printed on the medium 2000, as shown in FIG. 8, only the above-described reference code and information code may be printed. That is, among the above-described components constituting the code pattern, the horizontal virtual lines, the vertical virtual lines, and the virtual reference points may not be actually printed.

A basic principle of encoding information in the information code is to arrange one end of the information code near the virtual reference point, arrange the other end of the information code such that the information code passes through the virtual reference point, and encode desired information in the corresponding information code using a relationship from the one end to the other end.

That is, in a direction of the information code from one end of the information code (end disposed closer to the virtual reference point) to the other end thereof (end disposed farther away from the virtual reference point) (hereinafter, referred to as the direction of the information code), desired information is encoded in the corresponding information code.

A method of encoding information in the information code will be described in more detail. However, for convenience of description, a case in which information that may be encoded in one information code has two bits will be described as an example.

Figure 9:
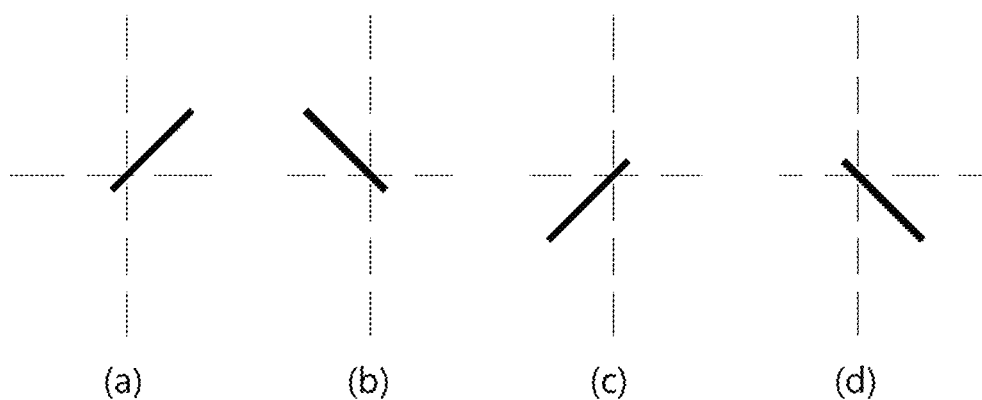
FIG. 9 shows diagrams for describing a method of encoding 2-bit information in an information code according to embodiments of the present invention.

FIG. 9 shows diagrams for describing a method of encoding 2-bit information in an information code according to embodiments of the present invention.

For clarity of description, it is assumed that an origin point is set at a virtual reference point at which an information code, in which information is to be encoded, is to be disposed, and an orthogonal coordinate system is defined in directions of horizontal and vertical reference codes provided in a unit cell.

In this case, when information to be encoded through an information code is "00," a direction of the information code may be determined such that one end of the information code (end located closer to the virtual reference point) is located on a third quadrant of the orthogonal coordinate system, and the other end thereof (end located farther away from the virtual reference point) is located on a first quadrant of the orthogonal coordinate system (see FIG. 9A).

When information to be encoded through an information code is "01," a direction of the information code may be determined such that one end of the information code (end located closer to the virtual reference point) is located on a fourth quadrant of the orthogonal coordinate system, and the other end thereof (end located farther away from the virtual reference point) is located on a second quadrant of the orthogonal coordinate system (see FIG. 9B).

In addition, when information to be encoded through an information code is "10," a direction of the information code may be determined such that one end of the information code (end located closer to the virtual reference point) is located on the first quadrant of the orthogonal coordinate system, and the other end thereof (end located farther away from the virtual reference point) is located on the third quadrant of the orthogonal coordinate system (see FIG. 9C).

Further more, when information to be encoded through an information code is "11," a direction of the information code may be determined such that one end of the information code (end located closer to the virtual reference point) is located on the second quadrant of the orthogonal coordinate system, and the other end thereof (end located farther away from the virtual reference point) is located on the fourth quadrant of the orthogonal coordinate system (see FIG. 9D).

Figure 36:
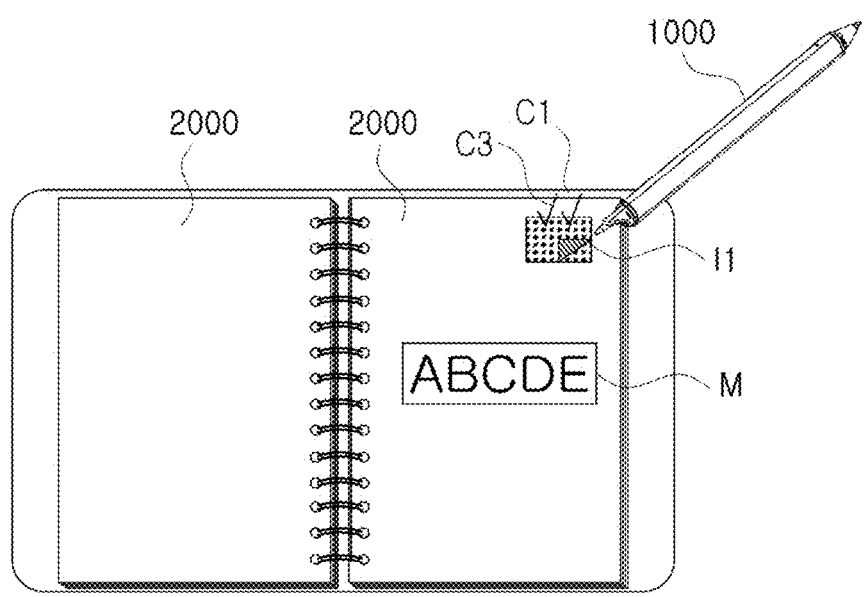

When, as shown in FIG. 9, an information code is designed such that 2-bit information may be encoded in the information code, and when, as shown in FIGS. 7 and 8, 36 information codes are included in one unit cell, information that may be encoded in one unit cell may have 2 bits×36=72 bits.

However, in a method of encoding information in an information code according to embodiments of the present invention, information may be encoded in a direction from one end of an information code (for example, an end located closer to the virtual reference point) to the other end of the information code (for example, an end located farther away from the virtual reference point), and the number of bits of information that may be encoded in the information code is not limited to two bits and may be three bits or more. For example, when a direction of an information code is interpreted in a unit of 45° in order to encode information in the information code, there are a total of eight distinct directions of the information code. Therefore, a total of three bits of information may be encoded in one information code.

Next, pieces of information encoded in the unit cell will be described.

Unit cell information encoded in the unit cell may include error verification information, identification information of a medium 2000, coordinate information, other additional information, icon information, and the like.

The error verification information is information for determining whether an error has occurred during encoding of a unit cell.

The identification information of the medium 2000 is identification information on the medium 2000 to which the unit cell is provided. The identification information of the medium 2000 may include book information, page information, and the like.

When a plurality of media 2000 are manufactured in a form such as a notebook or a book, the book information refers to identification information assigned to the corresponding note or book.

When the plurality of media 2000 are manufactured in a form such as a notebook or a book, the page information refers to information for identifying on which page the medium 2000 provided with the unit cell is located in the notebook or book.

In order for a specific function to be additionally executed only on a partial area of the medium 2000, the icon information means identification information assigned only to the corresponding partial area. Here, when a unit cell, in which the icon information including a specific function is encoded, is decoded, the specific function may be executed in at least one of an electronic pen 1000 and an electronic device 3000. Here, when a unit cell to which the icon information is assigned is detected through a pattern sensing unit 120, the electronic device 3000 may execute a specific function corresponding to the icon information.

In addition, when the medium 2000 is implemented to have a special format according to a special purpose (for example, paper including a checklist for a security check, test paper, or the like), the identification information of the medium 2000 may include information for identifying what format the corresponding medium 2000 has.

The coordinate information refers to two-dimensional coordinate information of the unit cell on the medium 2000. Accordingly, the coordinate information may include an x-coordinate and a y-coordinate.

Other additional information may include various other pieces of necessary information. For example, license information on a coordinate code provided to the medium 2000 may be included in the other additional information.

As described above, the electronic pen 1000 may analyze at least one unit cell included in an image acquired through the pattern sensing unit 120 and may decode information encoded in the corresponding unit cell to acquire unit cell information, thereby acquiring the identification information of the medium 2000, first coordinate information, and other additional information included in the unit cell information.

Next, a method in which the electronic pen 1000 generates pen data based on unit cell information will be described.

The pen data may include unit cell information acquired by the electronic pen 1000 and writing trajectory information used to generate stroke data necessary for reproducing a user's writing trajectory in real time or for replaying the user's writing trajectory later.

The pen data may include time information, first pressure information, first location information, first color information, and the identification information of the medium 2000.

The time information is information on a time point at which an image used to generate one piece of unit pen data is acquired or a time point at which one unit pen data is generated. That is, when the first location information refers to location information of the electronic pen 1000 with respect to the medium 2000 at one time point, the pen data may be classified based on the first location information over time.

The first pressure information is pressure information output from a first pressure sensor 410 at a time point at which an image used to generate one unit pen data is acquired or at a time point at which one unit pen data is generated.

The first color information is information on a stroke color written by the electronic pen 1000 which is recognized by a control unit 800. More specifically, since a first pen core 110 of the electronic pen 1000 is provided as that of a general ink pen or the like, a color written in the medium 2000 may not be changed without replacing the pen core. However, according to one embodiment of the present invention, a stroke color of the first pen data stored in a memory 600 of the electronic pen 1000 may be changed based on a setting change of the electronic device 3000. According to another embodiment of the present invention, a stroke color transmitted to the electronic device 3000 may be changed based on the setting change of the electronic device 3000.

Since the identification information of the medium 2000 and memo information are the same as or similar to the information included in the unit cell information, detailed descriptions thereof will be omitted.

The first location information is information on a location of the electronic pen 1000 with respect to the medium 2000, which is generated by performing a correction operation required for coordinate information acquired from the unit cell information. The first location information may or may not match the coordinate information acquired from the unit cell information, and a method of generating the first location information will be described in detail below.

Figure 10:
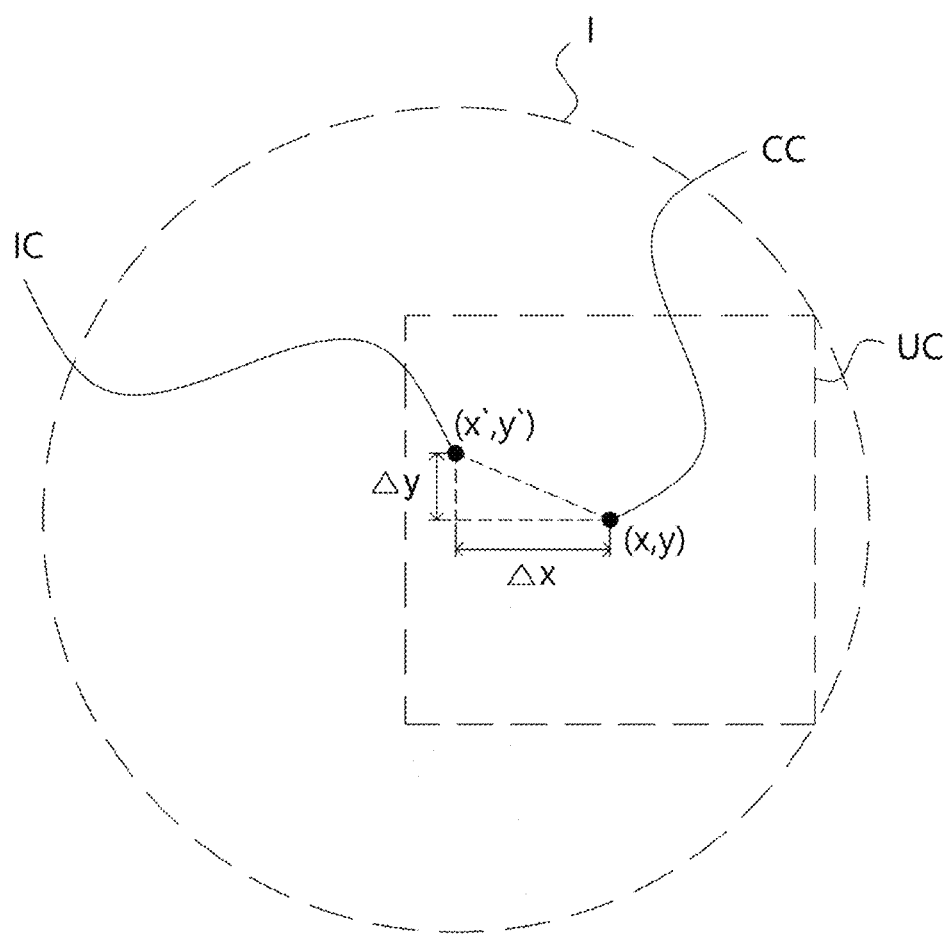
FIG. 10 is a diagram for describing a method of generating location information of an electronic pen with respect to a medium according to embodiments of the present invention.

FIG. 10 is a diagram for describing a method of generating location information of an electronic pen 1000 with respect to a medium 2000 according to embodiments of the present invention.

Referring to FIG. 10, an image I acquired by a camera module 121 of the electronic pen 1000 is illustrated as an example. As shown in FIG. 10, the acquired image I may include at least one unit cell UC, and a location CC of the unit cell UC may be obtained in the form of coordinates by analyzing information encoded in the unit cell through the above-described method. In this case, as shown, since the unit cell UC used to analyze coordinate information may not be located at a center of the acquired image I, coordinate information acquired by analyzing the unit cell UC may be slightly different from an exact location of the electronic pen 1000 with respect to the medium 2000. That is, it may be assumed that a center IC of the acquired image I is closest to the location of the electronic pen 1000 with respect to the medium 2000, and the center IC of the acquired image I may be different from coordinates (x,y) acquired from the coordinate information acquired from the unit cell UC.

Accordingly, in order to acquire coordinates (x',y') of the center IC of the acquired image I, the electronic pen 1000 calculates an offset between the coordinate information acquired from the unit cell UC and the center IC of the acquired image I and adds or subtracts calculated offset values $\Delta x$ and $\Delta y$ to or from information on the coordinates (x,y) acquired from the unit cell UC, thereby calculating the coordinates (x',y') of the center IC of the acquired image I.

The location of the electronic pen 1000 with respect to the medium 2000 can be more accurately calculated through the above-described method, and values of the coordinates (x',y') corrected through the above-described method are the above-described location information.

Meanwhile, although not shown in the drawing, the electronic pen 1000 may compare and analyze reflection pattern images to acquire location information of the electronic pen 1000 with respect to the medium 2000. Specifically, the electronic pen 1000 may perform an image processing process of appropriately adjusting a color contrast value on a plurality of periodically acquired reflection pattern images through a digital signal processor (DSP) and then may compare and analyze the processed images over time, thereby acquiring location information such as a location change amount, a relative location movement, or the like of the electronic pen 1000.

As described above, the electronic pen 1000 may continuously generate pen data, and accordingly, a location movement of the electronic pen 1000 with respect to the medium 2000 may be recorded in the form of the pen data in real time according to a user's writing. The pen data may be appropriately processed as needed by an electronic device 3000 or a server 4000 as needed later.

Power supplied to the electronic pen 1000 may be changed based on a user input received by an input unit 400. More specifically, a control unit 800 may control power supplied from a battery 710 to each component of the electronic pen 1000 based on a state of the electronic pen 1000. According to one embodiment of the present invention, the control unit 800 may control power supplied to a first pen module 100 based on first pressure information sensed by a first pressure sensor 410. According to another embodiment of the present invention, the control unit 800 may control power supplied to a second pen module 200 based on second pressure information sensed by a second pressure sensor 420. According to still another embodiment of the present invention, the control unit 800 may control power supplied to at least one of the first pen module 100 and the second pen module 200 based on whether a cap 310 is inserted.

Power supplied to the electronic pen 1000 may be changed according to a state of the electronic pen 1000. More specifically, a power supply unit 700 may supply power to each of the components of the electronic pen 1000. Here, the control unit 800 may determine to which component power is supplied according to a state of the electronic pen 1000. For example, the control unit 800 may supply power to the components of the electronic pen 1000 included in the second pen module 200 but may not supply power to the components of the electronic pen 1000 included in the first pen module 100. The state change of the electronic pen 1000 will be described in detail below.

The electronic pen 1000 may have an on state in which power is supplied to the components of the electronic pen 1000 by the battery 710 and an off state in which power is not supplied to the components of the electronic pen 1000. Here, the off state may refer to a state of the electronic pen 1000 other than the on state. Here, the state of the electronic pen 1000 may be variously changed based on at least one of an input sensed by the input unit 400 and a time at which the input is acquired.

The on state may be started through various methods.

According to one embodiment of the present invention, the on state may be started when at least one of the first pressure sensor 410 and the second pressure sensor 420 senses a pressure value. According to another embodiment of the present invention, the on state may be started when an attachment detecting sensor detects detachment of the electronic pen 1000 from the electronic device 3000.

According to still another embodiment of the present invention, the on state may be started when the attachment detecting sensor detects that the cap 310 inserted on a first end portion of a main body 300 is removed from the first end portion.

According to yet another embodiment of the present invention, the on state may be started when the attachment detecting sensor detects that the cap 310 inserted on a second end portion of the main body 300 is removed from the second end portion.

The on state may be variously classified according to a degree in which power is supplied to the components of the electronic pen 1000. Here, as a voltage supplied from the power supply unit 700 is changed, power transmitted to the first pen module 100 and the second pen module 200 of the electronic pen 1000 may be changed.

The on state may be classified into various states according to whether power is supplied to each of the components of the electronic pen 1000. Here, power transmitted to the first pen module 100 and the second pen module 200 of the electronic pen may be changed according to whether power is transmitted to each component of the electronic pen 1000 while a voltage supplied from the power supply unit 700 is constantly maintained.

According to one embodiment of the present invention, the control unit 800 classifies the state of the electronic pen 1000 based on a user input and may control power supplied to the first pen module 100 based on the classified state of the electronic pen 1000. According to another embodiment of the present invention, the control unit 800 may classify the state of the electronic pen 1000 based on a user input and may control power supplied to the second pen module 100 based on the classified state of the electronic pen 1000.

The on state of the electronic pen 1000 may include a first state that is an operation state in which the electronic pen 1000 operates, a second state that is a standby state in which an input is not provided to the electronic pen 1000 for a first time after the first state, and a third state that is an idle state in which an input is not provided to the electronic pen 1000 for a second time, which is longer than the first time, after the second state. Here, since the first state, the second state, and the third state are not essential, the electronic pen 1000 may be implemented to have more states than the described states or fewer states than the described states. Here, the first time is a time for which a first pen input is not provided to the electronic pen 1000 after the on state of the first pen module 100 is started.

The first pen input is a user input related to the first pen module. Here, the first pen input may include at least one of pressure value acquisition of the first pressure sensor 410, handwritten image acquisition of a pattern sensing unit 120, a user input through the input unit 400, and a user input to the electronic device 3000 through a communication unit 500.

The state of the electronic pen 1000 may be variously applied to the components of the electronic pen 1000. More specifically, the same state may be applied to the components of the electronic pen 1000 but different states may also be applied thereto. According to one embodiment of the present invention, the pattern sensing unit 120 may operate in the first state, but a first electrode may operate in the third state. According to another embodiment of the present invention, the components included in the first pen module may operate in the first state, but the components including the second pen module may operate in the second state.

Conditions necessary for a state change may be different according to components. The conditions necessary for the state change will be described in detail below. Of course, when a condition, which is necessary for changing a state of one component into an on state, is satisfied, all the components of the electronic pen 1000 may be changed to an on state.

Here, the components of the electronic pen 1000 may be grouped so that a state thereof may be changed. More specifically, a state may not be changed for each component, but each component may be organized into a preset group so that a state thereof may be changed.

According to one embodiment of the present invention, components required to generate pen data may be organized into a first group, and components required to provide stylus data to the electronic device 3000 may be organized into a second group. Here, a component included in both the first group and the second group may be present, but the first group and the second group may not include a shared component. For example, the pattern sensing unit 120, a memory 600, the control unit 800, and the communication unit 500 may be formed in the first group, and a first electrode 220, a second electrode 230, the control unit 800, and the communication unit 500 may be formed in the second group.

The off state may be started through various methods. According to one embodiment of the present invention, after a preset time has elapsed in the third state, the electronic pen 1000 may be changed to the off state. Here, the preset time may be variously set. For example, the preset time may be set to ten minutes. Of course, when the power supply unit 700 is discharged, the electronic pen 1000 is changed to the off state.

There may be a component to which power is always supplied. According to one embodiment of the present invention, in order to sense a user input, unless the battery 710 is discharged, power is supplied to the input unit 400 so that the input unit 400 may be maintained in an on state. According to another embodiment of the present invention, for a quick response, unless the battery 710 is discharged, power may be supplied to the second pen module 200 so that the second pen module 200 may be maintained in an on state.

An on state and an off state may be applied independently for each component. According to one embodiment of the present invention, the first pen module 100 may operate in an on state, but the second pen module 200 may operate in an off state. According to another embodiment of the present invention, the first pen module 100 may operate in an off state, but the second pen module 200 may operate in an on state.

Power supplied to the components of the electronic pen 1000 may be variously changed. Here, the supplied power may be supplied based on the state of the electronic pen 1000. Since the state of the electronic pen 1000 has been described in detail above, conditions necessary for a state change will be described below.

Conditions necessary for a state change of the electronic pen 1000 may be variously set. More specifically, the state of the electronic pen 1000 may be changed based on an input that is input to the electronic pen 1000. For example, the conditions necessary for the state change may be set based on at least one of the input unit 400, the communication unit 500, and the cap 310.

Here, conditions necessary for a state change may be variously provided for each component of the electronic pen 1000.

A state of the first pen module 100 may be changed based on various conditions.

Here, the state of the first pen module 100 may be variously changed based on at least one of a pressure value sensed by the first pressure sensor, a time at which the first pressure sensor acquires the pressure value, whether the attachment detecting sensor detects attachment or detachment, and whether a magnetic sensor is inserted into the cap 310.

An on state of the first pen module 100 may be started through various methods. According to one embodiment of the present invention, the on state of the first pen module 100 may be started when the first pressure sensor 410 senses a pressure value. According to another embodiment of the present invention, the on state of the first pen module 100 may be started when the attachment detecting sensor detects the detachment of the electronic pen 1000 from the electronic device 3000. According to still another embodiment of the present invention, the on state of the first pen module 100 may be started when the magnetic sensor detects that the cap 310 inserted on the first end portion of the main body 300 is removed from the first end portion.

The on state of the first pen module may include various states. Here, power supplied to the pattern sensing unit may be changed according to types of the on state of the electronic pen 1000.

The on state may include a first state that is an operation state. The first state may be a state in which power is supplied to all components necessary for acquiring a handwritten image. More specifically, the first state may be a state in which power is supplied to the camera module 121, a lighting module 122, and the first pressure sensor 410.

Here, the first state may be a state in which a first time has not elapsed without a first pen input being provided after the on state is started. The first time may be variously set. More specifically, the first time may be a preset time, and the first time may be changed according to user's setting. A length of the first time may be variously provided. Here, as the first time is set to be shorter, the battery 710 may economically supply power. In addition, as the first time is set to be longer, the convenience of the user's writing may be increased.

The first pen input is a user input related to the first pen module. Here, the first pen input may include at least one of pressure value acquisition of the first pressure sensor 410, handwritten image acquisition of the pattern sensing unit 120, a user input through the input unit 400, and a user input to the electronic device 3000 through the communication unit 500.

The on state may include a second state that is a standby state. The second state may be a state in which power is supplied to some components required to acquire a handwritten image and may be a state that consumes less power than the first state. More specifically, the first state may be a state in which power is supplied to the camera module 121 or the lighting module 122 and power is supplied to the first pressure sensor 410.

Here, the second state is a state set when, after the first state, the first time has elapsed and a second time has not elapsed. Here, the second time may be variously set. More specifically, the second time may be a preset time, and the second time may be changed according to user's setting. A length of the second time may be variously provided.

In the second state, the control unit 800 may reduce power supplied to the first pen module 100 from the power supply unit 700 so as to be smaller than power supplied to the first pen module 100 in the first state.

The on state may include a third state that is an idle state. The third state may be a state in which power is supplied to some components required to acquire a handwritten image and may be a state that consumes less power than the second state. More specifically, the first state may be a state in which power is not supplied to the camera module 121 and the lighting module 122 and power is supplied to the first pressure sensor 410. As power is supplied to the first pressure sensor 410, the control unit 800 may determine whether the on state of the electronic pen 1000 is started.

Here, the third state is a state set when, after the second state, the second time has elapsed and a state is not an off state. In the third state, the control unit 800 may reduce power supplied to the first pen module 100 from the power supply unit 700 so as to be smaller than power supplied to the first pen module 100 in the second state.

Here, the state of the first pen module 100 may be variously applied according to the components of the first pen module 100. More specifically, states of the camera module 121, the lighting module 122, and the first pressure sensor 410 may be applied differently.

An off state is a state in which power is not supplied to the first pen module 100. More specifically, in the off state, the control unit 800 may cut off power supplied to the first pen module 100 from the power supply 700. Here, in the off state, power may not be supplied to the first pressure sensor 410. However, when the cap 310 is removed, power may be supplied to the first pressure sensor 410.

In addition, the above-described contents of the power management and state change of the first pen module 100 may also be applied to the power management and state change of the input unit 400, an output unit 900, and the communication unit 500.

Conditions necessary for a state change of the second pen module 200 may be variously provided. Here, a state of the second pen module 200 may be variously changed based on at least one of a pressure value sensed by the second pressure sensor 420, a time at which the second pressure sensor acquires the pressure value, whether the attachment detecting sensor detects attachment or detachment, whether the magnetic sensor is inserted into the cap 310, and an electrical signal received by the second pen module 200 from the electronic device 3000.

An on state of the second pen module 200 may be started through various methods. According to one embodiment of the present invention, the on state of the second pen module 200 may be started when the second pressure sensor 420 senses a pressure value. According to another embodiment of the present invention, the on state of the second pen module 200 may be started when the second pen module 200 receives an electrical signal from the electronic device 3000. According to still another embodiment of the present invention, the on state of the second pen module 200 may be started when the attachment detecting sensor detects the detachment of the electronic pen 1000 from the electronic device 3000. According to yet another embodiment of the present invention, the on state of the second pen module 200 may be started when the attachment detecting sensor detects that the cap 310 inserted on the second end portion of the main body 300 is removed from the second end portion. According to yet another embodiment of the present invention, the on state of the second pen module 200 may be maintained unless the battery 710 is discharged.

The on state of the second pen module 200 may include various states. Here, power supplied to the second pen module 200 may be changed according to types of the on state of the electronic pen 1000.

The on state may include a first state that is an operation state. The first state may be a state in which power is supplied to all components required to generate an electric field. More specifically, the first state may be a state in which power is supplied to the first electrode 220 and the second electrode 230.

Figure 11:
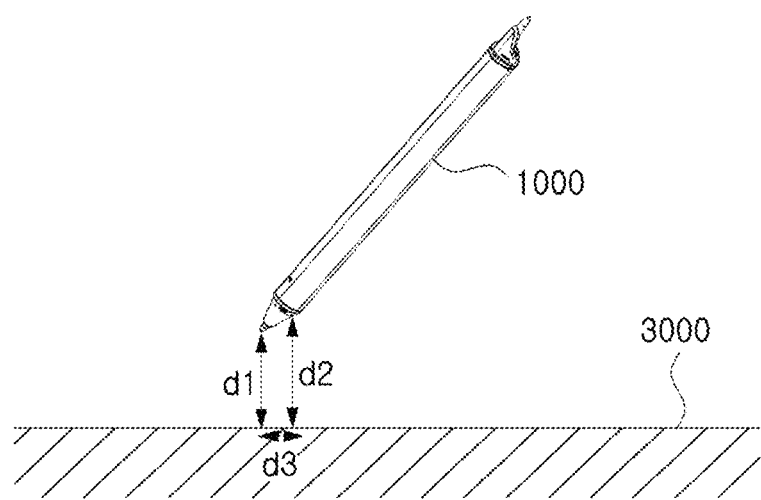
FIG. 11 is a diagram for describing a state change of an electronic pen according to embodiments of the present invention.

FIG. 11 is a diagram for describing a state change of an electronic pen according to embodiments of the present invention.

Referring to FIG. 11, a state of the electronic pen 1000 may be changed based on at least one of a first distance d1 between a first electrode 220 and an input surface of an electronic device 3000 and a second distance d2 between a second electrode 230 and the input surface of the electronic device 3000.

An on state may include at least one of a first state that is an operation state, a second state that is a standby state, and a third state that is an idle state. Here, the on state may be changed based on a distance between a second pen module 200 and the input surface of the electronic device 3000. According to one embodiment of the present invention, a state of the second pen module 200 may be changed based on whether a first electric field having a first effective distance generated by the first electrode 220 is transmitted to the input surface. More specifically, the state of the second pen module 200 may be changed by comparing the first distance d1, which is a distance between the first electrode 220 and the input surface of the electronic device 3000, with a length of the first effective distance.

According to another embodiment of the present invention, the state of the second pen module 200 may be changed based on a pressure value sensed from a second pressure sensor.

The first state of the second pen module 200 is a state in which a third time has not elapsed without a second pen input being provided after the on state is started. The third time is a time for which the second pen input is not provided to the electronic pen 1000 after the on state of the second pen module 200 is started.

The second pen input may include at least one of pressure value acquisition of a second pressure sensor 420, signal acquisition of the electronic device 3000 through the second pen module 200, a user input through an input unit 400, and a user input through a communication unit 500. Here, the second pen input may further include acquisition of a response signal for the first electric field and acquisition of a response signal for a second electric field. Here, second pressure information due to the pressure value acquisition of the second pressure sensor 420, response information on the first electric field generated based on the response signal for the first electric field, and response information on the second electric field generated based on the response signal for the second electric field may be defined as proximity information.

The first distance is a distance between the first electrode 220 and the input surface of the electronic device 3000. Here, the first distance may be variously provided. As the first distance is increased, a reaction speed of the electronic device 3000 with respect to the electronic pen 1000 may be increased. According to one embodiment of the present invention, the first distance may be a distance greater than 0 cm and less than 3 cm. In addition, the third time may be variously provided. According to one embodiment of the present invention, the third time may be 30 seconds.

An on state may include a second state that is a standby state. The second state may be a state in which power is supplied to some components required to generate an electric field. More specifically, the second state may be a state in which power is supplied to the first electrode 220 or the second electrode 230. Here, power consumed in the second state may be smaller than power consumed in the first state.

The second state of the second pen module 200 is a state set when, after the first state, the second pen input is not provided to the second pen module 200 within the third time or a fourth time. The fourth time is a time for which the second pen input is not provided to the electronic pen 1000 after the on state of the second pen module 200 is started.

Here, the fourth time may be variously set. More specifically, the fourth time may be a preset time, and the fourth time may be changed according to user's setting. A length of the fourth time may be variously provided. Here, the fourth time may be set to be longer than the third time.

The on state may include a third state that is an idle state. The third state may be a state in which power supplied to the second pen module is further reduced as compared with the second state. More specifically, the third state may be a state in which power is supplied to the first electrode 220 or the second electrode 230. Here, in the third state, a control unit 800 may supply power to the first electrode 220 or the second electrode 230 at a predetermined time interval.

In addition, in the third state, power may not be supplied to the second pressure sensor 420.

The third state of the second pen module 200 is a state set when, after the second state, the fourth time has elapsed and the second pen input is not provided.

Hereinafter, information stored in the electronic pen and a method of storing information will be described in detail.

A memory 600 may store preferred colors. In this case, a user may designate a preferred color of the electronic pen 1000 in the electronic device 3000. The preferred color may be variously designated. For example, a preferred color may be the same in a first pen module 100 and the second pen module 200. For another example, in the electronic pen 1000, a preferred color of the first pen module 100 and a preferred color of the second pen module 200 may be different.

According to one embodiment of the present invention, when a preferred color is set, a color recognized as a used color of the first pen module 100, which is first input after the electronic pen 1000 is turned on, may be designated as the preferred color.

According to another embodiment of the present invention, when a preferred color is set, a color recognized as a used color of the second pen module 200, which is first input after the electronic pen 1000 is turned on, may be designated as the preferred color.

According to still another embodiment of the present invention, when a preferred color is set, and when an input for selecting a preferred color is generated from the electronic pen 1000, a set color of the electronic pen 1000 may be changed into the preferred color. In this case, the input for selecting the preferred color may be a preset gesture. The preset gesture may be variously provided. According to one embodiment, the preset gesture may be an operation of applying a pressure to any one of a first pressure sensor 410 and the second pressure sensor 420. According to another embodiment, the preset gesture may be an operation of applying an input to a button of the input unit 400.

The memory 600 may store a variety of pen type information used in the first pen module 100 and the second pen module. The pen type information is information used for the electronic device 3000 to implement writing input to a medium 2000 through the first pen module 100 and information used for the electronic device 3000 to implement writing input to the electronic device 3000 through the second pen module 200. Here, the pen type information may include pen color information, brush type information, pen width information, and twisting information.

The brush type information is information on a shape of a writing trajectory of the electronic pen 1000 which is acquired by the electronic device 3000. Here, a form of a brush type may be variously provided. For example, the brush type may be provided in various forms such as a stroke form, a spray form, a brush form, and a pencil form. In addition, a shape of the brush type may be variously provided. For example, the brush type may be provided in various shapes such as a circular shape, a quadrangular shape, and a triangular shape.

The pen width information is width information on an input of the electronic pen 1000. Here, the pen width information may be variously provided.

Here, the twisting information is information on twisting of the electronic pen 1000 and is information used for the electronic device 3000 to express a writing trajectory of the electronic pen 1000. More specifically, when the electronic device 3000 acquires location information of the electronic pen 1000 with respect to the electronic device 3000, the twisting of the electronic pen 1000 may be determined based on a location difference between the first electrode 220 and the second electrode 230. According to one embodiment of the present invention, in a state in which the electronic pen 1000 is located to be inclined with respect to the input surface of the electronic device 3000 and a second pen core 210 is brought into contact with the input surface of the electronic device 3000, the electronic pen 1000 may be rotated. In this case, a location of the input surface of the electronic device 3000, which receives the first electric field, is constant, but a location of the input surface of the electronic device 3000, which receives the second electric field, varies. Thus, the twisting information for determining the twisting of the electronic pen 1000 may be generated by the control unit 800 and stored in the memory 600.

The memory 600 may store at least one of pieces of color information used in the first pen module 100 and the second pen module 200.

According to one embodiment of the present invention, the memory 600 may store information on a color most recently used in the first pen module 100. The most recently used color may be a color used by the first pen module 100 in the electronic device 3000 and may refer to a color that is not changed into another color after being input.

According to another embodiment of the present invention, the memory 600 may store information on a color most recently used in the second pen module 200. Based on the stored information, the control unit 800 may determine at least one color of a color used in the first pen module 100 and a color used in the second pen module 200.

The memory 600 may store user setting information. The user setting information includes at least one of an optical pen identification number (ID), an active electrostatic stylus ID, a Bluetooth address, and stylus setting information.

Memo area identification information is a signal that enables identification of a memo area that is at least a partial area of a writing trajectory included in pen data. Here, the memo area identification information may be generated based on at least one of an input to the electronic pen 1000, a time at which the input is provided to the electronic pen 1000, and unit cell information.

Memo information is information in which a user's writing trajectory acquired by the electronic pen 1000 is processed to have a special purpose. More specifically, the user's writing trajectory acquired by the first pen module 100 of the electronic pen 1000 may be converted into memo information based on at least one of an input to the electronic pen 1000, a time at which the input is provided to the electronic pen 1000, and unit cell information.

The memo area is at least a partial area of a handwritten image and is an area generated by processing a user's writing trajectory acquired by the electronic pen 1000 so as to have a special purpose.

Hereinafter, the structure of the electronic pen 1000 according to the embodiment of the present invention will be described.

Figure 12:
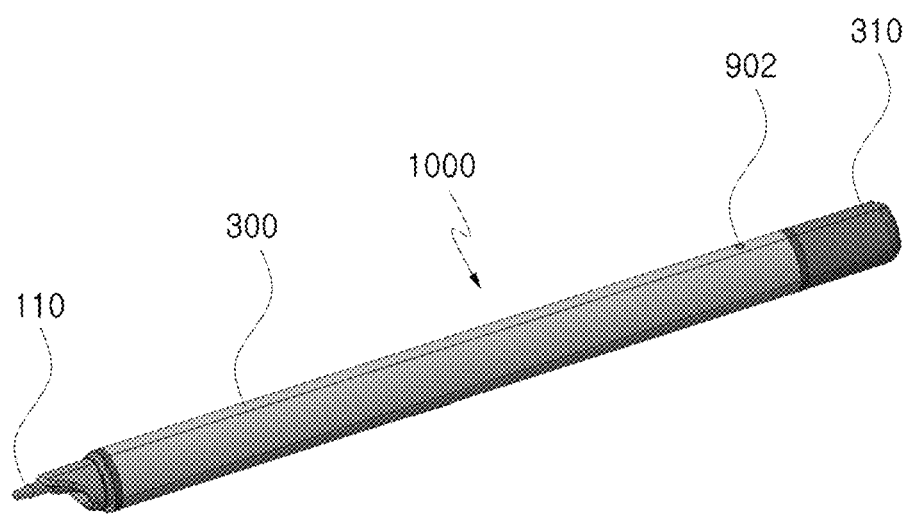
FIG. 12 is a schematic perspective diagram illustrating a state in which a cap provided in an electronic pen according to an embodiment of the present invention is inserted on a second end portion of a main body.

FIG. 12 is a schematic perspective diagram illustrating a state in which a cap provided in an electronic pen according to an embodiment of the present invention is inserted on a second end portion of a main body.

Referring to FIG. 12, an electronic pen 1000 according to one embodiment of the present invention may include a first pen core 110 including a writing material used for a medium 2000, a main body 300 in which the first pen core 110 is inserted and supported, a first display 902 installed at a second end portion of the main body 300, and a cap configured to protect at least one of the first pen core 110 and a second pen core 210 in a cap insertion state.

Here, the cap insertion state may refer to a state in which the first pen core 110 is not exposed to the outside and thus writing on the medium 2000 is impossible. In addition, the cap insertion state may refer to a state in which an electric field emitted from the second pen core 210 is blocked and thus the transmission of an electric field signal to the electronic device 3000 is impossible.

The first pen core 110 is a component that enables writing on the medium 2000. The first pen core 110 may include a first pen tip in direct contact with the medium 2000 and a first pen rod 112 inserted into the main body 300 to support the first pen core 110. Here, the first pen core 110 may be inserted into a first end portion of the main body 300.

The second display 902 is a component that provides information on an operation state of the electronic pen 1000 to a user. The second display 902 may include an LED lamp. Here, the second display 902 may be installed at a location closer to the second end portion than the first end portion. In this case, the user may recognize information from the second display 902 as information on the second pen module 200.

The main body 300 is a component in which the first pen core 110 is inserted and supported. The main body 300 may mean a type of grip that may be gripped by a user with a hand. The main body 300 may include a body pipe 320 and a housing 330. The body pipe 320 and the housing 330 will be described below.

The first end portion of the main body 300 may be inserted into the cap 310 in the cap insertion state. The cap 310 has a predetermined inner space. The first pen core 110 can be protected by the cap 310 in the cap insertion state. Here, the cap 310 may be inserted on the second end portion of the main body 300 in the cap insertion state to protect the second pen core 210.

However, when writing is able to be performed by the first pen core 110, the cap 310 does not need to be inserted on the second end portion of the main body 300 and may be separated from the main body 300 and disposed in another space. Similarly, when an electric field or magnetic field is able to be provided to the electronic device 3000 by the second pen core 210, the cap 310 does not need to be inserted on the first end portion of the main body 300 and may be separated from the main body 300 and disposed in another space.

Meanwhile, although not shown in FIG. 12, the second pen core 210 and the first pen core 110 may be inserted into the first end portion of the main body 300 together. Here, the first pen core 110 and the second pen core 210 may be provided in a manner of being switched through a physical button. In addition, here, the first pen core 110 and the second pen core 210 may be provided in a manner in which the first pen core 110 and the second pen core 210 are interchangeable with each other. In addition, the first pen core 110 and the second pen core 210 may be disposed side by side at the first end portion of the main body 300.

Meanwhile, a transverse cross section of the main body 300 and the cap 310 may have a circular shape or a polygonal shape, and hereinafter, a case in which the transverse cross section is formed in the polygonal shape will be described as an example.

Figure 13:
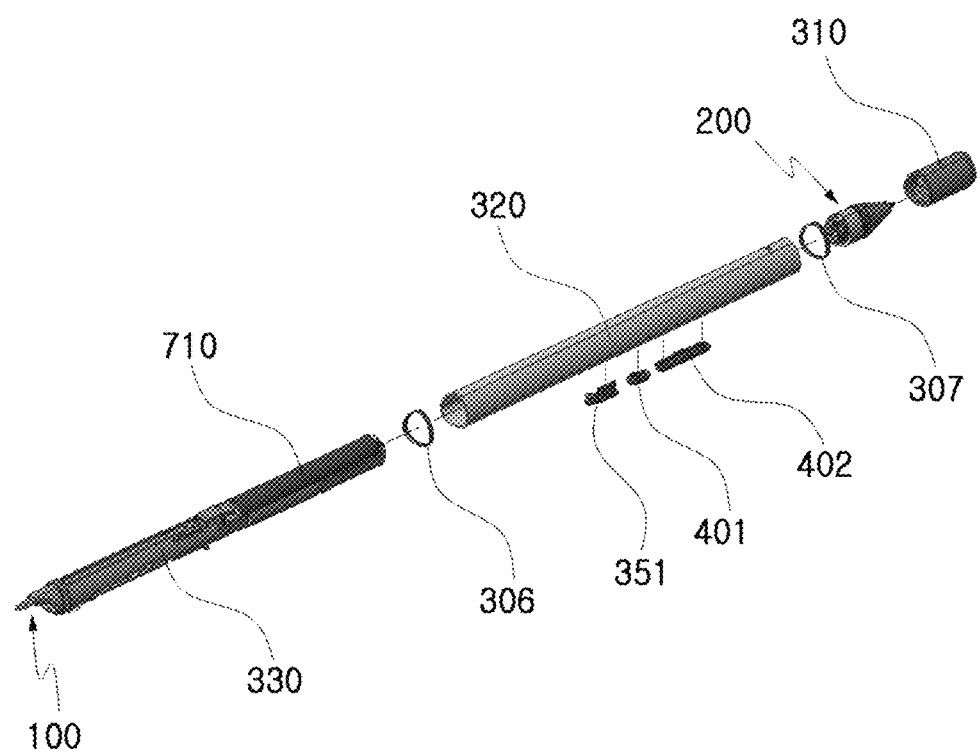
FIG. 13 is an internal exploded diagram of an electronic pen according to embodiments of the present invention.

FIG. 13 is an internal exploded diagram of an electronic pen according to embodiments of the present invention.

Referring to FIG. 13, an electronic pen 1000 according to embodiments of the present invention may include a first pen module 100, a second pen module 200, a body pipe 320, a housing 330, a first coupling ring 306, a second coupling ring 307, a battery 710, a USB cover 351, a power button 401, and a function button 402.

The first pen module 100 is a component that allows the electronic pen 1000 to acquire first location information that is location information of the electronic pen 1000 with respect to a medium 2000. The first pen module 100 may include a first pen core 110 and a pattern sensing unit 120. The first pen module 100 may be disposed closer to a first end portion of a main body 300 than a second end portion of the main body 300.

The second pen module 200 is a component that allows the electronic device 3000 to acquire second location information that is location information of the electronic pen 1000 with respect to the electronic device 3000. The second pen module 200 may include a first electrode 220 and a second pen core 210. Here, the second pen module 200 may be disposed closer to the second end portion than the first end portion of the main body 300. Meanwhile, as described above, when the first pen core 210 and the second pen core 220 are disposed at the first end portion of the main body 300, the second pen module 200 and the first pen module 100 may be disposed close to the first end portion together. Components of the second pen module 200 will be described in detail below.

The body pipe 320 is a grip that may be gripped by a user of the electronic pen 1000 with a hand.

The body pipe 320 may have a transverse cross section formed in an annular shape or a hollow polygonal shape and may extend in a length direction thereof. Here, the body pipe 320 may include a cavity, and thus, the housing 330 may be located therein. The housing 330 may be formed to extend in a length direction thereof, and openings may be formed in a space into which the USB cover 351, the power button 401, and the function button 402 are inserted.

An output unit 900 may be disposed in the body pipe 320. According to one embodiment of the present invention, at least one of a first display 901 and a second display 902 may be disposed on the body pipe 320.

The body pipe 320 may be made of at least one of a first material and a second material. The first material is a material that shields an electric field. For example, a metal such as aluminum may be provided as the first material. The second material is a material capable of transmitting an electric field. For example, a synthetic resin including plastic may be provided as the second material.

According to one embodiment of the present invention, a portion of the body pipe 320 adjacent to a communication unit 500 may be made of the second material, but a portion thereof not adjacent to the communication unit 500 may be made of the first material. In this case, the body pipe 320 may have an exterior made of a metal material so that an aesthetic feeling may be provided to the user and also a signal generated from the communication unit 500 may be transmitted to the outside. According to another embodiment of the present invention, the body pipe 320 may be entirely made of the second material.

Referring to FIG. 13, the housing 330 is a component in which the first pen module 100 and the battery 710 are disposed. Here, the housing 330 may include a first pen core accommodating part 303 in which the first pen core 110 is supported. In the electronic pen 1000 according to the present invention, the first pen core 110 may be freely replaced and may be inserted into the first pen core accommodating part 303 formed in the housing 330. Here, the first pen core accommodating part 303 may include a first pen rod fixing part into which a first pen rod 112 is forcibly fitted to fix the first pen core 110.

The housing 330 may be made of at least one of the first material and the second material. The first material is a material that shields an electric field. For example, a metal such as aluminum may be provided as the first material. The second material is a material capable of transmitting an electric field. For example, a synthetic resin including plastic may be provided as the second material.

According to one embodiment of the present invention, a portion of the housing 330 adjacent to the communication unit 500 may be made of the second material, but a portion thereof not adjacent to the communication unit 500 may be made of the first material. In this case, the housing 330 may have an exterior made of a metal material so that an aesthetic feeling may be provided to the user and also a signal generated from the communication unit 500 may be transmitted to the outside. According to another embodiment of the present invention, the housing 330 may be made entirely of the second material.

The USB cover 351 is a component for protecting the USB terminal 350 to be described below. The USB cover 351 may be made of a material having elasticity. When a user uses a USB for data transmission or charging of the electronic pen 1000, in order to connect the USB to at least one of the electronic pen 1000, an external power supply, and the electronic device 3000, the USB cover 351 may be removed.

The power button is a device that receives a user input. A control unit 800 of the electronic pen 1000 may control power supply from a power supply unit 700 to the components of the electronic pen 1000 based on an input to the power button.

According to one embodiment of the present invention, when power is not supplied to the components of the electronic pen 1000, a user may provide an input to the electronic pen 1000 through the power button 401 so that power may be supplied from the power supply unit 700 to the components of the electronic pen 1000. According to another embodiment of the present invention, power may be supplied from the power supply unit 700 to the components of the electronic pen 1000 based on an input from the power button 401 and another input through another input unit 400. For example, when a pressure sensor acquires a pressure value after the input is provided through the power button 401, power may be supplied from the power supply unit 700 to the components of the electronic pen 1000.

Of course, here, the power button 401 is illustrated as a button-type input device. The power button 401 may be provided as various types of input devices configured to detect or receive a user input, such as a proximity sensor including an illuminance sensor or infrared sensor configured to detect user approach and a touch sensor configured to detect a user touch.

The function button is a device that receives a user input. The control unit 800 of the electronic pen 1000 may control the operation of the electronic pen 1000 based on an input to the function button.

According to one embodiment of the present invention, the function button may be implemented as a two-button type including a first button and a second button which are physically connected. In this case, a state of the function button may include a first button state in which an input is provided to the first button and an input is not provided to the second button, a second button state in which an input is provided to the second button and an input is not provided to the first button, a third state in which an input is provided to the first button and the second button, and a fourth state in which an input is not provided to the first button and the second button. According to another embodiment of the present invention, the function button may include a first button and a second button which are physically separated.

Of course, here, the function button is illustrated as a button-type input device. The power button may be provided as various types of input devices configured to detect or receive a user input, such as a proximity sensor including an illuminance sensor or infrared sensor configured to detect user approach and a touch sensor configured to detect a user touch.

The first coupling ring 306 is a device located between the housing 330 and the body pipe 320. The shaking of the body pipe 320 may be reduced through the first coupling ring 306 so that a user's grip feeling may be improved.

The second coupling ring 307 is a device located between the body pipe 320 and the second pen module 200. The shaking of the body pipe 320 may be reduced through the second coupling ring 307 so that a user's grip feeling may be improved.

The battery 710 is a device that provides power required for the operation of each of the components of the electronic pen 1000. The battery 710 may be disposed in a cavity inside the housing 330. Here, the battery 710 is fixed to the housing 330 so that shaking due to a user input may be minimized.

Figure 14:
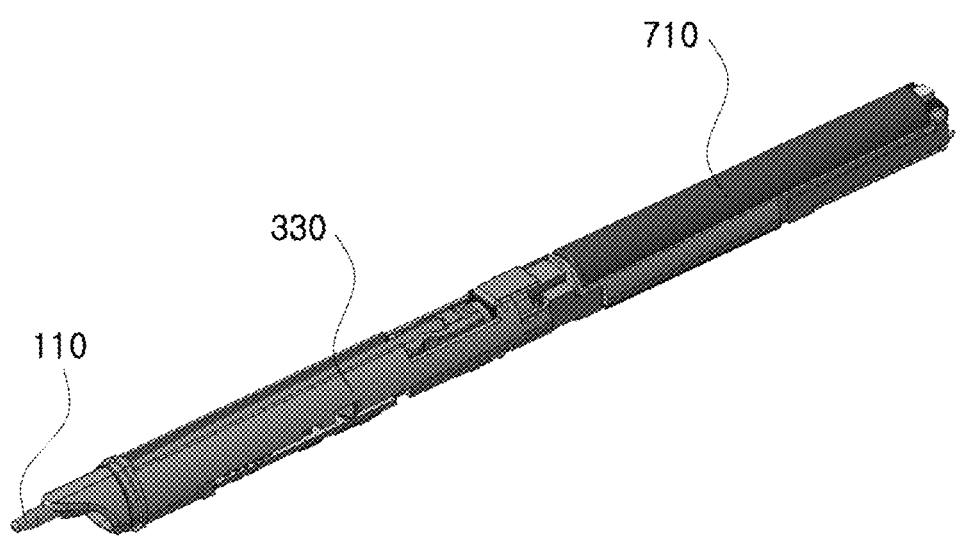
FIG. 14 is a schematic exploded perspective diagram illustrating a main body of an electronic pen according to embodiments of the present invention.
Figure 15:
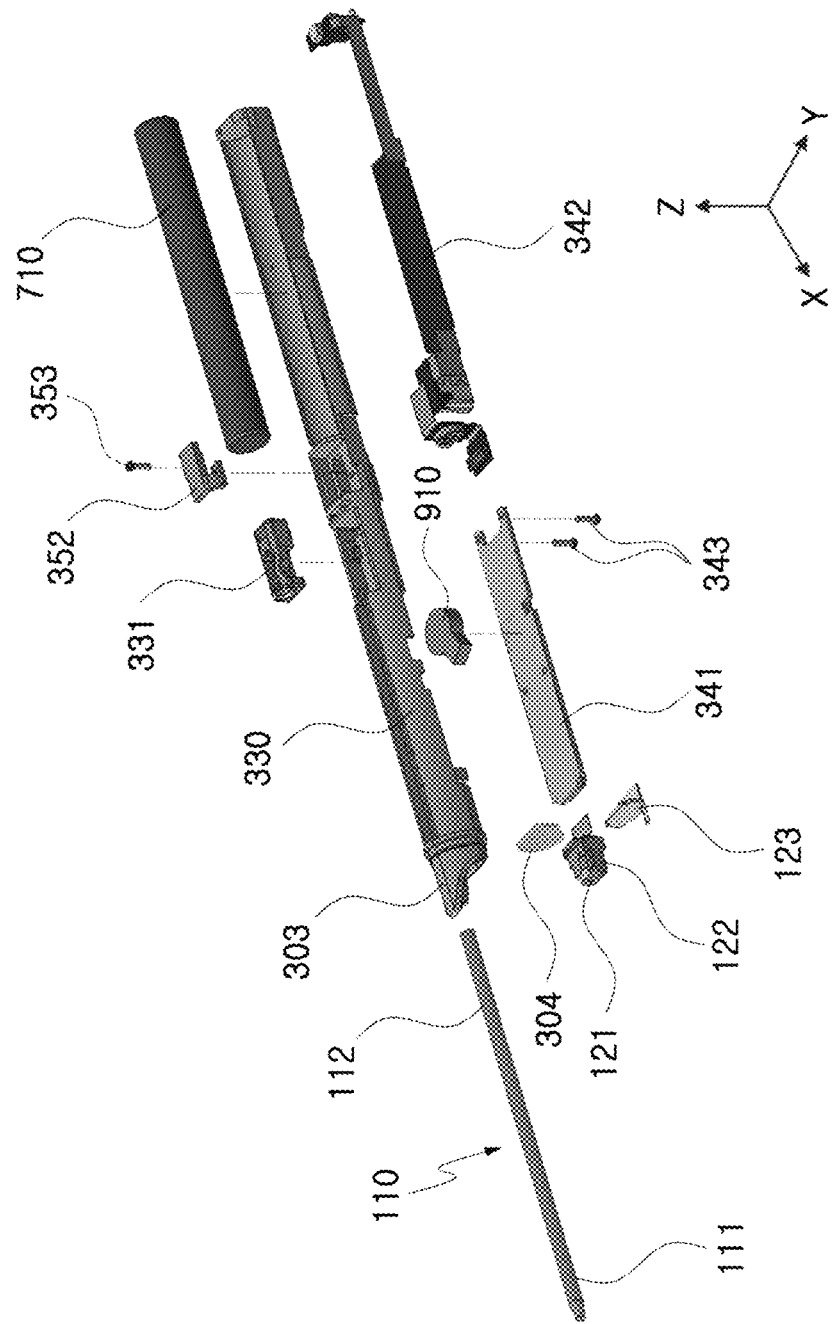
FIG. 15 is another schematic internal exploded diagram of an electronic pen according to embodiments of the present invention.

FIG. 14 is a schematic exploded perspective diagram illustrating a main body 300 of an electronic pen 1000 according to embodiments of the present invention, and FIG. 15 is another internal exploded diagram of an electronic pen 1000 according to embodiments of the present invention.

Referring to FIGS. 14 and 15, the electronic pen 1000 according to one embodiment of the present invention may include a first pen core 110, a light transmitting member 304, a camera module 121, a haptic unit 910, a first substrate 341, and a second substrate 342.

The first pen core 110 is a component that enables writing on a medium 2000. The first pen core 110 may include a first pen tip which is located at a first end portion of the first pen core 110 and contacts in direct with the medium 2000 for writing and a first pen rod 112 which is located in a direction opposite to the first end portion and is inserted into a main body 300 so that the first pen core 110 is supported.

Here, the first pen rod 112 may be supported by being inserted into a first pen core accommodating part 303 located at a first end portion of a housing 330. In addition, the first pen rod 112 is coupled to a first pen rod holder 331 through a second end portion in a direction opposite to the first pen tip. Therefore, the first pen core 110 may resist an external force in a width direction (Y-Z-direction) through the first pen core accommodating part 303 and may resist an external force in a length direction thereof (X-direction) through the first pen rod holder 331.

The camera module 121 is a device that acquires an image of a code pattern provided to the medium 2000 or an image of a reflection pattern according to a surface or material of the medium 2000. A lighting module 122 is a device that irradiates light having a preset specific wavelength toward the medium 2000 such that the image of the code pattern or the reflection pattern may be acquired through the camera module 121.

The camera module 121 and the lighting module 122 may be coupled to the first substrate 341. Here, the camera module 121 may be coupled to the first substrate 341 through a camera bracket 123. According to one embodiment of the present invention, the camera module 121 and the lighting module 122 may be components which are physically coupled. According to another embodiment of the present invention, the camera module 121 and the lighting module 122 may be components which are physically spaced apart from each other. Here, since the camera module 121 and the lighting module 122 are coupled to the first substrate 341, the camera module 121 and the lighting module 122 may receive power from a battery 710.

Here, the camera module 121 may acquire the image of the code pattern or the reflection pattern through the light transmitting member 304. In addition, the lighting module 122 may irradiate light having a preset specific wavelength to the medium 2000 through the light transmitting member 304.

The light transmitting member 304 is a component that selectively transmits only light in a preset frequency band. According to one embodiment of the present invention, the light transmitting member 304 may be an infrared filter that selectively transmits only an infrared band.

The light transmitting member 304 may be located at the first end portion of the housing 330 adjacent to the accommodating part 303 for the first pen core 110.

The haptic unit 910 is a device that generates vibration perceivable through a tactile sense of a user. Here, the haptic unit 910 may include a motor to generate vibration. Here, the haptic unit 910 may include a vibration unit. The haptic unit 910 may be located inside the housing 330 and may generate vibration based on a signal of a control unit 800.

A substrate is a component on which components of the electronic pen 1000 according to the present invention are located. The control unit 800 may be disposed on the substrate and electrically connected to the substrate. Here, the substrate may be coupled to the housing through substrate fixing screws 343.

The substrate may be implemented as one substrate in the electronic pen 1000 according to the present invention but may be implemented as a plurality of substrates. For example, as shown in FIG. 15, the substrate may be implemented as the first substrate 341 and the second substrate 342.

Hereinafter, for convenience of description, a case in which the substrate includes two substrates will be described as an example.

Specifically, the substrate includes the first substrate 341 disposed close to the first end portion of the main body 300 at which the first pen core 110 is exposed and the second substrate 342 disposed close to a second end portion of the main body 300 which is an end portion opposite to the first end portion. Here, the control unit 800 is disposed on the substrate, and the control unit 800 may transmit electrical signals to the components of the electronic pen 1000 through the substrate to control the components of the electronic pen 1000.

Here, the second substrate 342 may include a flexible printed circuit board and thus may be electrically connected to the first substrate 341 through the flexible printed circuit board.

The location of the first substrate 341 may be fixed to the housing 330 provided in the electronic pen 1000. Here, the location of the first substrate 341 may be fixed to the housing 330 at a location closer to the first end portion of the housing 330 than a second end portion of the housing 330. Here, the first substrate 341 may be coupled to the housing 330 through the substrate fixing screws. Since the first substrate 341 is coupled to the housing 330 through the substrate fixing screws, it is possible to reduce a gap generated due to the vibration of the haptic unit 910.

The camera module 121 and the lighting module 122 may be connected to the first substrate 341. The control unit 800 may transmit signals for controlling the camera module 121 and the lighting module 122 through the first substrate 341. The battery 710 may supply power to the camera module 121 and the lighting module 122 through the first substrate 341.

The haptic unit 910 may be connected to the first substrate 341. The control unit 800 may transmit a signal for controlling the haptic unit 910 through the first substrate 341. The battery 710 may supply power to the haptic unit 910 through the first substrate 341.

The second substrate 342 will be described in detail with reference to FIGS. 16 and 17 below.

Figure 16:
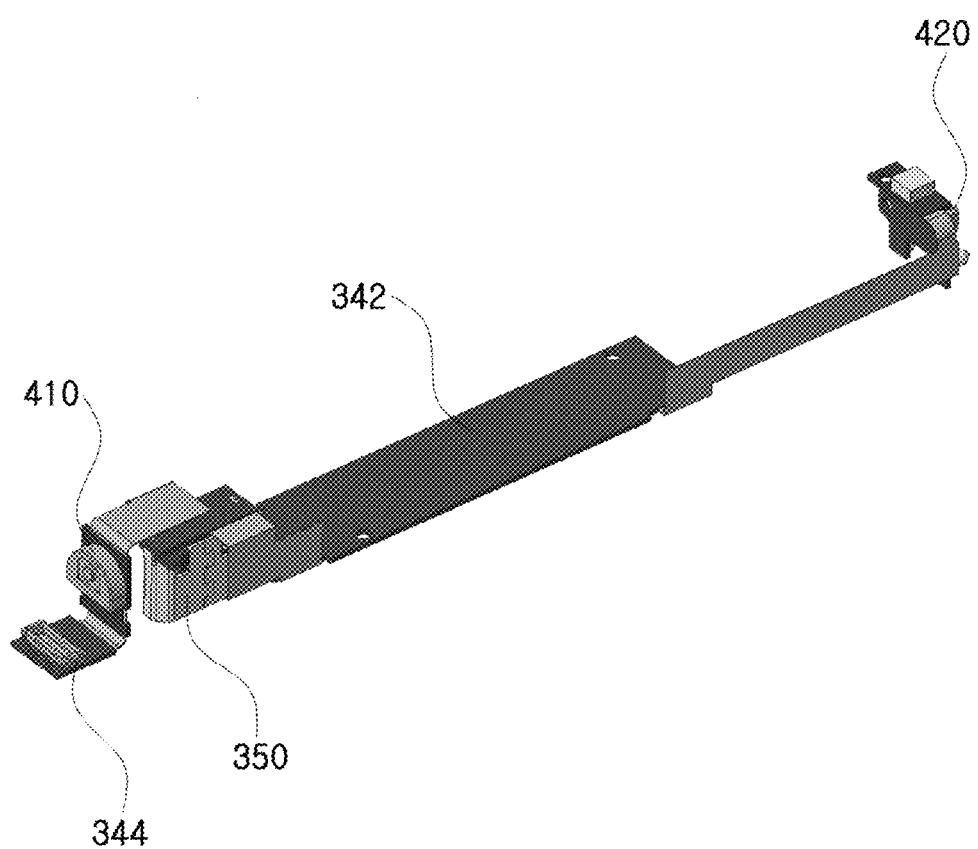
FIG. 16 is a perspective diagram of a substrate of an electronic pen according to embodiments of the present invention.
Figure 17:
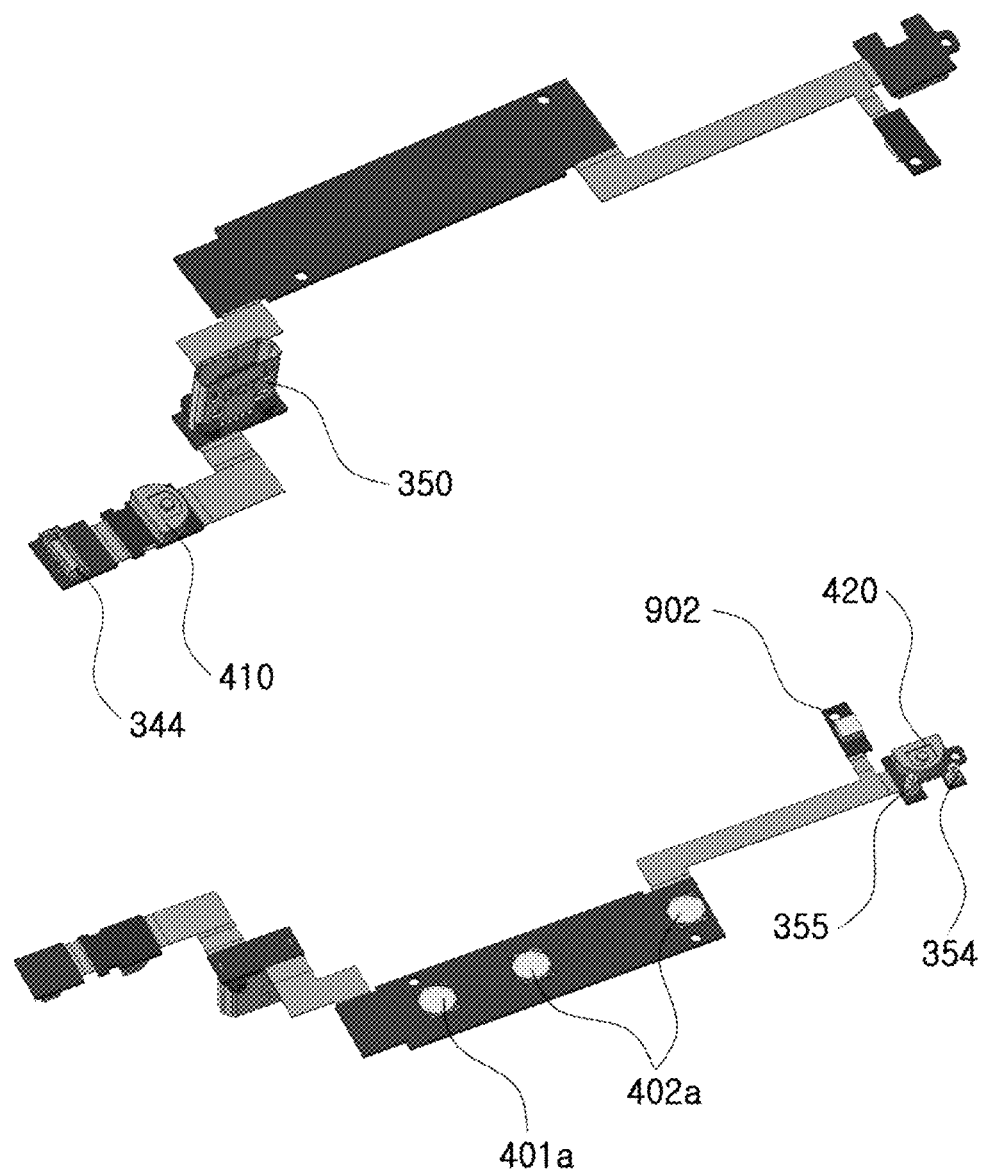
FIG. 17 shows exploded diagrams of the substrate of the electronic pen according to embodiments of the present invention.

FIG. 16 is a perspective diagram of a substrate of an electronic pen according to embodiments of the present invention, and FIG. 17 shows exploded diagrams of the substrate of the electronic pen according to embodiments of the present invention.

According to FIGS. 16 and 17, a second substrate 342 may include a first connector 344 and a USB terminal 350. In addition, a first pressure sensor 410 and a second pressure sensor 420 may be connected to the second substrate 342.

The location of the second substrate 342 may be fixed to a housing 330 provided in an electronic pen 1000. Here, the location of the second substrate 342 may be fixed to the housing 330 at a location closer to a second end portion of the housing 330 than a first end portion of the housing 330.

The second substrate 342 may be electrically connected to a first substrate 341 through the first connector 344. More specifically, the second substrate 342 includes a flexible printed circuit board, and the first connector 344 is disposed on the flexible printed circuit board. Thus, the first substrate 341 and the second substrate may be electrically connected.

The second substrate 342 may include the USB terminal 350. The USB terminal may be fixed to the housing 330 through a USB bracket. In this case, the USB terminal 350 may be fixed to the housing 330, and thus, the second substrate 342 may also be fixed to the housing 330. Here, the USB terminal 350 may be fixed to the USB bracket 352 through a USB bracket fixing screw 353. Here, the USB terminal may not be accommodated in a cavity of the housing 330 and may be exposed to the outside.

The first pressure sensor 410 may be connected to the second substrate 342. Here, the first pressure sensor 410 may be connected to a first end portion of the second substrate 342 which is an end portion adjacent to the first connector 344.

A control unit 800 may obtain a pressure value, which is sensed through the first pressure sensor 410, through the second substrate 342. A battery 710 may supply power to the first pressure sensor 410 through the second substrate 342.

The second pressure sensor 420 may be connected to the second substrate 342. Here, the second pressure sensor 420 may be located at a second end portion of the second substrate 342 spaced apart from the first connector 344 rather than the first end portion of the first connector 344.

The control unit 800 may obtain a pressure value through the second substrate 342. The pressure value is sensed by the second pressure sensor 420. The battery 710 may supply power to the second pressure sensor 420 through the second substrate 342.

The second substrate 342 may acquire a user input through a power button 401. Here, the second substrate 342 may be electrically connected to the power button 401 to acquire a signal according to a user input to the power button 401. More specifically, the second substrate 342 may include a power button receptor 401a to acquire a user input through the power button 401. Here, the control unit 800 may control power supply to the components of the electronic pen 1000 based on a signal from the power button receptor.

The second substrate 342 may acquire a user input through a function button. Here, the second substrate 342 may be electrically connected to the function button and thus may acquire a signal according to a user input of the function button. More specifically, the second substrate 342 may include a function button receptor 402a to acquire a user input through the function button. Here, the control unit 800 may control the operation of the electronic pen 1000 based on a signal from the function button receptor.

The second substrate 342 may include a pin. Here, the pin refers to a conductive pin that includes a spring therein so that a length thereof is changeable. For example, the pin may be provided as a pogo pin. Here, the second substrate 342 may be electrically connected to a second pen module 200 through the pin. The pin may include a first pin 354 disposed at a location capable of being in contact with a ground plate 327 and a second pin 355 disposed at a location capable of being in contact with a conductive plate 328.

Figure 18:
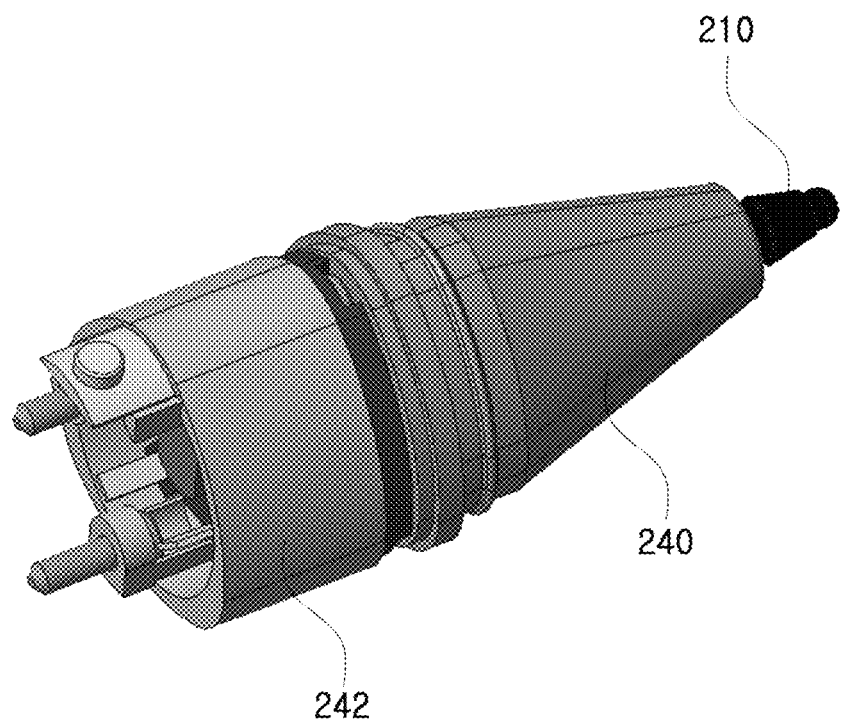
FIG. 18 is a schematic perspective diagram of a second pen module according to embodiments of the present invention.
Figure 19:
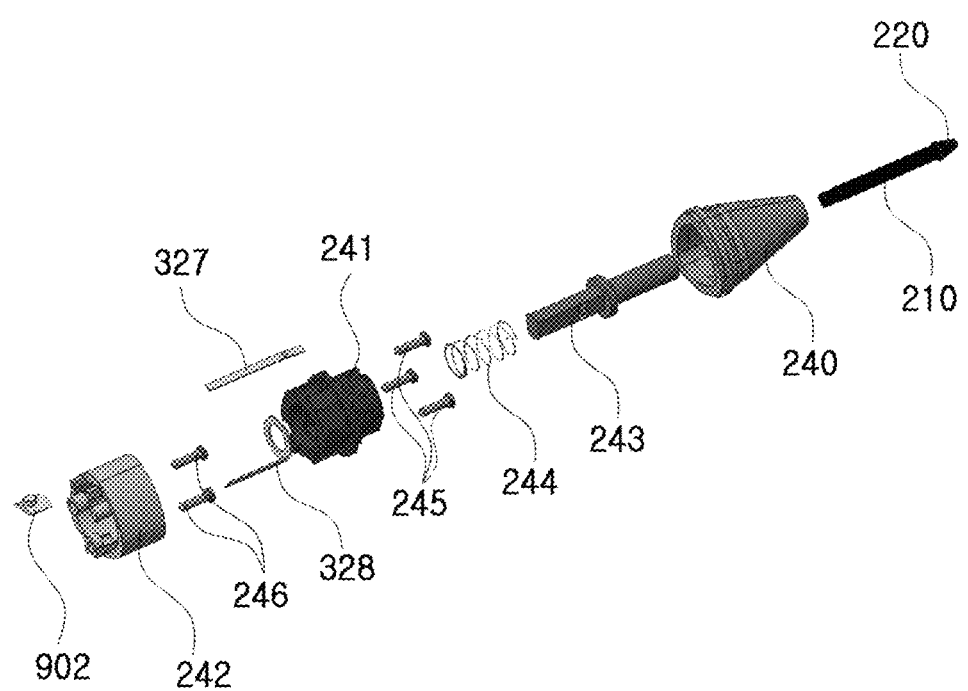
FIG. 19 is an internal exploded diagram of the second pen module according to embodiments of the present invention.

FIG. 18 is a schematic perspective diagram of a second pen module 200 according to embodiments of the present invention, and FIG. 19 is an internal exploded diagram of the second pen module 200 according to embodiments of the present invention.

According to FIGS. 18 and 19, the second pen module 200 according to one embodiment of the present invention may include a second pen core 210, a second pen head 240, a second pen holder 243, a second pen holder spring 244, and a second display 902.

The second pen core 210 is a component that includes an electrode to provide an electric field to an electronic device 3000. The first electrode 220 may be located on the second pen core 210. More specifically, the first electrode 220 may be located on a first end portion of the second pen core 210 which is exposed to the outside. Here, the second pen core 210 may be made of a conductive material to provide a first electric field to an input surface of the electronic device 3000. Here, the second pen core 210 may be made of a second material that is a material capable of transmitting an electric field. For example, a synthetic resin including plastic may be provided as the second material.

The second pen head 240 is a component that protects the second pen core 210. Here, the second pen core 210 may be protected from an external impact by the second pen head 240. In addition, the second pen head 240 may be made of a material having lower conductivity than the second pen core 210 in order for an area of the input surface of the electronic device 3000, to which at least one of the first electric field and a second electric field is applied, to be concentrated on the first end portion of the second pen core 210. According to one embodiment of the present invention, the second pen head 240 may be made of a first material that is a material shielding an electric field. For example, a metal such as aluminum may be provided as the first material.

The second pen core 210 may be coupled to the second pen holder 243 to increase stability when a user writes. Here, the second pen holder 243 may be made of the second material, and thus, the second pen core 210 may be electrically connected to a second substrate 342 through the second pen holder 243. Here, the second pen holder 243 may be coupled to the second pen head 240.

The second pen holder spring 244 is made of an elastic material, and thus, when an external force is applied to the second pen core 210, the second pen spring 244 performs damping according to the elastic force caused by contraction. In addition, the second pen holder spring 244 may be made of the second material to electrically connect the second pen holder 243 and a first pen joint 241.

The first pen joint 241 is a component that is coupled to the second pen head 240 to prevent the shaking of the second pen core 210 due to a user input. Here, the first pen joint 241 may be coupled to a second pen joint 242 through first pen joint fixing screws 245. In addition, the first pen joint 241 may be coupled to the first pen head and the second pen holder 243 through interference fitting.

Here, a conductive plate 328 made of the second material may be disposed in the first pen joint 241 so as to electrically connect the second substrate 342 and the second pen holder spring 244. In addition, a ground plate 327 made of the first material may be disposed in the first pen joint 241 so as to reduce electrical noise.

The second pen joint 242 is a component that is coupled to the first pen joint 241 to prevent the shaking of the second pen module 200 due to a user input. The second pen joint 242 may be coupled to a housing 330 through second pen joint fixing screws 246. Accordingly, the second pen module 200 may be coupled to the housing 330 through the second pen joint 242. Here, the second pen joint 242 may have a cavity therein so that the conductive plate 328 may be disposed therein.

According to one embodiment of the present invention, in the second pen module 200, an electric field may be provided to the input surface of the electronic device 3000 through the conductive plate 328, the second pen holder spring 244, the second pen holder 243, and the second pen core. More specifically, an electrical signal generated from a control unit 800 may be transmitted to the first electrode 220 through the conductive plate 328, the second pen holder spring 244, the second pen holder 243, and the second pen core 210 via the second substrate 342. Here, the electronic device 3000 may determine location information of the electronic pen 1000 with respect to the electronic device 3000 based on the first electric field generated by the first electrode 220. In addition, the electronic device 3000 may determine angle information of the electronic pen 1000 with respect to the electronic device 3000 based on the second electric field generated by a second electrode 230 disposed at a location spaced apart from the first electrode 220 disposed at a first end portion of a second pen core 210 toward a second end portion in a direction opposite to the first end portion.

According to one embodiment of the present invention, the second pen module 200 may include a resonance circuit and thus may receive an electric field from the electronic device 3000 to generate a current without separate power supply and to emit a magnetic field to the electronic device 3000 based on the generated current. In this case, the electronic device 3000 may receive a magnetic field from the electronic pen 1000 to determine location information of the electronic pen 1000 with respect to the electronic device 3000.

According to one embodiment of the present invention, power stored in a battery 710 may be supplied to at least one of the first electrode 220 and the second electrode 230 through the conductive plate 328, the second pen holder spring 244, the second pen holder 243, and the second pen core.

The second display 902 is a device that provides information on an operation state of the electronic pen 1000 to a user. The second display 902 may be installed adjacent to a second end portion of the main body 300. More specifically, the second display 902 may be coupled to the second pen joint 242. Here, the second display 902 may be electrically connected to the second substrate 342 to output information on an operation state of the electronic pen 1000 based on an electrical signal from the control unit 800. In addition, the first display 902 may receive power from the battery 710 through the second substrate 342.

Figure 20:
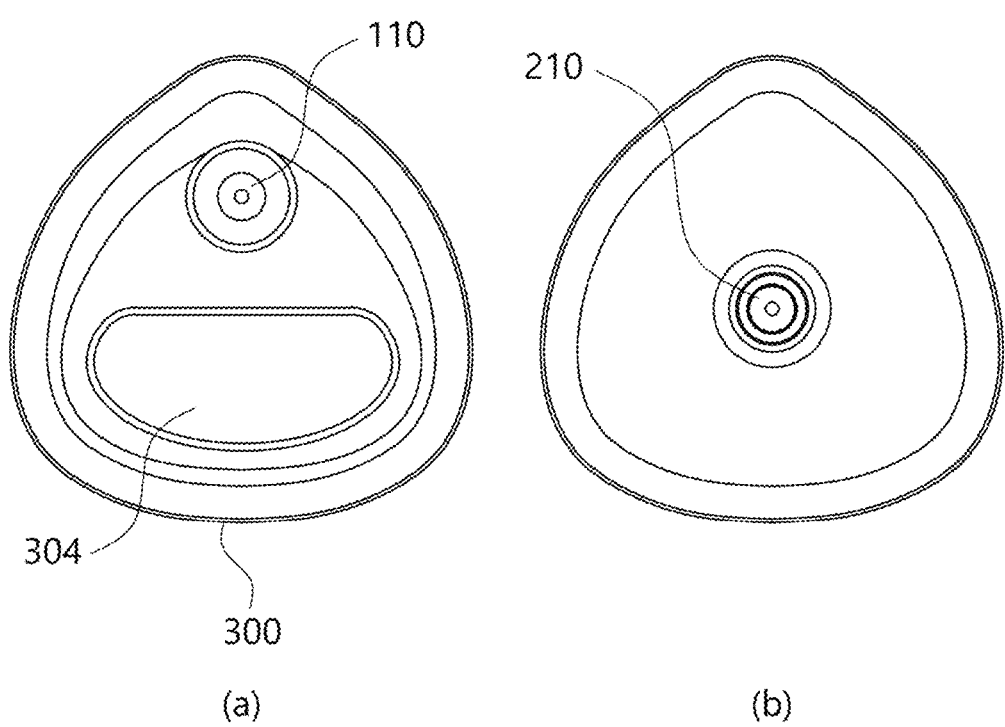
FIG. 20 shows a front diagram and a rear diagram of an electronic pen according to embodiments of the present invention.

FIG. 20 shows a front diagram and a rear diagram of an electronic pen 1000 according to embodiments of the present invention.

According to FIG. 20, a first pen core 110 may be eccentrically disposed. More specifically, the first pen core 110 may be eccentrically disposed toward a vertex of a transverse cross section of a main body 300 from a center of the transverse cross section of the main body 300. Here, the first pen core 110 may be disposed at a location spaced apart from a center of a transverse cross section of the electronic pen 1000 in order for a pattern sensing unit 120 to acquire a code pattern. However, for smooth writing of a user, the center of mass of the electronic pen 1000 may be located at the center of the transverse cross section of the electronic pen 1000.

According to one embodiment of the present invention, at a location that is eccentric toward the vertex of the transverse cross section of the main body 300 from the center of the transverse cross section of the main body 300, the first pen core 110 may be supported by a first pen rod holder. At the center of the transverse cross section of the main body 300, a second pen core 210 may be fixed by a second pen holder 243. Here, a longitudinal axis of the first pen core 110 and a longitudinal axis of the second pen core 210 may be located to be parallel to and spaced apart from each other.

Of course, FIG. 20 shows merely one embodiment of the arrangement of the first pen core 110 and the arrangement of the second pen core 210 of the present invention, and the first pen core 110 and the second pen core 210 may be disposed in the main body 300 in various manners. That is, according to another embodiment of the present invention, the first pen core 110 and the second pen core 210 may be disposed to share the same longitudinal axis. In addition, according to still another embodiment of the present invention, as described above, the first pen core 110 and the second pen core 210 may be installed at the same end portion of the main body 300, and in this case, although not shown in FIG. 12, both the first pen core 110 and the second pen core 210 may be included in a front or rear surface of the electronic pen 1000.

The main body 300 may have a cross section having a constant or variable diameter. According to one example of this embodiment, as shown in FIG. 20, a circular cross section of the main body 300 maintains a substantially constant diameter from the first pen core 110 to the second pen core 210. In other embodiments, the main body may include a variable cross section.

According to another example of the present embodiment, the diameter of the main body 300 may be decreased from the second pen core 210 toward the first pen core 110. According to still another example of this embodiment, the diameter of the main body 300 may protrude outward from a middle of the main body between the first pen core 110 and the second pen core 210.

The transverse cross section of the main body 300 may be variously formed. According to one embodiment of the present invention, as shown in FIG. 20, the transverse cross section may be formed in a triangular shape with rounded corner. According to another embodiment of the present invention, the transverse cross section may be formed in a circular shape.

Hereinafter, embodiments of a method of reproducing content handwritten by a user in real time according to the present invention will be described.

As described above, when pen data is generated based on the operation of the first pen module 100, the electronic pen 1000 may store the pen data in a memory 600 or may transmit the pen data to an electronic device 3000 through a communication unit 500.

For example, when the electronic pen 1000 is in a communicable state with the electronic device 3000, the electronic pen 1000 may generate pen data to directly transmit the pen data to the electronic device 3000 in real time. However, when the electronic pen 1000 is not in a communicable state with the electronic device 3000, the electronic pen 1000 may generate pen data to store the pen data in the memory 600, and when the electronic pen 1000 is in a communicable state with the electronic device 3000 later, the electronic pen 1000 may transmit pieces of stored pen data to the electronic device 3000.

In addition, based on an electric field generated by a second pen module 200, the electronic device 3000 may determine a location of the electronic pen 1000 with respect to the electronic device 3000 and an angle of the electronic pen 1000 with respect to an input surface of the electronic device 3000.

Figure 21:
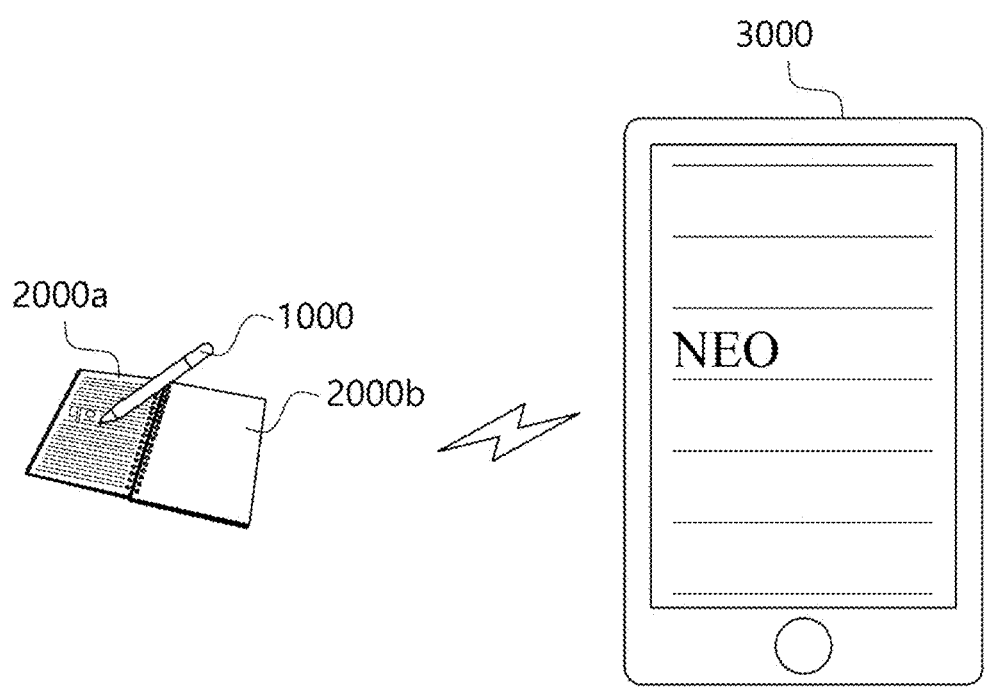
FIG. 21 shows diagrams for describing an embodiment in which handwritten content of a user is reproduced in real time according to the present invention.

FIG. 21 shows diagrams for describing an embodiment in which handwritten content of a user is reproduced in real time according to the present invention. According to FIG. 21, based on pen data received from an electronic pen 1000, an electronic device 3000 may reproduce content that is being handwritten on a medium 2000 by the user in real time and may display the content on a display of the electronic device 3000.

Hereinafter, a method of reproducing an article that is being written by the user and displaying the article on the display will be described. For the following description, it is assumed that the electronic pen 1000 and the electronic device 3000 are connected to each other in a communicable state, and it is assumed that, as described above, the electronic pen 1000 transmits generated pen data to the electronic device 3000 in real time. The electronic device 3000 may acquire information on a target medium 2000 on which the user is writing, based on identification information of the medium 2000 included in pen data received from the electronic pen 1000.

For example, the electronic device 3000 may confirm whether the target medium 2000 on which the user is writing, is a medium 2000 having a specific format for a special purpose or is a medium 2000 constituting a part of a product provided in the form of a book or notebook.

In addition, when the target medium 2000 is the medium 2000 constituting a part of the product provided in the form of the book or notebook, the electronic device 3000 may confirm on which page the target medium 2000 is located in the book or notebook.

Based on acquired identification information of the medium 2000, the electronic device 3000 may display a template previously stored for the target medium 2000 or handwritten content already handwritten by the user on the target medium 2000 through the display.

In this case, the template previously stored for the target medium 2000 may refer to a template including a text, an image, a shape, a symbol, and the like which are printed on the target medium 2000 excluding a code pattern. For example, when the target medium 2000 forms a part of the notebook, a plurality of lines may be printed on the target medium 2000 for easy writing of the user, and information indicating that the plurality of lines or the like are printed may be included in previously stored template information on the target medium 2000. For another example, when the target medium 2000 constitutes a part of a schedule book-like type of notebook, a specific date such as Feb. 28, 2019 may be printed on the target medium 2000. As described above, special information being printed on the target medium 2000 may also be included in the preset template information. Hereinafter, for convenience, an image displayed for the target medium 2000 including the above-described template information and the like may be referred to as a medium image.

Subsequently, the electronic device 3000 may generate stroke data, which is to be displayed through the display and corresponds to a trajectory that is being written by the user, based on location information and time information included in received pen data. In order to generate stroke data, at least one unit pen data may be used.

When the stroke data is generated, according to the generated stroke data, the electronic device 3000 may reproduce a trajectory written by a user on the target medium 2000 at a corresponding location on a preset template displayed on the display without any change. FIG. 21 illustrates that content handwritten by a user on the target medium 2000 is reproduced on the display of the electronic device 3000 in real time.

When handwritten content of a user is reproduced through the electronic device 3000, a trajectory of content handwritten by the user, location of the content handwritten by the user with respect to the target medium 2000, or the like may be accurately produced based on first location information included in pen data.

Hereinafter, for convenience of description, the electronic device 3000 operating according to the embodiment in which the handwritten content of the user is reproduced in real time according to the present invention may be referred to as operating in a "reproduction mode."

Figure 22:
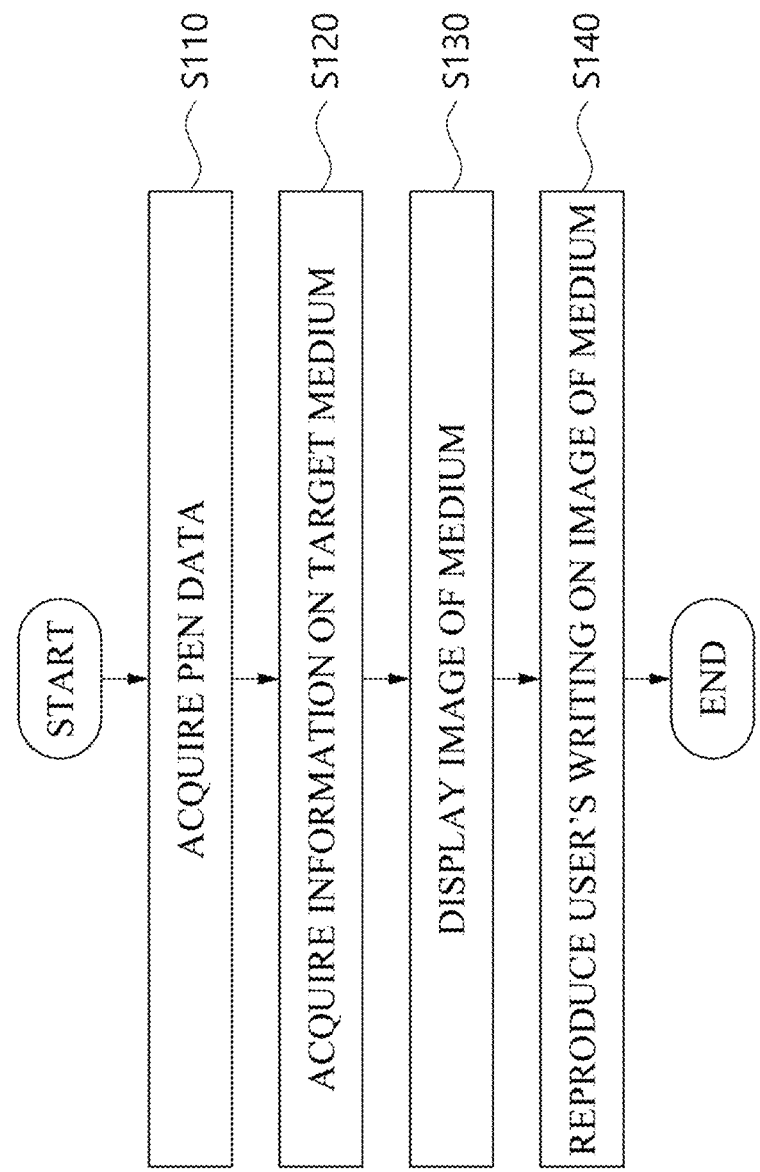
FIG. 22 is a flowchart of a method of reproducing content handwritten by a user in real time according to one embodiment of the present invention.

FIG. 22 is a flowchart of a method of reproducing content handwritten by a user in real time according to one embodiment of the present invention.

Referring to FIG. 22, the method of reproducing the content handwritten by the user in real time includes acquiring pen data (S110), acquiring information on a target medium 2000 based on the acquired pen data (S120), displaying an image of the medium 2000 corresponding to the target medium 2000 (S130), and reproducing a user's writing on the image of the medium 2000 based on the acquired pen data (S140).

Operation S140 of reproducing the user's writing may include reproducing the user's handwriting in real time at a corresponding location on the image of the medium 2000 based on stroke data generated from the pen data.

Accordingly, an electronic device 3000 may reproduce handwritten content of the user in real time based on pen data received from the electronic pen 1000 to display the handwritten content through the electronic device 3000.

Since descriptions corresponding to each operation have been given in detail above, detailed descriptions thereof are omitted here.

Figure 23:
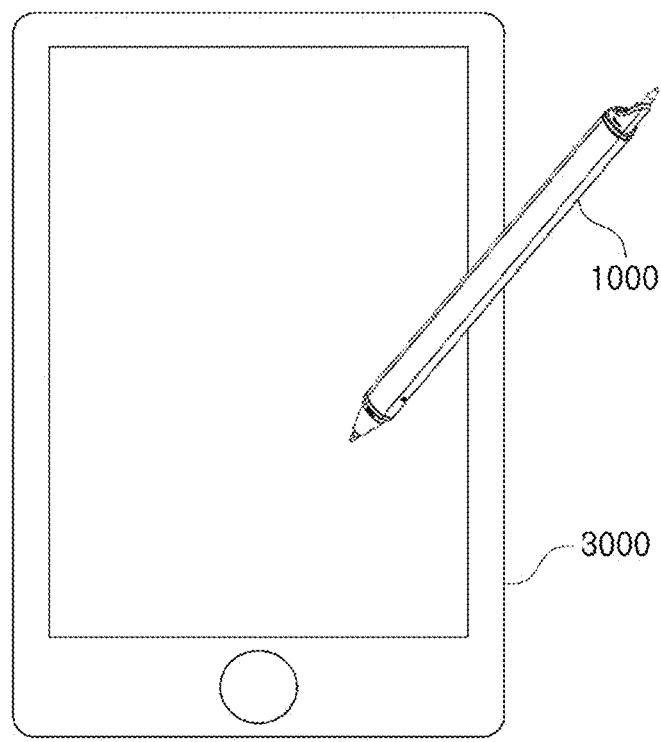
FIG. 23 is a diagram for describing an embodiment in which location information of an electronic pen with respect to an electronic device is determined according to the present invention.

FIG. 23 is a diagram for describing an embodiment in which location information of an electronic pen with respect to an electronic device is determined according to the present invention. Referring to FIG. 23, an electronic device 3000 may receive stylus data from an electronic pen.

Based on pen data, content that is being written on a medium 2000 by a user may be reproduced in real time and displayed on a display of the electronic device 3000.

In addition, an electronic pen 1000 may transmit the stylus data to the electronic device 3000 using at least one of a second pen module and a communication unit 500.

The stylus data is electrical information used for the electronic device 3000 to obtain a user input.

The stylus data may include angle information, second pressure information, second color information, memo information, and the like.

The second pressure information is pressure information output from a second pressure sensor at a time point at which an electrical signal used to generate one unit stylus data is acquired or at a time point at which one unit stylus data is generated.

The second color information is information on a color of a stroke input with the electronic pen 1000 which is recognized by a control unit 800 or a control module 3500. More specifically, a second pen module 200 of the electronic pen 1000 only transmits an electrical signal to the electronic device 3000 and cannot leave a visible trajectory unlike an ink pen. However, according to one embodiment of the present invention, stylus data reflecting color information based on a setting change of the electronic device 3000 may be transmitted to the electronic device 3000. In this case, a color of a stroke displayed on the electronic device 3000 may be changed.

The angle information is information reflecting an angle formed between an input surface of the electronic device 3000 and the electronic pen 1000. More specifically, the angle information may be generated using a difference between a location at which a first electric field is detected on the input surface and a location at which a second electric field is detected on the input surface and a distance difference between a first electrode 220 and a second electrode 230. According to one embodiment of the present invention, a control unit 800 of the electronic pen 1000 may generate the angle information to transmit the generated angle information to the electronic device 3000. According to another embodiment of the present invention, the control unit 800 of the electronic pen 1000 may transmit a location at which the first electric field is detected on the input surface, a location at which the second electric field is detected on the input surface, and a distance difference between the first electrode 220 and the second electrode 230 to the electronic device 3000. Thus, the electronic device 3000 may generate the angle information based on the distance.

In addition, according to FIG. 23, the electronic device 3000 may determine location information of the electronic pen 1000 with respect to the electronic device 3000 based on an electric field received from the electronic pen 1000.

The electronic device 3000 may receive a user input through an input module 3100 and may determine second location information of the electronic pen 1000 on the input surface of the electronic device 3000. More specifically, the electronic device 3000 may include a capacitive touch sensor to sense an electric field. Here, the electronic device 3000 may determine the second location information indicating a location of the electronic pen 1000 with respect to the electronic device 3000 based on the first electric field acquired through the second pen module 200 of the electronic pen 1000.

According to one embodiment, the electronic pen 1000 may generate the first electric field having a first effective distance. Here, an electric field may cross the input surface when the electronic pen 1000 is placed on the input surface of the electronic device 3000. The electronic device 3000 may detect the first electric field and may determine a location of the electronic pen 1000 based on a location at which the first electric field is detected.

Here, the electronic device 3000 may include a sensor layer capable of detecting an electric field generated by the electronic pen 1000. Here, the sensor layer may include a plurality of capacitive sensing electrodes. The capacitive sensing electrodes may be located on the input surface or on any suitable layer inside the input surface.

Here, the electronic device 3000 may generate response information on the first electric field based on the first electric field generated by the electronic pen 1000. Here, the response information on the first electric field may be transmitted to the electronic pen 1000. According to one embodiment, the response information on the first electric field may be transmitted to the second pen module 200. According to another embodiment, the response information on the first electric field may be transmitted to the communication unit 500.

Figure 24:
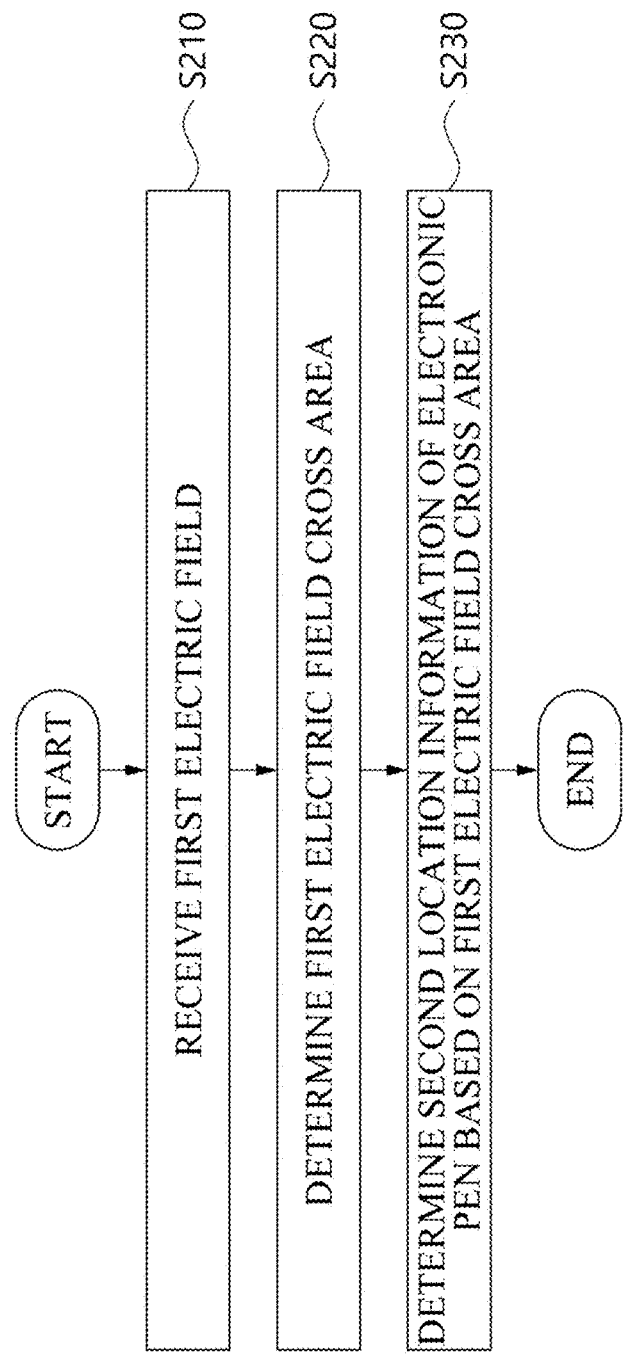
FIG. 24 is a flowchart of a method of determining second location information of an electronic pen according to one embodiment of the present invention.

FIG. 24 is a flowchart of a method of determining second location information of an electronic pen according to one embodiment of the present invention. Referring to FIG. 24, a method of determining second location information of an electronic pen 1000 includes receiving a first electric field (S210), determining a first electric field cross area (S220), and determining second location information of the electronic pen 1000 based on a first electric field cross area (S230).

Here, the first electric field cross area is an area in which a plurality of conducting wires receiving the first electric field overlap each other. More specifically, when the electronic pen 1000 approaches an input surface of an electronic device 3000, an input module 3100 of the electronic device 3000 receives the first electric field generated by a first electrode 220. In this case, the first electric field cross area is an area of the input module 3100 of the electronic device 3000 which receives the first electric field.

Here, the electronic device 3000 may determine a center of the first electric field cross area as a second location of the electronic pen 1000. In this case, the second location information is determined as the center of the first electric field cross area.

Since descriptions corresponding to each operation have been given in detail above, detailed descriptions thereof are omitted here.

According to FIG. 23, the electronic device 3000 may determine angle information of the electronic pen 1000 with respect to the input surface of the electronic device 3000 based on the first electric field and a second electric field received from the electronic pen 1000.

The angle information is information reflecting an angle formed between the input surface of the electronic device 3000 and the electronic pen 1000. According to FIG. 11, on the input surface, the angle information may be generated using a distance d3 between a location at which the first electric field is detected and a location at which the second electric field is detected, and a distance difference between the first electrode 220 and the second electrode 230. That is, since the first electrode 220 and the second electrode 230 are fixed, the distance between the first electrode 220 and the second electrode 230 is provided as a preset value. In this case, the distance between the location at which the first electric field is detected and the location at which the second electric field is detected on the input surface may be changed according to an angle of the electronic pen 1000 with respect to the input surface of the electronic device 3000. Therefore, the angle of the electronic pen 1000 with respect to the input surface of the electronic device 3000 may be determined based on the distance between the location at which the first electric field is detected and the location at which the second electric field is detected.

According to one embodiment of the present invention, a control unit 800 of the electronic pen 1000 may generate the angle information to transmit the generated angle information to the electronic device 3000. According to another embodiment of the present invention, the control unit 800 of the electronic pen 1000 may transmit the location at which the first electric field is detected on the input surface, the location at which the second electric field is detected on the input surface, and the distance difference between the first electrode 220 and the second electrode 230 to the electronic device 3000. Thus, the electronic device 3000 may generate the angle information based on the distance.

Figure 25:
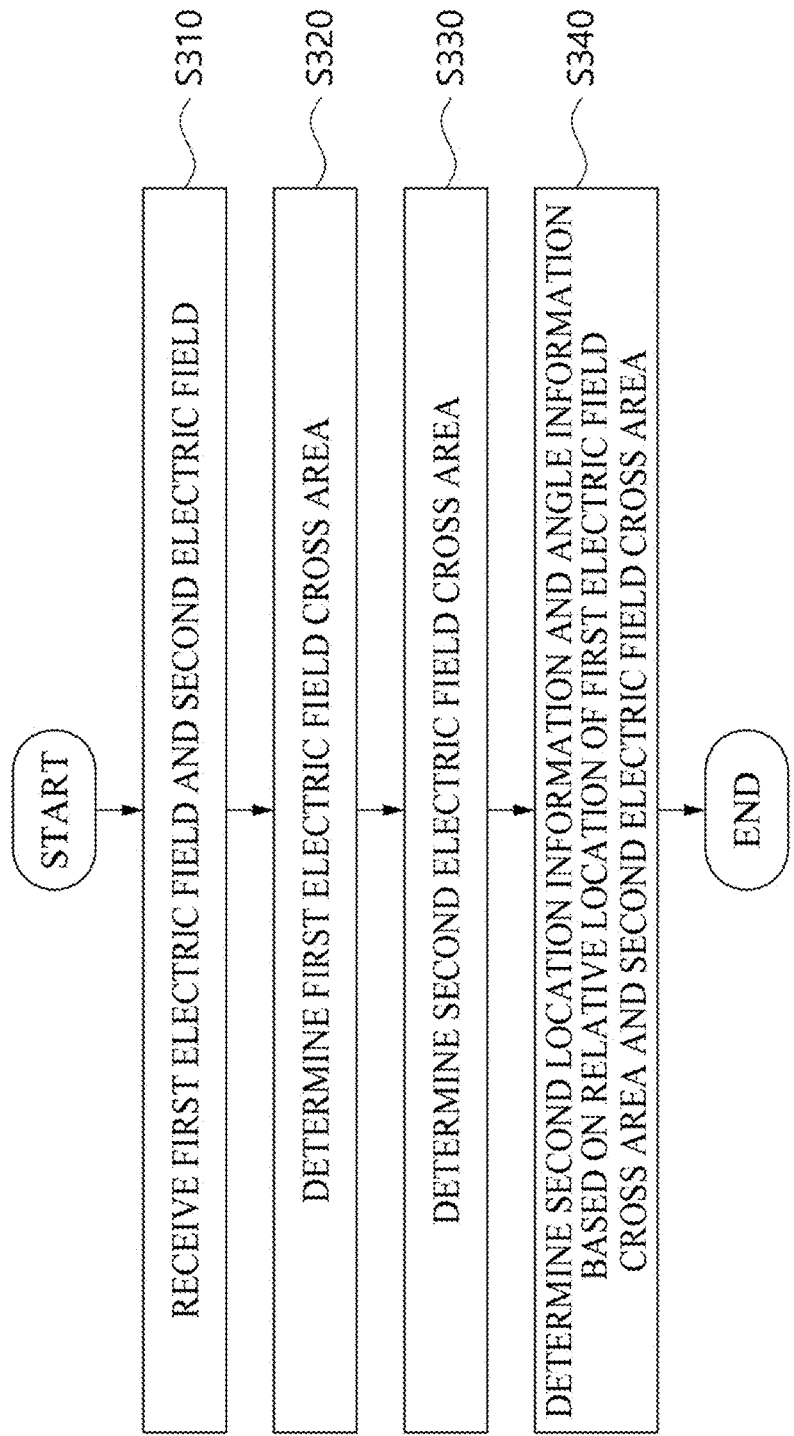
FIG. 25 is a flowchart of a method of determining second location information and angle information of an electronic pen according to one embodiment of the present invention.

FIG. 25 is a flowchart of a method of determining second location information and angle information of an electronic pen according to one embodiment of the present invention.

According to FIG. 25, a method of determining second location information and angle information of an electronic pen 1000 may include receiving a first electric field and a second electric field (S310), determining a first electric field cross area (S320), determining a second electric field cross area (S330), and determining second location information and angle information based on a relative location between the first electric field cross area and the second electric field cross area (S340).

Here, the second electric field cross area is an area in which a plurality of conducting wires receiving the second electric field overlap each other. More specifically, when the electronic pen 1000 approaches an input surface of an electronic device 3000, an input module 3100 of the electronic device 3000 receives the second electric field generated by a second electrode 230. In this case, the second electric field cross area is an area of the input module 3100 of the electronic device 3000 which receives the second electric field.

Here, the electronic device 3000 may determine a center of the second electric field cross area as a projection location of the second electrode 230. In this case, the angle information may be determined based on a distance between the projection location of the second electrode 230 and a center of the first electric field cross area and a distance between a first electrode 220 and the second electrode 230.

Since descriptions corresponding to each operation have been given in detail above, detailed descriptions thereof are omitted here.

In the above-described method of controlling the electronic device according to the present invention, operations constituting each embodiment are not essential, and thus, each embodiment may selectively include the above-described operations. In addition, each operation constituting each embodiment does not need to be performed in the described order, and an operation described later may be performed ahead of an operation described first. In addition, the method of controlling the electronic device according to the present invention may be implemented in the form of a code or program that performs the method. Such a code or program may be stored in a computer-readable recording medium.

Hereinafter, a method of managing power of the electronic pen 1000 according to the present invention will be described.

Figure 26:
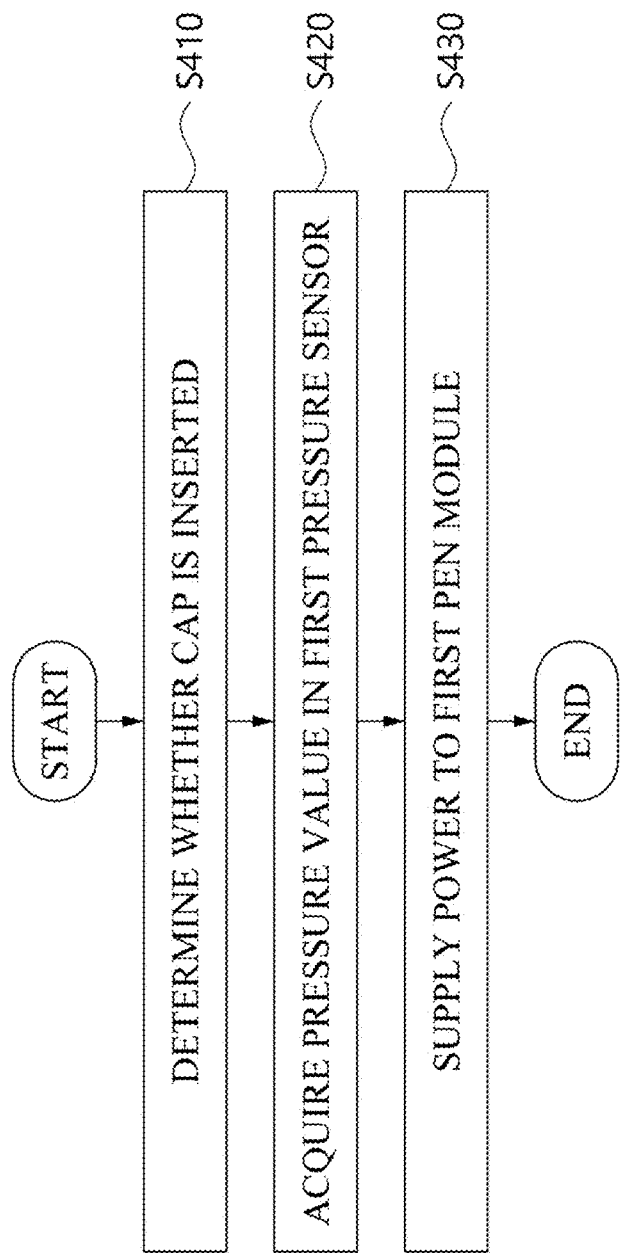
FIG. 26 is a flowchart of a method of supplying power of an electronic pen according to one embodiment of the present invention.

FIG. 26 is a flowchart of a method of supplying power of an electronic pen 1000 according to one embodiment of the present invention. Referring to FIG. 26, a method of managing power of the electronic pen 1000 may include determining, by control unit 800, whether a cap 310 is inserted on a first end portion or a second end portion (S410), acquiring, by the control unit 800, a pressure value from a first pressure sensor 410 (S420), and supplying power to a first pen module 100 (S430).

The electronic pen 1000 may determine whether the cap 310 is inserted (S410). Here, the electronic pen 1000 may determine whether the cap 310 is inserted on the electronic pen 1000 by sensing a magnet included in the cap 310 using a magnetic sensor. According to one embodiment of the present invention, the magnetic sensor may be located at the first end portion of a main body 300 to sense whether the cap 310 is inserted on the first end portion of the main body 300. According to another embodiment of the present invention, the magnetic sensor may be located at the second end portion of the main body 300 to sense whether the cap 310 is inserted on the second end portion of the main body 300.

Since descriptions corresponding to each operation have been given in detail above, detailed descriptions thereof are omitted here.

Figure 27:
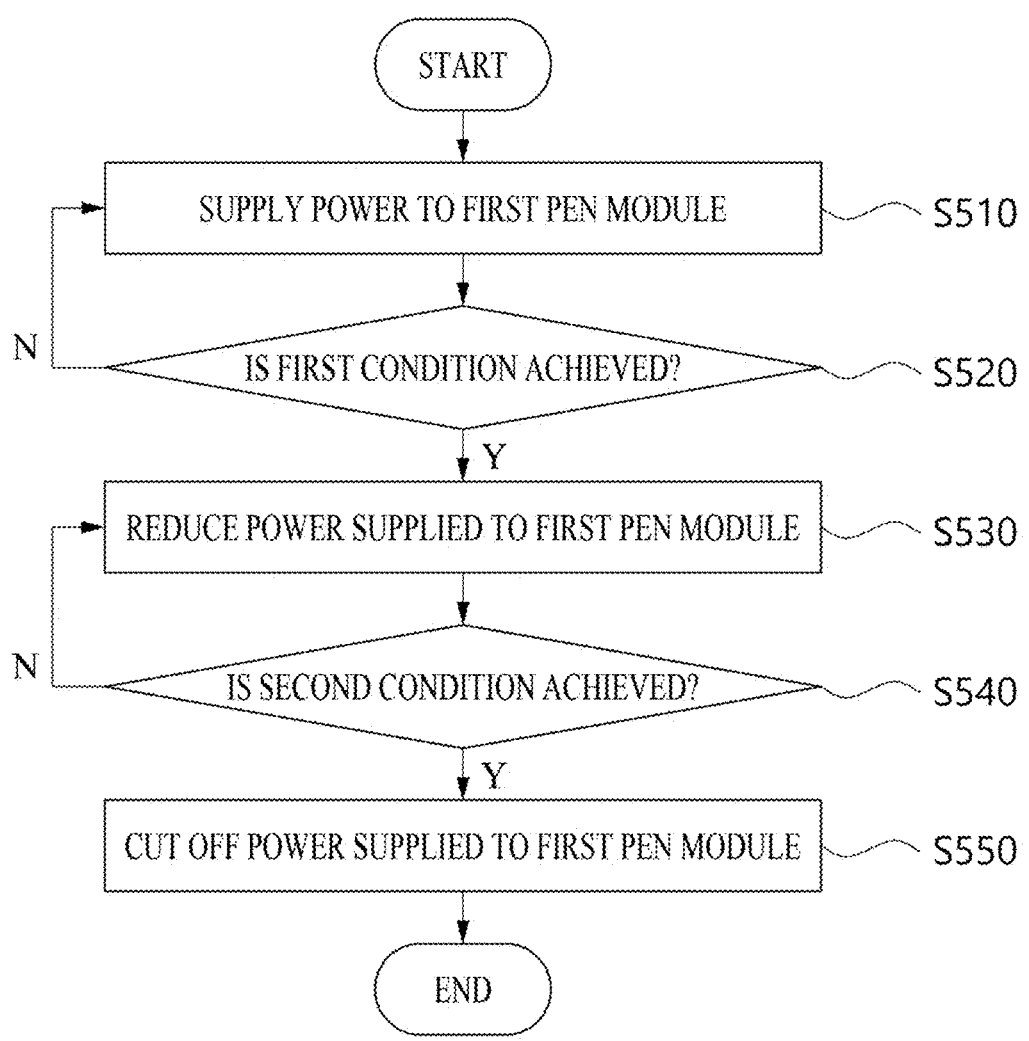
FIG. 27 is another flowchart of a method of supplying power of an electronic pen according to one embodiment of the present invention.

FIG. 27 is another flowchart of a method of supplying power of an electronic pen according to one embodiment of the present invention. Referring to FIG. 27, a method of managing power of an electronic pen 1000 may include supplying power to a first pen module 100 (S510), determining, by a control unit 800, whether a first condition is achieved (S520), reducing the power supplied to the first pen module 100 (S530), determining, by the control unit 800, whether a second condition is achieved (S540), and cutting off the power supplied to the first pen module 100 (S550).

Here, the first condition refers to a condition in which a first pen input is not provided to the electronic pen 1000 for a time longer than a first time. In addition, the second condition refers to a condition in which the first pen input is not provided to the electronic pen 1000 for a time longer than a second time.

Here, the first time is a time for which the first pen input is not provided to the electronic pen 1000 after an on-state of the first pen module 100 is started. Here, a length of the first time may be variously set.

In addition, the second time is a time in which the first pen input is not provided to the electronic pen 1000 after the on-state of the first pen module 100 is started. Here, a length of the second time may be variously set. Here, the second time may be set to be longer than the first time.

Here, the first pen input is a user input related to the first pen module 100. Here, the first pen input may refer to at least one of pressure value acquisition of a first pressure sensor 410, image acquisition of a pattern sensing unit 120, an input to a function button, and a user input to an electronic device 3000 through a communication unit 500.

Since descriptions corresponding to each operation have been given in detail above, detailed descriptions thereof are omitted here.

Figure 28:
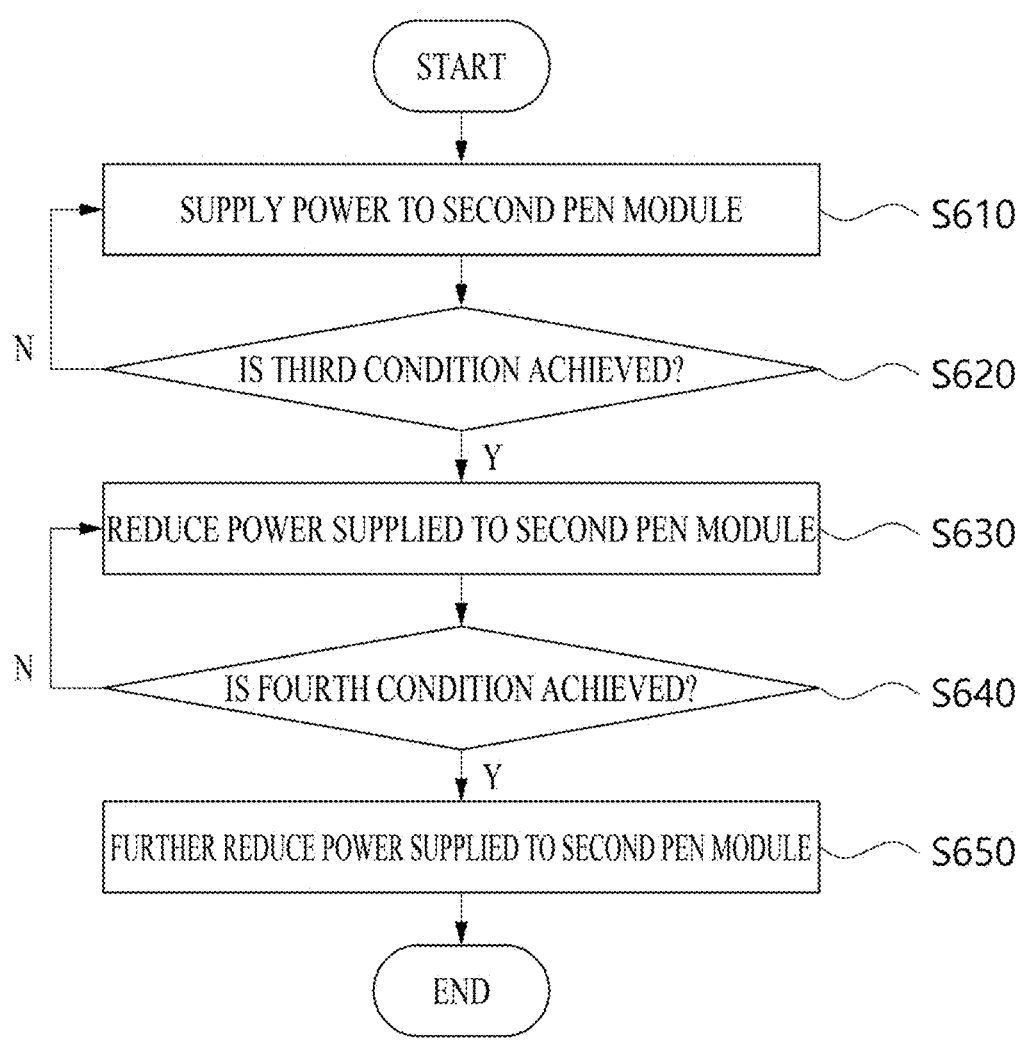
FIG. 28 is still another flowchart of a method of supplying power of an electronic pen according to one embodiment of the present invention.

FIG. 28 is still another flowchart of a method of supplying power of an electronic pen according to one embodiment of the present invention. Referring to FIG. 28, a method of managing power of an electronic pen 1000 may include supplying power to a second pen module 200 (S520), determining, by a control unit 800, whether a third condition is achieved (S620), reducing the power supplied to the second pen module 200 (S630), determining, by the control unit 800, whether a fourth condition is achieved (S640), and further reducing the power supplied to the second pen module 200 (S650).

Here, the third condition refers to a condition in which a second pen input is not provided to the electronic pen 1000 for a time longer than a third time. In addition, the fourth condition refers to a condition in which the second pen input is not provided to the electronic pen 1000 for a time longer than a fourth time.

Here, the third time is a time for which the second pen input is not provided to the electronic pen 1000 after an on-state of the second pen module 200 is started. Here, a length of the third time may be variously set.

In addition, the fourth time is a time for which the second pen input is not provided to the electronic pen 1000 after the on-state of the second pen module 200 is started. Here, a length of the fourth time may be variously set. Here, the fourth time may be set to be longer than the third time.

Here, the second pen input may refer to at least one of pressure value acquisition of a second pressure sensor 420, signal acquisition of an electronic device 3000 through the second pen module 200, an input to a function button, and a user input to the electronic device 3000 through a communication unit 500. Here, the second pen input may further include acquisition of a response signal for a first electric field and acquisition of a response signal for a second electric field.

Since descriptions corresponding to each operation have been given in detail above, detailed descriptions thereof are omitted here.

In the above-described method of managing power according to the present invention, operations constituting each embodiment are not essential, and thus, each embodiment may selectively include the above-described operations. In addition, each operation constituting each embodiment does not need to be performed in the described order, and an operation described later may be performed ahead of an operation described first. For example, here, since operation S420 of acquiring the pressure value from the first pressure sensor 410 is not essential, operation S420 may be omitted, and when it is determined that the cap 310 has been removed, power may be supplied to the first pen module 100.

The electronic device 3000 may display a memo area M based on memo area identification information received from the electronic pen 1000.

The memo area identification information is information enabling identification of the memo area M that is at least a part of writing trajectories included in pen data. Here, the memo area identification information may be generated based on a handwritten image acquired through a pattern sensing unit 120 and an input to an input unit 400 of the electronic pen 1000.

Here, the pen data may include unit cell information acquired by the electronic pen 1000 and writing trajectory information used to generate stroke data necessary for reproducing a user's writing trajectory in real time or for replaying the user's writing trajectory later. The pen data may include time information, first pressure information, first location information, first color information, and identification information of a medium 2000.

Figure 29:
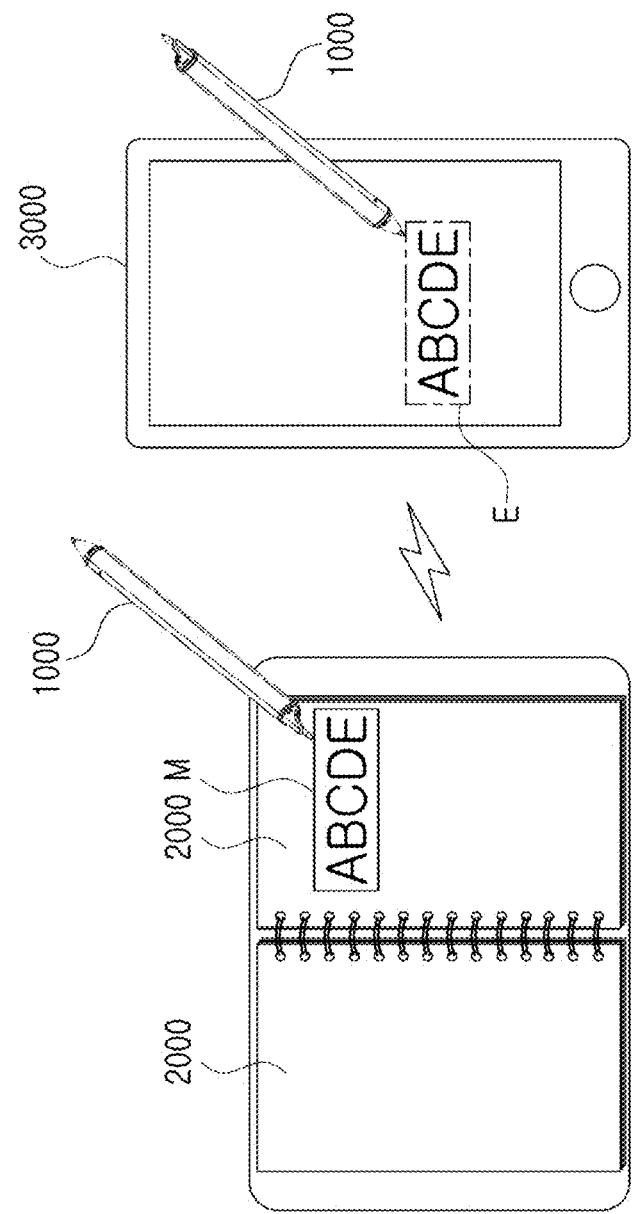
FIG. 29 shows diagrams for describing a memo area according to embodiments of the present invention.

FIG. 29 shows diagrams for describing a memo area according to embodiments of the present invention.

Referring to FIG. 29, an electronic pen 1000 may generate memo area identification information based on a handwritten image acquired through a first pen module 100. An electronic device 3000 may acquire the memo area identification information from the electronic pen 1000. Here, the electronic device 3000 may determine a memo area M based on the memo area identification information generated by the electronic pen 1000.

The memo area M is an area of at least a part of the handwritten image and is an area generated by processing a user's writing trajectory acquired by the electronic pen 1000 so as to have a special purpose. Here, the memo area M may be stored in a memory module 3400 in the form of at least one of text data, stroke data, and image data. Here, when the memo area M is at least one of text data and stroke data, the electronic device 3000 may perform an additional operation. For example, the electronic device 3000 may change an angle of the memo area M by using a text data of the memo area M.

In addition, according to FIG. 29, the electronic pen 1000 may determine a location at which the memo area M is displayed on the electronic device, through a second pen module 200.

More specifically, the electronic pen 1000 may transmit pen data including the memo area identification information to a communication module 3300 of the electronic device through a communication unit 500, and a location at which the memo area M is displayed may be determined based on at least one of a first electric field, a second electric field, and second pressure information.

Figure 30:
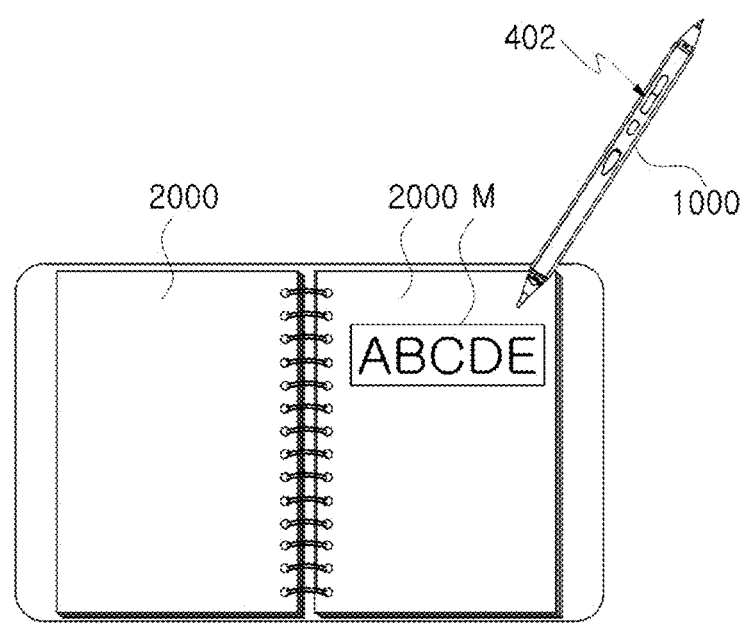
FIGS. 30 to 32 are diagrams for describing embodiments in which memo area identification information is determined according to embodiments of the present invention.
Figure 31:
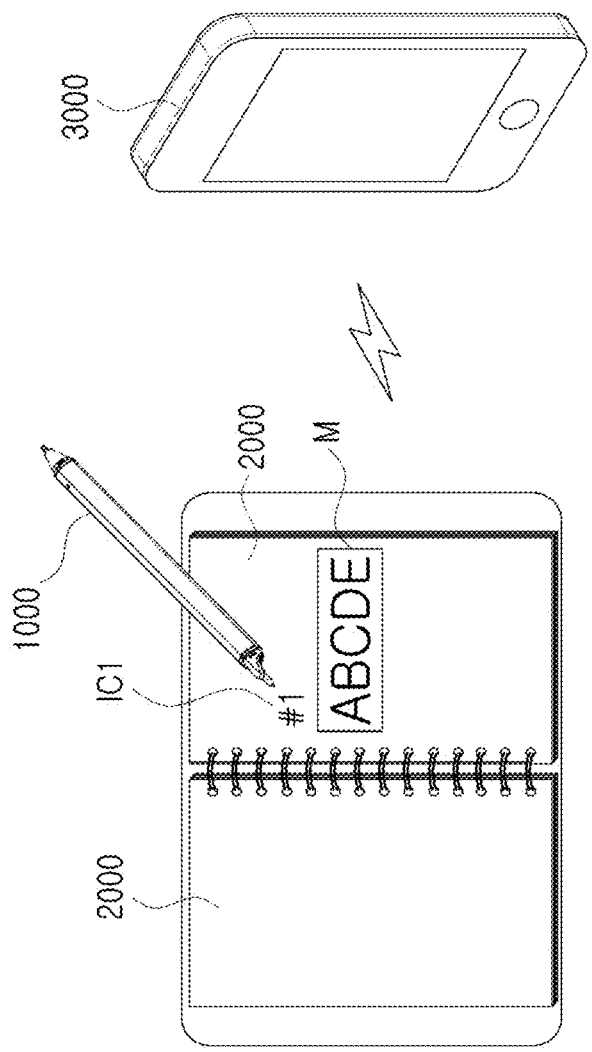
Figure 32:
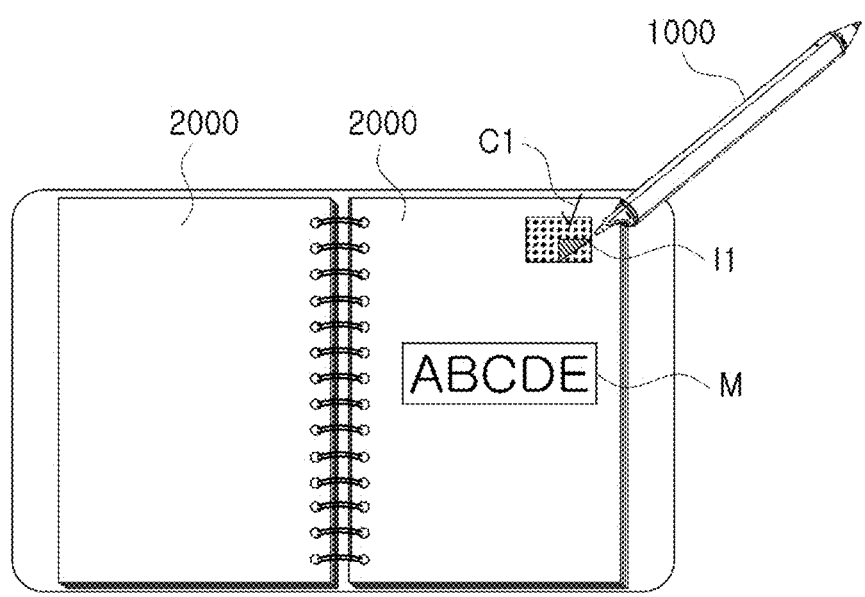

FIGS. 30 to 32 are diagrams for describing embodiments in which memo area identification information is generated according to embodiments of the present invention.

Referring to FIGS. 30 to 32, a memo area M may be determined based on memo area identification information acquired from a first module 100. More specifically, the memo area identification information may be generated based on at least one of a handwritten image acquired through a pattern sensing unit 120 and an input to an input unit 400 of an electronic pen 1000.

Here, the handwritten image may be a user's writing trajectory. Here, the input to the electronic pen 1000 may be various. For example, the memo area M may be determined based on at least one of an input to a function button 420, pressure value acquisition through a first pressure sensor 410, and pressure value acquisition through a second pressure sensor 420.

The memo area identification information may be generated by a user input.

Referring to FIG. 30, the memo area identification information may include an input signal to the input unit 400 of the electronic pen 1000 and information on a handwritten image acquired through a pattern sensing unit 120.

Here, the input unit 400 may be the function button 402. More specifically, a control unit 800 may generate the memo area identification information based on a handwritten image acquired in a state in which an input through the function button 402 is provided to the electronic pen 1000.

Here, when the memo area identification information is received, an electronic device 3000 may determine an area of a part of a handwritten image included in pen data as the memo area M based on the memo area identification information. In this case, even when the electronic pen 1000 is not in a state of being in communication with the electronic device 3000, the electronic pen 1000 may store pen data to which the memo area identification information is added.

The memo area identification information may be generated based on various inputs to the input unit 400. Here, the electronic device 3000 may determine the memo area M based on the various inputs to the input unit 400.

According to one embodiment of the present invention, the electronic device 3000 may determine an area, which is surrounded by a handwritten image acquired in a first state in which the input through the function button 402 is provided to the electronic pen 1000, as the memo area M.

More specifically, the electronic device 3000 may acquire the memo area identification information including coordinate information of a first handwritten image in a state in which the input through the function button 402 is provided to the electronic pen 1000. Here, the electronic device 3000 may determine a second handwritten image located in an inner area with respect to the coordinate information of the first handwritten image as a first pen memo area M. Here, the second handwritten image may be included in the pen data.

According to another embodiment of the present invention, the electronic device 3000 may determine the handwritten image, which is acquired in the first state in which the input through the function button 402 is provided to the electronic pen 1000, as the memo area M.

Here, the first state refers to a case in which, when the handwritten image acquired through the electronic pen 1000 is input from a first time point t1 to a second time point t2 and the input to the function button 402 is input from a third time point t3 to a fourth time point t4, the third time point t3 is substantially the same as the first time point t1 or is earlier than the first time point t1 and the fourth time point t4 is substantially the same as the second time point t2 or is later than the second time point t2.

According to still another embodiment of the present invention, the electronic device 3000 may determine a handwritten image, which acquired in a second state that is a state after the input through the function button 402 is provided to the electronic pen 1000, as the memo area M.

Here, the second state refers to a state in which when the handwritten image acquired through the electronic pen 1000 is input from a fifth time point t5 to a sixth time point t6 and the input to the function button 402 is input from a seventh time point t7 to an eighth time point t8, the fifth time point t5 is substantially the same as the eighth time point t8 or is later than the eighth time point t8 by a preset time th1. Here, the preset time th1 may be variously set.

According to yet another embodiment of the present invention, the electronic device 3000 may acquire handwriting information from which first pressure information is acquired. When coordinate information is not acquired, the electronic device 3000 may determine a handwritten image, which is acquired from a ninth time point t9 to a tenth time point t10 through the electronic pen 1000, as the memo area M. Here, a length from the ninth time point t9 to the tenth time point t10 may be variously set.

The memo area identification information may be generated by a user input.

Referring to FIGS. 31 and 32, memo area identification information may include information on a handwritten image.

The electronic pen 1000 may generate the memo area identification information based on a handwritten image acquired through the pattern sensing unit 120. When the handwritten image acquired through the pattern sensing unit 120 includes at least one of a predetermined identification code and unit cell information to which information on an icon I1 of the memo area M is assigned, the electronic pen 1000 may generate the memo area identification information.

Referring to FIG. 31, when a handwritten image acquired through the first pen module 100 includes a preset first identification code IC1, the electronic device 3000 may determine the acquired handwritten image as the memo area M. More specifically, when memo area identification information acquired through the electronic pen 1000 includes the preset first identification code IC1, the electronic device 3000 may determine the memo area M based on at least one of a stroke, a time, and a distance from the preset first identification code IC1. In FIG. 31, a preset first identification code is illustrated in the form of "#1," but the form of a present identification code is not limited thereto and may be provided as various forms.

According to one embodiment of the present invention, when the handwritten image acquired through the first pen module 100 includes the preset first identification code IC1, the electronic device 3000 may determine the memo area M based on at least one of a preset stroke, a preset time, and a distance from the preset first identification code IC1.

When the memo area M is determined based on the preset stroke, after the preset first identification code IC1 is made, the electronic device 3000 may determine a handwritten image input to a medium 2000 as the memo area M based on the number of input strokes. Here, based on a user input, the electronic device 3000 may change the number of the strokes used to determine the memo area M.

When the memo area M is determined based on the preset stroke, after the preset first identification code IC1 is made, the electronic device 3000 may determine the handwritten image input to the medium 2000 as the memo area M based on the number of the strokes input for a unit time. Here, the unit time may be preset to various values. Here, the number of the strokes input for the unit time may be preset to various values.

When the memo area M is determined based on the preset time, after the preset first identification code IC1 is made, the electronic device 3000 may determine a handwritten image input to the medium 2000 for a predetermined unit time as the memo area M. Here, the unit time may be preset to various values. Here, the electronic device 3000 may change an area determined as the memo area M by changing the unit time based on a user input.

When the memo area M is determined based on the distance from the first identification code IC1, after the preset first identification code IC1 is made, the electronic device 3000 may determine a handwritten image, which is located within a predetermined unit distance from the preset first identification code IC1 among handwritten images input to the medium 2000, as the memo area M. Here, the electronic device 3000 may change an area determined as the memo area M by changing the unit distance based on a user input.

When the memo area M is determined based on the distance from the first identification code IC1, the electronic device 3000 may determine a handwritten image, which is located within a predetermined unit distance from the preset first identification code IC1 among handwritten images input to the medium 2000 when the preset first identification code IC1 is written, as the memo area M. Here, memo area generation information including the preset first identification code may be generated after pen data including the handwritten image input to the medium 2000 is generated. Here, the electronic device 3000 may change an area determined as the memo area M by changing the unit distance based on a user input.

According to another embodiment of the present invention, when the handwritten image acquired through the first pen module 100 includes the preset first identification code IC1, the electronic device 3000 may determine a corresponding page as the memo area M.

According to FIG. 32, when the handwritten image acquired through the first pen module 100 includes the unit cell information to which the information on the icon I1 of the memo area M is assigned, the electronic device 3000 may determine the acquired handwritten image as the memo area M. Here, the electronic device 3000 may acquire the unit cell information to which the information on the icon I1 is assigned through a first check code C1. In FIG. 32, the first check code C1 is represented by a V-shaped symbol but may be provided in various forms as long as it is possible to acquire the unit cell information to which the information on the icon I1 is assigned.

In order for a specific function to be additionally executed only on a partial area of the medium 2000, icon information refers to identification information assigned only to the corresponding partial area. Here, when a unit cell in which icon information including a specific function is encoded is decoded, the specific function may be executed in at least one of the electronic pen 1000 and the electronic device 3000. Here, when a unit cell to which icon information is assigned is detected through the pattern sensing unit 120, the electronic device 3000 may execute a specific function corresponding to the icon information.

According to one embodiment of the present invention, when handwritten images acquired through the first pen module 100 include the information on the icon I1 including unit cell information having a function of the memo area M as a specific function, the electronic device 3000 may determine an area of the medium 2000, which corresponds to a second written image located in an inner area with respect to coordinate information of a first handwritten image corresponding to memo area identification information among the acquired handwritten images, as the memo area M. Here, the second handwritten image may be included in pen data.

According to another embodiment of the present invention, when the handwritten image acquired through the first pen module 100 includes the unit cell information to which the information on the icon I1 having the function of the memo area M as a specific function is assigned, the electronic device 3000 may determine a corresponding page as the memo area M.

The electronic device 3000 may determine the memo area M based on memo area identification information received from the electronic pen 1000. Here, a communication module 3300 of the electronic device 3000 may receive pen data from a communication unit 500 of the electronic pen 1000. Of course, an input module 3100 of the electronic device 3000 may also receive the pen data through a second pen module 200 of the electronic pen 1000.

The electronic device 3000 may transmit information reflecting the memo area M to a temporary storage space. Here, the temporary storage space is a memory area in the electronic device 3000 so as to be used during a predetermined period. For example, the temporary storage space may be a clipboard. Here, a memory module 3400 may include the temporary storage space.

Here, when a plurality of memo areas M are formed, the electronic device 3000 may transmit information reflecting at least one memo area M to the temporary storage space. In addition, the electronic device 3000 may transmit information reflecting a part of the memo area M to the temporary storage space.

Furthermore, the electronic device 3000 may transmit information reflecting the plurality of memo areas M to the temporary storage space. For example, the electronic device 3000 may transmit information reflecting a first memo area, a second memo area, and a third memo area, which are partial areas included in the memo area M, to the temporary storage space.

Here, the electronic device 3000 may transmit information reflecting all the determined memo areas M to the temporary storage space.

Of course, the electronic device 3000 may transmit information reflecting the memo area M to the temporary storage space based on information acquired through the electronic pen 1000.

FIGS. 33 to 36 are diagrams for describing embodiments in which information reflecting a memo area is transmitted to a temporary storage space according to embodiments of the present invention.

According to FIGS. 33 to 36, a memo area M stored in a memory module 3400 of an electronic device 3000 may be moved to the temporary storage space by receiving a clipboard signal.

The clipboard signal is a signal that causes the electronic device 3000 to move at least a part of the memo area M to the temporary storage space. More specifically, the clipboard signal is a signal for transmitting information reflecting the memo area M to the temporary storage space. Here, the clipboard signal may be generated based on an input to an electronic pen 1000.

The input to the electronic pen 1000 may be various. For example, the information reflecting the memo area M may be transmitted to the temporary storage space using an input to an input unit 400, recognition of a code pattern printed on a medium 2000, or the like.

Figure 33:
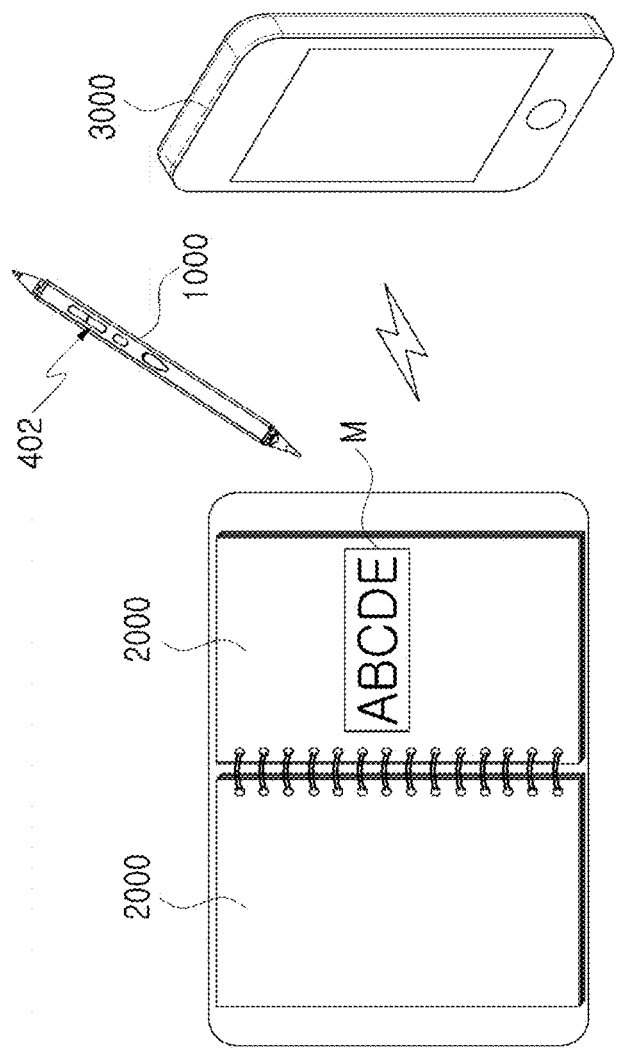
FIGS. 33 to 36 are diagrams for describing embodiments in which information reflecting a memo area is transmitted to a temporary storage space according to embodiments of the present invention.

Referring to FIG. 33, when an input is provided to the input unit 400, the electronic pen 1000 may generate a clipboard signal. Here, the clipboard signal may be included in pen data and transmitted to the electronic device 3000 through a communication unit 500 of the electronic pen 1000.

According to one embodiment of the present invention, the input unit 400 may be a function button 402. Here, when an input through the function button 402 is provided to the electronic pen 1000, a control module 3500 may determine an area of a part of the memo area M as the memo area M that is to be moved to the temporary storage space.

According to another embodiment of the present invention, when handwriting information from which first pressure information is acquired is acquired and coordinate information is not acquired, the electronic device 3000 may determine an area of a part of the memo area M, which is acquired for a preset time after the first pressure formulation is acquired, as the memo area M that is to be moved to the temporary storage space.

When the clipboard signal is received, the electronic device 3000 may move the information reflecting the memo area M to the temporary storage space.

Here, when the pen data including the clipboard signal is received, the electronic device 3000 may determine an area of a part of the memo area M as the memo area M that is to be moved to the temporary storage space.

According to one embodiment of the present invention, when the clipboard signal is received, the electronic device 3000 may move an area most recently determined as the memo area M to the temporary storage space.

According to another embodiment of the present invention, when the clipboard signal is received, the electronic device 3000 may move an area, which has been least recently determined as the memo area M, of the memory area M not moved to the temporary storage space to the temporary storage space.

Figure 34:
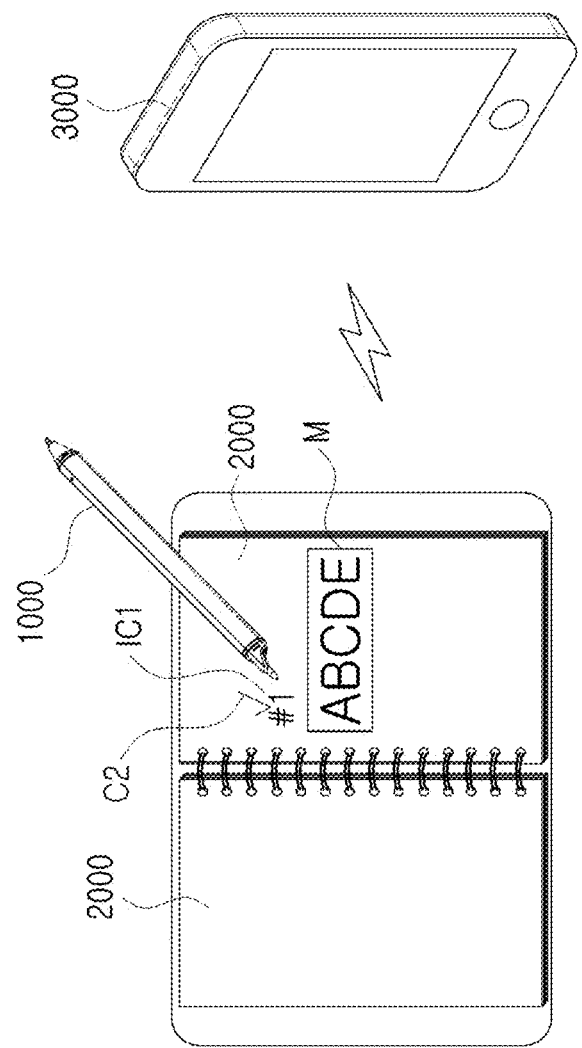

According to FIG. 34, when a handwritten image acquired through a first pen module 100 includes unit cell information in which a preset first identification code IC1 is located, the electronic device 3000 may transmit the information reflecting the memo area M to the temporary storage space.

As described above, when the acquired handwritten image includes the preset first identification code IC1, the electronic device 3000 may determine the acquired handwritten image as the memo area M.

The electronic device 3000 may acquire the unit cell information in which the first identification code IC1 is located through a second check code C2. Here, the electronic device 3000 may transmit an area determined as the memo area M based on the acquired unit cell information to the temporary storage space. Here, when coordinate information of the medium 2000 in which the preset first identification code IC1 is reflected is recognized again, the electronic device 3000 may transmit an area determined as the memo area M based on the first identification code IC1 to the temporary storage space.

Figure 35:
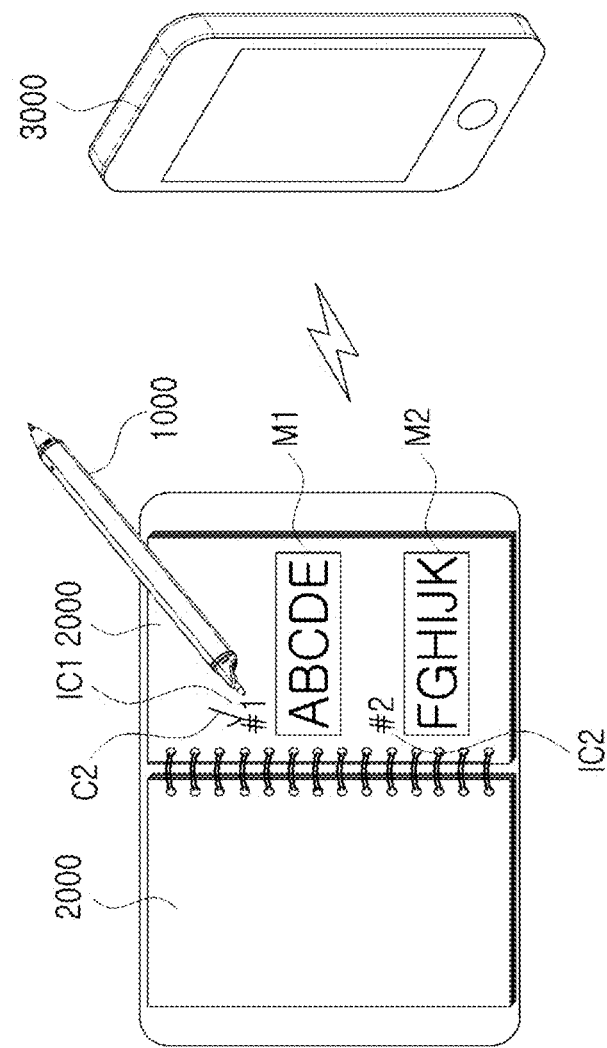

Referring to FIG. 35, when the electronic device 3000 determines a plurality of memo areas M, the electronic device 3000 may transmit information reflecting the memo area M, from which unit cell information in which an identification code is located is acquired through a check code among the plurality of memo areas M, to the temporary storage space. For example, the electronic device 3000 may determine that a handwritten image includes a first memo area M1 and a second memo area M2. Here, when the coordinate information of the medium 2000, in which the preset first identification code IC1 is reflected, is recognized again, the electronic device 3000 may transmit an area determined as the memo area M based on the first identification code IC1 to the temporary storage space. In this case, since coordinate information of the medium 2000 in which a second identification code IC2 is reflected is not recognized, an area determined as the memo area M based on the second identification code IC2 is not transmitted to the temporary storage space.

According to FIG. 36, when a handwritten image acquired through the first pen module 100 includes unit cell information to which information on an icon I1 of the memo area M is assigned, the electronic device 3000 may transmit information reflecting the memo area M to the temporary storage space.

As described above, when the handwritten image acquired through the first pen module 100 through a first check code C1 includes the unit cell information to which the information on the icon I1 of the memo area M is assigned, the electronic device 3000 may determine the acquired handwritten image as the memo area M.

The electronic device 3000 may acquire the unit cell information to which the information on the icon I1 of the memo area M is assigned through a third check code C3. Here, when the information on the icon I1 of the memo area M is acquired again, the electronic device 3000 may transmit the information reflecting the memo area M to the temporary storage space.

A method in which the electronic device 3000 transmits at least a part of the memo area M to the temporary storage space through an external input has been described above.

However, a method of transmitting the memo area M to the temporary storage space is not limited to that using the clipboard signal, and when an area of at least a part of a handwritten image is determined as the memo area M, the electronic device 3000 may directly transmit information reflecting the determined memo area M to the temporary storage space.

Figure 37:
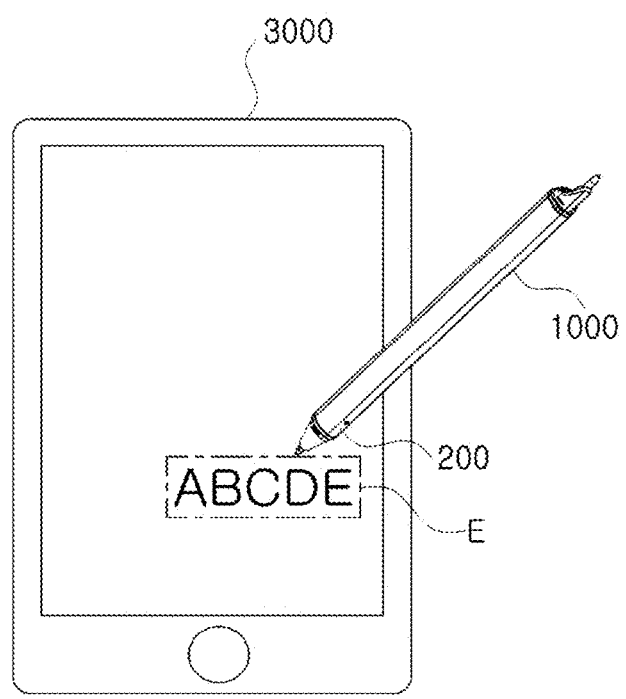
FIG. 37 is a diagram for describing a method of determining a location at which a memo area is inserted according to embodiments of the present invention.

FIG. 37 is a diagram for describing a method of determining a location at which a memo area is displayed according to embodiments of the present invention.

Referring to FIG. 37, a location at which a memo area M is displayed may be determined based on an electronic pen 1000. More specifically, an electronic device 3000 may determine the location at which the memo area M is displayed based on at least one of a first electric field, a second electric field, and second pressure information.

According to one embodiment of the present invention, the electronic device 3000 may determine the location at which the memo area M is displayed based on the first electric field received from a second pen module 200. More specifically, information reflecting the memo area M may be transmitted to the electronic device 3000 through a communication unit 500 of an electronic pen 1000, but the location at which the memo area M is displayed may be determined as a first electric field cross area for receiving the first electric field generated by the second pen module 200.

According to another embodiment of the present invention, the electronic device 3000 may determine the location at which the memo area M is displayed in further consideration of the second electric field received from the second pen module. More specifically, the location at which the memo area M is displayed may be determined based on at least one of the first electric field cross area for receiving the first electric field generated by the second pen module 200 and a second electric field cross area for receiving the second electric field.

According to still another embodiment of the present invention, the electronic device 3000 may determine the location at which the memo area M is displayed based on second pressure information. More specifically, the location at which the memo area M is displayed may be determined based on at least one of the electric field cross area and the second electric field cross area which are acquired by the electronic device 3000 within a predetermined period from a time point at which the second pressure information generated by the second pen module 200 is acquired. Here, the predetermined time interval may be variously set.

Here, a location at which the memo area M is displayed on the electronic device 3000 through the electronic pen 1000 may be variously set.

For example, a center of the displayed memo area M may be formed in the first electric field cross area of the electronic pen 1000. For another example, at least one of vertices of the displayed memo area M may be formed in the first electric field cross area of the electronic pen 1000. For example, an upper left end of the displayed memo area M may be formed in the first electric field cross area of the electronic pen 1000.

In addition, in FIG. 31, one memo area M is illustrated as being generated based on one preset first identification code IC1, but a plurality of memo areas M are generated based on one preset identification code. Here, the electronic device 3000 may determine the memo area M based on a signal received from the second pen module 200. Here, the electronic device 3000 may select the displayed memo area M from among the plurality of memo areas M based on the signal received from the second pen module 200.

The electronic device 3000 may display an image E reflecting the memo area based on the operation of the second pen module 200.

The image E reflecting the memo area is an image that is output through the output module 3200 of the electronic device 3000 based on information reflecting the memo area by the electronic device 3000.

The image E reflecting the memo area is not limited to image data and may include at least one of text data and stroke data.

FIG. 38 shows diagrams for describing a form in which an image reflecting a memo area is displayed based on a distance between an electronic pen and an electronic device according to embodiments of the present invention.

According to FIG. 38, an image E reflecting a memo area may be variously changed according to a distance between an electronic pen 1000 and an electronic device 3000.

When a first electrode 220 of the electronic pen 1000 approaches the electronic device 3000 within a first effective distance, the electronic device 3000 may output the image E reflecting the memo area through an output module 3200. That is, when a distance d1 from the first electrode 220 to an input surface of the electronic device 3000 is within the first effective distance, the electronic device 3000 may output the image E reflecting the memo area through the output module 3200.

Here, the first effective distance is a distance to a point to which a first electric field is effectively transmitted from the first electrode 220. The first effective distances may be variously set as long as the electronic device 3000 may determine a movement of the first electrode 220.

When the first electric field is acquired from the first electrode 220, the electronic device 3000 may change at least one of a transparency, a dashed shape of an outline, and a shadow of the image E1 reflecting the first memo area M which is output through the output module. For example, as shown in FIG. 38A, when the distance d1 from the first electrode 220 of the electronic pen 1000 to the input surface of the electronic device 3000 is within the first effective distance, the electronic device 3000 may express the dashed shape of the outline of the image E1 reflecting the first memo area, which is output through the output module, in a shape of a long dashed line-dotted line-dotted line.

When pen data including second pressure information is acquired while the first electric field is acquired from the first electrode 220, the electronic device 3000 may change at least one of a transparency, a dashed shape of an outline, and a shadow of an image E2 reflecting a second memo area M which is output through the output module 3200. For example, as shown in FIG. 38B, when a second pen module 200 of the electronic pen 1000 is brought into contact with the input surface of the electronic device 3000 and the electronic device 3000 acquires the pen data including the second pressure information, the electronic device 3000 may express the dashed shape of the outline of the image E2 reflecting the second memo area, which is output through the output module 3200, as a solid line.

Of course, the shape of the outline of the image E2 reflecting the second memo area may be variously provided, and the outline may not be expressed.

In addition, the transparency of the image E2 reflecting the second memo area output through the output module 3200 may be reduced to be lower than the transparency of the image E1 reflecting the first memo area. For example, when the electronic device 3000 acquires the first electric field from the first electrode 220, the electronic device 3000 may add transparency information when the image E1 reflecting the first memo area which is output through the output module 3200 is generated. Here, the image E1 reflecting the first memo area may become transparent and may be displayed on the output module 3200. In this case, when the pen data including the second pressure information is acquired, the electronic device 3000 may express the image E2 reflecting the second memo area output through the output module 3200 by reducing the transparency of the image E2 reflecting the second memo area so as to be lower than the transparency of the image E1 reflecting the first memo area.

When the pen data including the second pressure information is acquired while a location at which the memo area M is displayed is determined, the electronic device 3000 may determine a location at which the memo area M is displayed on the electronic device 3000. More specifically, the electronic device 3000 may determine a location at which the image E reflecting the memo area is displayed on the output module 3200. In this case, when a location at which the memo area M is displayed is determined, the electronic device 3000 may no longer determine a location at which the image E reflecting the memo area is displayed.

Here, the pen data including the second pressure information may be input from an eleventh time point t11 to a twelfth time point t12. In this case, the electronic device 3000 may no longer determine a location at which the image E reflecting the memo area is displayed at substantially the same time as the twelfth time point t12. Here, an image reflecting a memo area, in which a location thereof displayed on the output module 3200 of the electronic device 3000 is not determined, may be defined as a preview image.

When the electronic device 3000 receives memo area identification information including information on a plurality of memo areas M, an image E reflecting the memo area displayed on the electronic device 3000 may be changed based on a signal acquired from the second pen module 200. More specifically, the electronic device 3000 may determine the image E reflecting the memo area displayed on the output module 3200 of the electronic device 3000 based on a user input using the second pen module 200. For example, the electronic device 3000 may acquire the first electric field from the electronic pen 1000 through an input module 3100 to display the image E reflecting the first memo area through the output module 3200. Here, when the first electrode 220 is located within the first effective distance from the input module 3100, and if the electronic pen 1000 is swiped, the electronic device 3000 may display an image E2 reflecting a second memo area, which is an image other than an image E reflecting a first memo area, through the output module 3200.

Hereinafter, a method of displaying the memo area M of the electronic device 3000 according to the present invention will be described.

Figure 39:
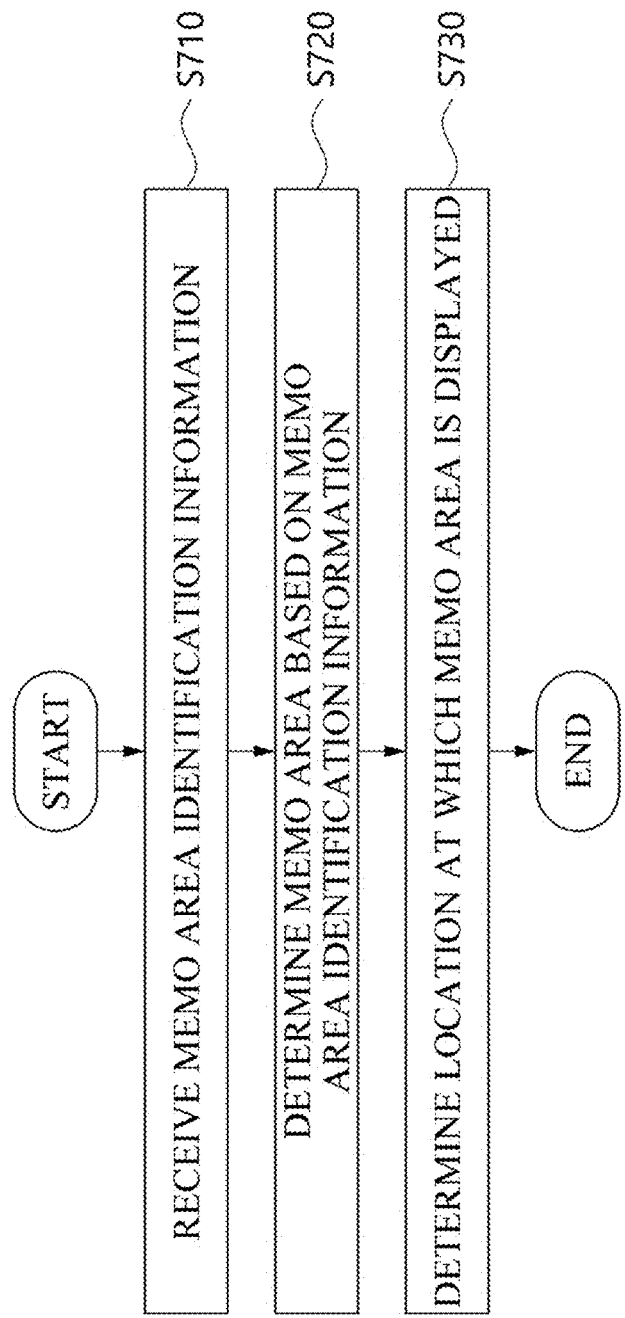
FIG. 39 is a flowchart of a method of inserting a memo area of an electronic device according to an embodiment of the present invention.

FIG. 39 is a flowchart of a method of displaying a memo area M of an electronic device according to an embodiment of the present invention. According to FIG. 39, a method of displaying a memo area M of an electronic device 3000 may include receiving, by a communication module 3300, pen data (S710), determining, by a control module 3500, the memo area based on the pen data (S720), and determining, by the control module 3500, a location, at which the memo area is displayed, based on a signal received from a second pen module (S730).

Here, the method of displaying the memo area M of the electronic device 3000 may further include displaying the location at which the memo area M is displayed. The displaying of the location at which the memo area M is displayed may be variously changed according to a distance between an electronic pen 1000 and the electronic device 3000 as described above. Here, the memo area M may be output from an output module 3200 of the electronic device 3000 through an image E reflecting the memo area.

Here, the method of displaying the memo area M of the electronic device 3000 may further include correcting information included in the memo area M. Here, when the memo area M is recognized as at least one of text data and stroke data, the electronic device 3000 may correct a text or stroke itself with respect to the information included in the memo area M.

Since descriptions corresponding to each operation have been given in detail above, detailed descriptions thereof are omitted here.

Hereinafter, a method of processing color information in an electronic pen 1000 and an electronic device 3000 will be described in detail.

The electronic pen 1000 may be used on a medium 2000 and the electronic device 3000, and for this reason, there may be a case in which the electronic pen 1000 is used on the electronic device 3000 after being used on the medium 2000, a case in which the electronic pen 1000 is used on the medium 2000 after being used on the electronic device 3000, a case in which the electronic pen 1000 is used on the medium 2000 and the electronic device 3000 at the same time, and a case in which the electronic pen 1000 is used on another electronic device 3000 after being used on the electronic device 3000.

In each of the above-described cases, when a user's writing is reproduced on the electronic device 3000 based on first location information or an image is displayed based on second location information, the same color information may be reflected or different pieces of color information may be reflected.

Meanwhile, when a plurality of electronic pens 1000 are used and thus an image is displayed on one electronic device 3000, each electronic pen 1000 has unique color information and thus needs to be distinguished from different electronic pens 1000.

Hereinafter, a method in which color information is used when an image is displayed on the electronic device 3000 will be described in detail with reference to FIGS. 40 to 42.

As described above, when the electronic pen 1000 is alternately used on the medium 2000 and the electronic device 3000 or is alternately used on a plurality of electronic devices 3000, the same or similar color information may be reflected in an image displayed on the electronic devices 3000.

Meanwhile, a method of maintaining a color may be performed in at least one of a control unit 800, a control module 3500, and a server 4000.

Before the method of maintaining the color is performed, when a first pen module 100 is used and when a second pen module 200 is used, color information to be displayed on the electronic device 3000 may be set.

When the method of maintaining the color is performed in the control unit 800, the control unit 800 stores at least one of color information used in the first pen module 100 and color information used in the second pen module 200 in a memory 600.

According to one embodiment of the present invention, the control unit 800 may store first color information and second color information in the memory 600. Alternatively, the control unit 800 may store at least one of the first color information and shared color information in the memory 600. Alternatively, the control unit 800 may use preset preferred color information without storing separate color information in the memory 600. Alternatively, the control unit 800 may use color information acquired from at least one of the electronic device 3000 and the server 4000 without storing separate color information in the memory 600.

When the method of maintaining the color is performed in the control module 3500, the control module 3500 may store first color information in a memory module 3400. Alternatively, the control module 3500 may store at least one of the first color information and shared color information in the memory module 3400. Alternatively, the control module 3500 may use preset preferred color information without storing separate color information in the memory module 3400. Alternatively, the control module 3500 may use color information acquired from at least one of the electronic pen 1000 and the server 4000 without storing separate color information in the memory module 3400.

Hereinafter, descriptions will be given based on a case in which the first color information is set as color information used in the first pen module 100 and the second color information is set as color information used in the second pen module 200, and shared color information or preferred color information may be used instead of the first color information and the second color information.

Hereinafter, a method of maintaining color information according to an order in which the first pen module 100 and the second pen module 200 included in the electronic pen 1000 are used and a subject performing the method of maintaining the color will be described.

Figure 40:
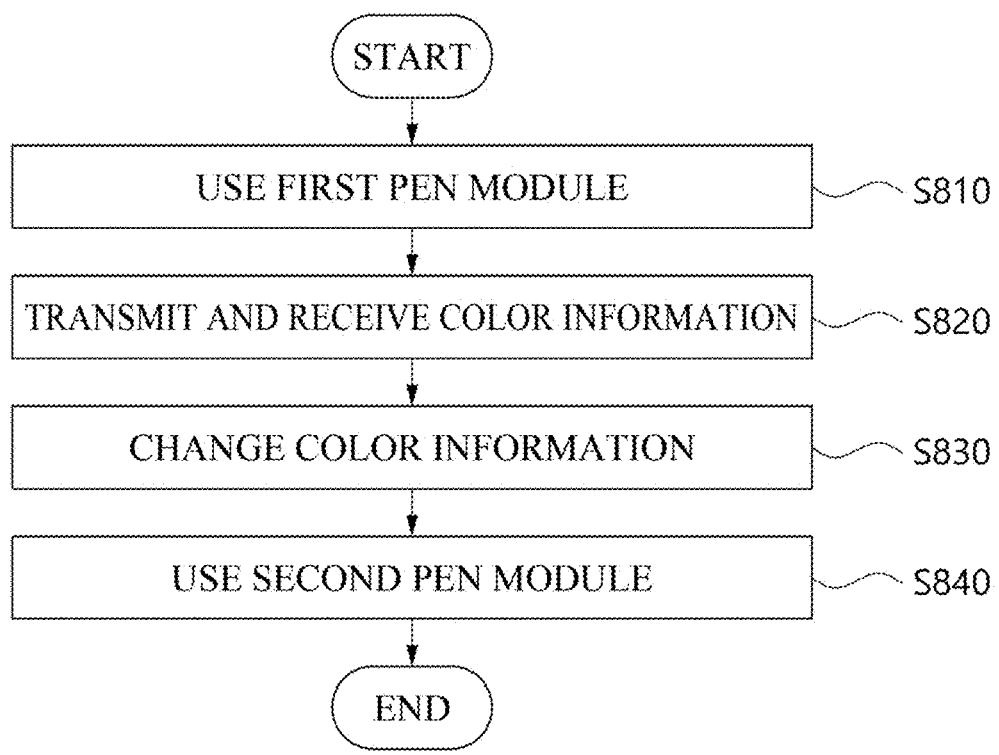
FIGS. 40 and 41 are block diagrams illustrating a method of using color information according to one embodiment of the present invention.

Referring to FIG. 40, when the second pen module 200 is used after the first pen module 100 is used, the method of maintaining the color may include using a first pen module (S810), transmitting and receiving color information (S820), changing the color information (S830), and using a second pen module (S840).

As the first pen module 100 is used in operation S810 of using the first pen module (S810), the control unit 800 may acquire a handwritten image detected by a pattern sensing unit 120 and may transmit the detected handwritten image to the electronic device 3000, and the control module 3400 may acquire the handwritten image from the electronic pen 1000 to display an image on a display of the electronic device 3000.

In this case, the image displayed on the display may be displayed by reflecting color information set for use of the first pen module 100 prior to operation S810 of using the first pen module.

According to one embodiment of the present invention, when the first pen module 100 is used in operation S810 of using the first pen module, an image based on the first color information may be displayed on the electronic device 3000.

In operation S820 of transmitting and receiving the color information, color information set prior to operation S810 of using the first pen module may be transmitted and received between the control unit 800, the control module 3500, and the server 4000.

The color information is transmitted and received, and thus, information for maintaining a color may be shared.

When the method of maintaining the color is performed in the control unit 800, the control unit 800 may transmit color information stored in the memory 600 to at least one of the control module 3500 and the server 4000.

According to one embodiment of the present invention, when the first pen module 100 is used, the control unit 800 may transmit first color information used to reproduce a user's writing to the electronic device 3000, and the control module 3500 may receive the first color information to store the received first color information in the memory module 3400.

When the method of maintaining the color is performed in the control module 3500, the control module 3500 may acquire color information used in the first pen module 100 from the electronic pen 1000. Alternatively, the control module 3500 may transmit color information set prior to operation S810 of using the first pen module to the electronic pen 1000 or the server 4000.

According to one embodiment of the present invention, when the first pen module 100 is used, the control module 3500 may reproduce a user's writing by reflecting first color information set prior to operation S810 of using the first pen module or may reproduce the user's writing by acquiring a handwritten image and the first color information from the electronic pen 1000. In addition, the control module 3500 may transmit the first color information to the electronic pen 1000 while reproducing the user's writing.

In operation S830 of changing the color information, color information which is to be reflected as the second pen module 200 is used may be set or changed based on the color information transmitted and received in operation S820 of transmitting and receiving the color information.

When the method of maintaining the color is performed in the control unit 800, the control unit 800 may set color information used in the second pen module 200, or when preset color information is present, the control unit 800 may change the preset color information.

According to one embodiment of the present invention, the control unit 800 may store color information in a range identical to or similar to that of first color information, which is transmitted in operation S820 of transmitting and receiving the color information, as the second color information used in the second pen module 200. Alternatively, the control unit 800 may transmit the first color information to the electronic device 3000 without separately storing the first color information as the second color information.

When the method of maintaining the color is performed in the control module 3500, the control module 3500 may set color information used in the second pen module 200, or when preset color information is present, the control module 3500 may change the preset color information.

According to one embodiment of the present invention, the control unit 3500 may store the color information in a range identical to or similar to that of the first color information, which is transmitted and received in operation S820 of transmitting and receiving the color information, as the second color information used in the second pen module 200. Alternatively, the control module 3500, without separately storing the first color information as the second color information, may use the first color information instead of the second color information when the second pen module 200, is used later.

In this case, the color information in a range identical to or similar to that of the first color information may have a range that is difficult to distinguish with the naked eye or may include color information which does not have a difference of a predetermined value or more when being changed into a value able to be expressed digitally, such as a red-green-blue (RGB) value, a hue saturation brightness (HSB) value (HSV), a cyan-magenta-yellow-black (CMYK) value, or a Lab value.

When the second pen module 200 is used in operation S840 of using the second pen module, an image reflecting the color information used in operation S810 of using the first pen module may be displayed on the electronic device 3000.

When the method of maintaining the color is performed in the control unit 800, and when the second pen module 200 is used, the control unit 800 may transmit the color information set or changed in operation S830 of changing the color information to the electronic device 3000, and an image may be displayed on the electronic device 3000 based on the transmitted color information.

According to one embodiment of the present invention, the control unit 800 may transmit the second color information, which is set or changed so as to correspond to the first color information in operation S840 of changing the color information, to the electronic device 3000, and the control module 3500 may display an image on the display of the electronic device 3000 based on second location information and the second color information.

When the method of maintaining the color is performed in the control module 3500, and when the second pen module 200 is used, the control module 3500 may display an image on the display of the electronic device 3000 using the color information set or changed in operation S840 of changing the color information.

According to one embodiment of the present invention, the control module 3500 may display an image on the display of the electronic device 3000 based on the second location information and the second color information set or changed so as to correspond to the first color information in operation S840 of changing the color information.

Meanwhile, each of the operations may not be performed in a specific order, and some operations may be omitted. Alternatively, an additional operation may be further performed between the operations.

According to one embodiment of the present invention, operation S820 of transmitting and receiving the color information may first be performed before operation S810 of using the first pen module is performed or may be performed simultaneously with operation S810.

According to another embodiment of the present invention, after operation S810 of using the first pen module and before operation S820 of transmitting and receiving the color information, an operation of setting color information according to a user input or preset gesture execution of the electronic pen 1000 may be additionally performed.

In addition, it is possible to change a subject that performs each operation of performing the method of maintaining the color.

According to one embodiment of the present invention, operation S820 of transmitting and receiving the color information may be performed in the control unit 800, and operation S830 of changing the color information and operation S840 of using the second pen module may be performed in the control module 3500.

According to another embodiment of the present invention, operation S820 of transmitting and receiving the color information and operation S830 of changing the color information may be performed in the control module 3500, and operation S840 of using the second pen module may be performed in the control unit 800.

Figure 41:
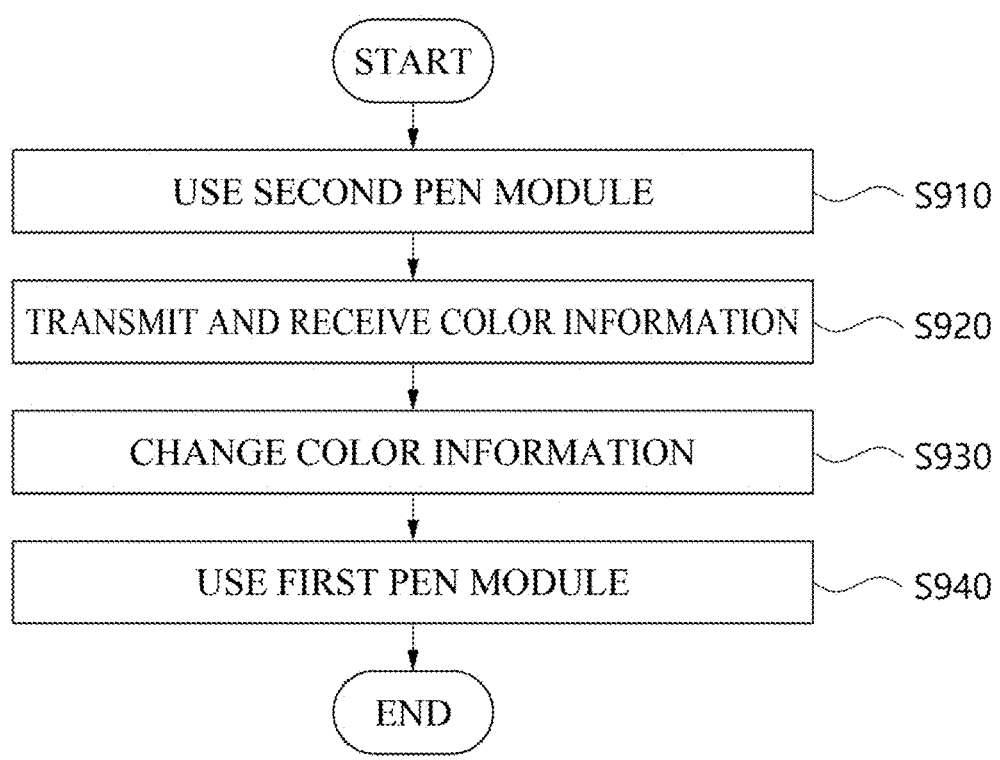

Referring to FIG. 41, when the first pen module 100 is used after the second pen module 200 is used, the method of maintaining the color may include using a second pen module (S910), transmitting and receiving color information (S920), changing the color information (S930), and using a first pen module (S940).

As the second pen module 200 is used in operation S910 of using the second pen module (S910), the control module 3500 may display an image on the electronic device 3000 based on second location information and color information set for use of the second pen module 200. In this case, the displayed image may include an image based on color information set prior to operation S910 of using the second pen module.

According to one embodiment of the present invention, when the second pen module 200 is used in operation S910 of using the second pen module, an image based on second color information may be displayed on the electronic device 3000.

In operation S920 of transmitting and receiving the color information, the color information set prior to operation S910 of using the second pen module may be transmitted and received between the control unit 800, the control module 3500, and the server 4000. Therefore, information for maintaining a color may be shared.

In operation S920 of transmitting and receiving the color information, the control unit 800 may acquire color information from at least one of the control module 3500 and the server 4000, and the control module 3500 may transmit color information used in the second pen module 200 to at least one of the electronic pen 1000 and the server 4000.

According to one embodiment of the present invention, when the second pen module 200 is used, the control module 3500 may transmit the second color information which is used to reproduce a user's writing to the electronic pen 1000, and the control unit 800 may receive the second color information to store the received second color information in the memory 600.

According to one embodiment of the present invention, when the second pen module 200 is used, the control module 3500 may reproduce a user's writing by reflecting the second color information set prior to operation S910 of using the second pen module. In addition, the control module 3500 may transmit the second color information to the electronic pen 1000 while reproducing the user's writing.

In operation S930 of changing the color information, color information to be reflected as the first pen module 100 is used may be set or changed based on the color information transmitted and received in operation S920 of transmitting and receiving the color information.

When the method of maintaining the color is performed in the control unit 800, the control unit 800 may set color information used in the first pen module 100, or when preset color information is present, the control unit 800 may change the preset color information.

According to one embodiment of the present invention, the control unit 800 may store color information in a range identical to or similar to that of the second color information, which is acquired in operation S920 of transmitting and receiving the color information, as first color information used in the first pen module 100. Alternatively, the control unit 800 may transmit the second color information to the electronic device 3000 without separately storing the second color information as the first color information.

When the method of maintaining the color is performed in the control module 3500, the control module 3500 may set color information used in the first pen module 100, or when preset color information is present, the control module 3500 may change the preset color information.

According to one embodiment of the present invention, the control module 3500 may store the color information in a range identical to or similar to that of the second color information, which is transmitted and received in operation S920 of transmitting and receiving the color information, as the first color information used in the first pen module 100. Alternatively, the control module 3500, without separately storing the second color information as the first color information, may use the second color information instead of the first color information when the first pen module 100 is used later.

In this case, the color information in a range identical to or similar to that of the second color information may have a range that is difficult to distinguish with the naked eye or may include color information which does not have a difference of a predetermined value or more when being changed into a value able to be expressed digitally, such as an RGB value, an HSV value, a CMYK value, or a Lab value.

When the first pen module 100 is used in operation S940 of using the first pen module, a user's writing may be reproduced in the electronic device 3000 by reflecting color information used in operation S910 of using the second pen module.

When the method of maintaining the color is performed in the control unit 800, and when the first pen module 100 is used, the control unit 800 may transmit the color information which is set or changed in operation S930 of changing the color information to the electronic device 3000, and the control module 3500 may display an image on the electronic device 3000 based on the transmitted color information.

According to one embodiment of the present invention, the control unit 800 may transmit the first color information, which is set or changed so as to correspond to the second color information in operation S930 of changing the color information, to the electronic device 3000, and the control module 3500 may reproduce a user's writing on the display of the electronic device 3000 based on a handwritten image and the first color information.

When the method of maintaining the color is performed in the control module 3500, and when the second pen module 200 is used, the control module 3500 may display an image on the display of the electronic device 3000 using the color information set or changed in operation S840 of changing the color information.

According to one embodiment of the present invention, the control module 3500 may reproduce a user's writing on the display of the electronic device 3000 based on a handwritten image and the first color information set or changed so as to correspond to the second color information in operation S930 of changing the color information.

Meanwhile, each of the operations may not be performed in a specific order, and some operations may be omitted. Alternatively, an additional operation may be further performed between the operations.

According to one embodiment of the present invention, operation S920 of transmitting and receiving the color information may first be performed before operation S910 of using the second pen module is performed or may be performed simultaneously with the operation S910 of using the second pen module.

According to another embodiment, after operation S910 of using the second pen module and before operation S920 of transmitting and receiving the color information, an operation of setting color information according to a user input or preset gesture execution of the electronic pen 1000 may be additionally performed.

In addition, it is possible to change a subject that performs each operation of performing the method of maintaining the color.

According to one embodiment of the present invention, operation S920 of transmitting and receiving the color information may be performed in the control unit 800, and operation S930 of changing the color information and operation S940 of using the first pen module are performed in the control module 3500.

According to another embodiment of the present invention, operation S920 of transmitting and receiving the color information and operation S930 of changing the color information may be performed in the control module 3500, and operation S940 of using the first pen module may be performed in the control unit 800.

Meanwhile, the above-described method of maintaining the color may be performed only when a specific condition is satisfied. More specifically, even though the electronic pen 1000 is used on the medium 2000 and the electronic device 3000 according to user's selection, used color information may not be maintained.

According to one embodiment of the present invention, the electronic pen 1000 or the electronic device 3000 may provide a color changing mode and a color maintaining mode, and in the color changing mode, color information may be changed even when the above-described color information is maintainable. On the other hand, in the color maintaining mode, when the above-described color information is maintainable, the color information can be maintained.

The color changing mode and the color maintaining mode may be switched when the electronic pen 1000 performs a preset gesture or when the electronic device 3000 receives a user input.

In this case, the method of maintaining the color may further include confirming whether a mode is the color maintaining mode.

When there are a plurality of users and each user uses the electronic pen 1000 or when one user uses a plurality of electronic pens 1000, the electronic device 3000 may display an image based on unique color information of each electronic pen 1000.

Hereinafter, a case in which an image is displayed on the electronic device 3000 using two electronic pens 1000 will be described as one embodiment of the present invention.

Figure 42:
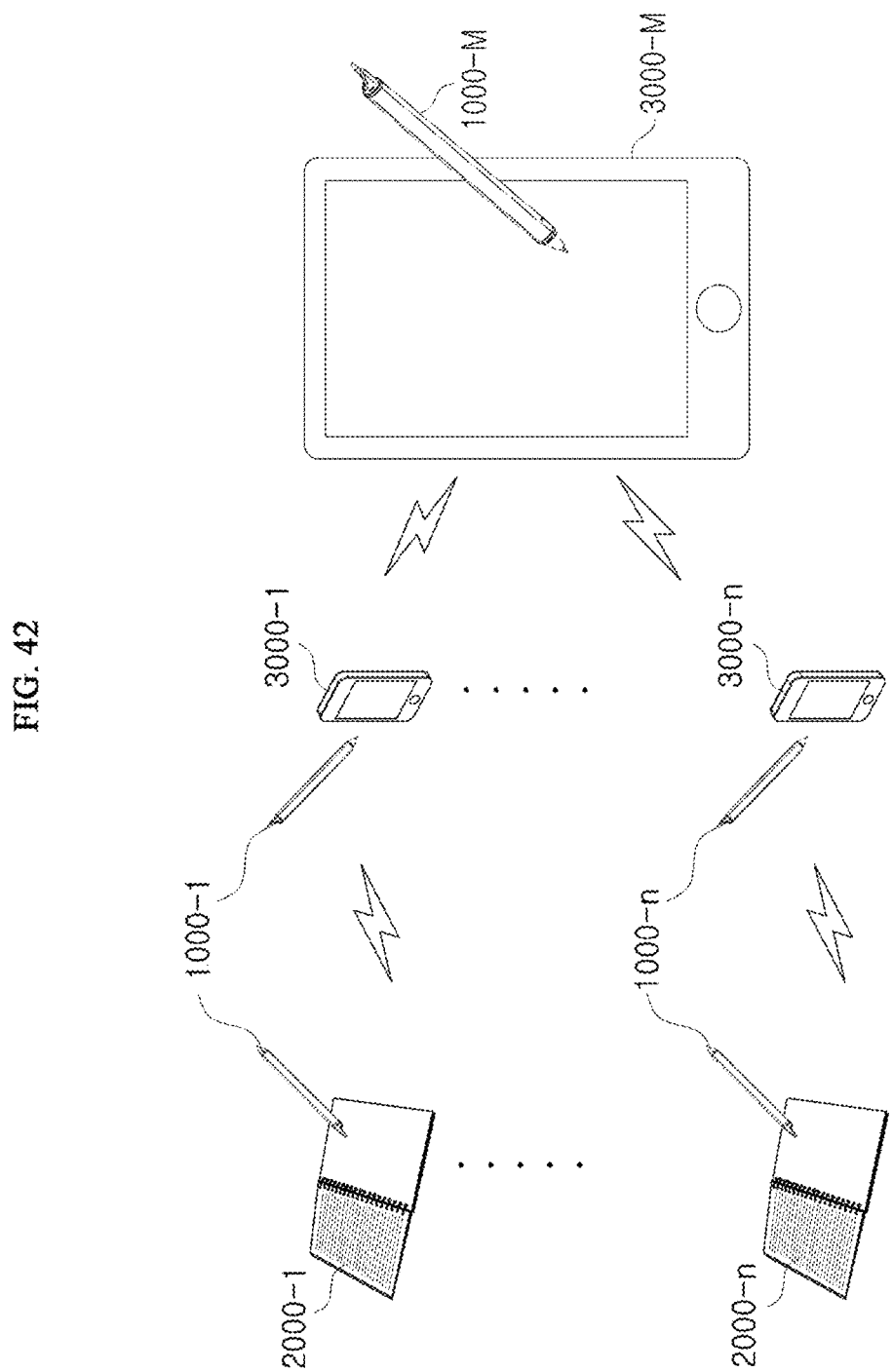
FIG. 42 shows exemplary diagrams illustrating a method of using color information in a plurality of electronic devices according to one embodiment of the present invention.

Referring to FIG. 42, when a first electronic pen 1000-1 is used on a first medium 2000-1 or a first electronic device 3000-1, or when a second electronic pen 1000-2 is used on a second medium 2000-2 or a second electronic device 3000-2, an image may be displayed on at least one of the first electronic device 3000-1, the second electronic device 3000-2, and a master electronic device 3000-M. In this case, a master electronic pen 1000-M may be used on the master electronic device 3000-M.

The first medium 2000-1 and the second medium 2000-2 may refer to a medium 2000 used by one or two users, and the first electronic device 3000-1 and the second electronic device 3000-2 may refer to an electronic device 3000 used by one user or two users.

The master electronic device 3000-M may refer to an electronic device 3000 on which a first image by the first electronic pen 1000-1 and a second image by the second electronic pen 1000-2 are displayed at the same time or different times as the first electronic pen 1000-2 and the second electronic pen 1000-2 are used.

In this case, the first image may include at least one of an image based on a handwritten image acquired using the first electronic pen 1000-1 on the first medium 2000-1 and an image based on location information of the first electronic pen 1000-1 using the first electronic pen 1000-1 on the first electronic device 3000-1, and the second image may include at least one of an image based on a handwritten image acquired using the second electronic pen 1000-2 on the second medium 2000-2 and an image based on location information of the second electronic pen 1000-2 using the second electronic pen 1000-2 on the second electronic device 3000-2.

The master electronic device 3000-M may display an image on a display of the master electronic device 3000-M by acquiring image information from at least one of the first electronic pen 1000-1, the first electronic device 3000-1, the second electronic pen 1000-2, the second electronic device 3000-2, and a server 4000 through wired/wireless communication.

The master electronic device 3000-M may allocate first unique color information to at least one of the first electronic pen 1000-1 and the first electronic device 3000-1. Similarly, the master electronic device 3000-M may allocate second unique color information to at least one of the second electronic pen 1000-2 and the second electronic device 3000-2.

The master electronic pen 1000-M may refer to an electronic pen 1000 used in the master electronic device 3000-M.

The master electronic pen 1000-M may allocate the first unique color information to at least one of the first electronic pen 1000-1 and the first electronic device 3000-1. Similarly, the master electronic pen 1000-M may allocate the second unique color information to at least one of the second electronic pen 1000-2 and the second electronic device 3000-2. In this case, the master electronic pen 1000-M may directly allocate unique color information or may allocate unique color information through the master electronic device 3000-M.

When the first image and the second image from the first electronic pen 1000-1 and the second electronic pen 1000-2 are displayed on the master electronic device 3000-M, in order for the first image and the second image to be distinguished from each other, unique color information may be reflected. To this end, the first unique color information and the second unique color information may be allocated to the first electronic pen 1000-1 and the second electronic pen 1000-2, respectively.

When the master electronic device 3000-M allocates unique color information based on at least one of a user input and a user input using the master electronic pen 1000-M, the first unique color information may be transmitted to at least one of the first electronic pen 1000-1 and the first electronic device 3000-1, and the second unique color information may be transmitted to at least one of the second electronic pen 1000-2 and the second electronic device 3000-2.

Alternatively, the master electronic device 3000-M may transmit the first unique color information and the second unique color information to the server 4000, and each electronic pen 1000 or electronic device 3000 may use the first unique color information and the second unique color information.

The master electronic device 3000-M may store the first unique color information and the second unique color information in a memory module 3400 of the master electronic device 3000-M while transmitting the unique color information to the plurality of electronic pens 1000. Alternatively, the master electronic device 3000-M may only store the unique color information in the memory module 3400 of the master electronic device 3000-M without transmitting the unique color information to each electronic pen 1000.

The master electronic device 3000-M may allocate the unique color information to the plurality of electronic pens 1000 according to a specific rule.

According to one embodiment of the present invention, when preferred color information from each electronic pen 1000 is acquired, the master electronic device 3000-M may allocate the preferred color information to each electronic pen 1000 as the unique color information.

According to another embodiment, the master electronic device 3000-M may allocate color information most recently used by each electronic pen 1000 to each electronic pen 1000 as the unique color information.

According to still another embodiment, the master electronic device 3000-M may allocate preset unique color information in an order in which pen data is received from each electronic pen 1000.

According to yet another embodiment, the master electronic device 3000-M may allocate preset unique color information based on a subject using each electronic pen 1000 or user setting information of each electronic pen 1000.

After the master electronic device 3000-M allocates the unique color information to each electronic pen 1000, the master electronic device 3000-M may allocate color information different from previously allocated color information as the unique color information again.

According to one embodiment of the present invention, after the master electronic device 3000-M allocates a red color to the first electronic pen 1000-1 as the first unique color information, the master electronic device 3000-M may allocate a blue color to the first electronic pen 1000-1 as the first unique color information again according to a user input or use of the first electronic pen 1000-1.

Meanwhile, as a method of allocating unique color information, a method of setting color information in the electronic pen 1000 described above may be used.

When the unique color information is allocated to the plurality of electronic pens 1000, even when there is color information set in each electronic pen 1000, the unique color information may be reflected in an image displayed on the master electronic device 3000-M.

When each electronic pen 1000 is used, the master electronic device 3000-M may display an image by reflecting the unique color information of each electronic pen 1000.

According to one embodiment of the present invention, when the first electronic pen 1000-1 is used on the first medium 2000-1 and the second electronic pen 1000-2 is used on the second electronic device 3000-2, the master electronic device 3000-M may display the first image reflecting the first unique color information and the second image reflecting the second unique color information on the display.

Each of the plurality of electronic pens 1000 may include a first pen module 100 and a second pen module 200, and a memory 600 may store color information reflected when the first pen module 100 is used and color information reflected when the second pen module 200 is used. In this case, when unique color information is allocated from the master electronic device 3000-M, the unique color information allocated to each of the plurality of electronic pens 1000 may be reflected when the first pen module 100 and the second pen module 200 are used.

According to one embodiment of the present invention, when the first pen module 100 of the first electronic pen 1000-1 is used so that first color information is reflected, and when the second pen module 200 is used so that second color information is reflected, the first unique color information may be allocated to the first electronic pen 1000-1 from the master electronic device 3000-M. In this case, when the first pen module 100 of the first electronic pen 1000-1 is used, the master electronic device 3000-M may reproduce a user's writing based on the first unique color information, and even when the second pen module 200 of the first electronic pen 1000-1 is used, the master electronic device 3000-M may display the first image based on the first unique color information and location information.

Although a case has been described in which an image is displayed on the master electronic device 3000-M, the present invention is not limited thereto, and an image may be displayed on at least one of the first electronic device 3000-1 and the second electronic device 3000-2 in the same manner.

In addition, a case has been described in which two electronic pens 1000 are used, the present invention is not limited thereto, and the same may be applied to a case in which three or more electronic pens 1000 are used.

It will be apparent that those skilled in the art can make various substitutions, modifications and changes thereto without departing from the technical spirit of the present invention. Therefore, it should be understood that the present invention described above is not limited to the aforementioned exemplary embodiments and the accompanying drawings. Furthermore, the embodiments described in this document are not limitative, and all or some of the embodiments may be selectively combined so that they can be modified in various manners. Further, operations in each of the embodiments maybe used separately from or in combination with operations in other embodiments.

[Descriptions of Reference Numerals]

| | |
|---|---|
| 100: first pen module | 120: pattern sensing unit |
| 200: second pen module | 300: main body |
| 400: input unit | 500: communication unit |
| 600: memory | 700: power supply unit |
| 800: control unit | 900: output unit |
| 1000: electronic pen | 2000: medium |
| 3000: electronic device | 4000: server |

100: first pen module
110: first pen core
111: first pen tip
112: first pen rod
120: pattern sensing unit
121: camera module
122: lighting module
123: camera bracket
200: second pen module
210: second pen core
220: first electrode
230: second electrode
240: second pen head

[Descriptions of Reference Numerals]
-continued

241: first pen joint
242: second pen joint
243: second pen holder
244: second pen holder spring
245: first pen joint fixing screw
246: second pen joint fixing screw
327: ground plate
328: conductive plate
300: main body
303: first pen core accommodating part
304: light transmitting member
305: USB port
306: first coupling ring
307: second coupling ring
308: USB cover
310: cap
320: body pipe
330: housing
331: first pen holder
341: first substrate
342: second substrate
343: substrate fixing screw
344: first connector
350: USB terminal
351: USB cover
352: USB bracket
353: USB bracket fixing screw
354: first pin
355: second pin
400: input unit
401: power button
402: function button
410: first pressure sensor
420: second pressure sensor
500: communication unit
600: memory
700: power supply unit
710: battery
800: control unit
900: output unit
901: first display
902: second display
910: haptic unit
1000: electronic pen
1100: memo information
2000: medium
3000: electronic device
3100: input module
3200: output module
3300: communication module
3400: memory module
3500: control module
4000: server

The invention claimed is:

1. An electronic pen comprising:
a first pen module including a first pen core and a pattern sensing unit,
wherein the first pen core contains a material used for writing which is used for a medium, and
wherein the pattern sensing unit is configured to obtain a handwritten image in order for the electronic pen to obtain first location information,
wherein the handwritten image is an image made by a user with the first pen core, and
wherein the first location information is defined as a location of the electronic pen with respect to the medium;
a second pen module including a second pen core,
wherein the second pen core is configured to generate at least one of a magnetic field and an electric field in order for an electronic device to obtain second location information, and wherein the second location information is defined as a location of the electronic pen with respect to the electronic device;
a main body which has a cavity,
wherein the first pen module is disposed at a first end of the main body and the second pen module is fixed to at least one of the first end and a second end which is an opposite end of the main body,
wherein the first end includes a first pen core accommodating part and a light transmitting unit, and
wherein the first pen core is supported by being inserted into the first pen core accommodating part so that a part of the first pen core is exposed, and
wherein the pattern sensing unit is positioned and fixed coaxially with the light transmitting unit; and
a control unit which is configured to generate a signal for controlling the first pen module and the second pen module.

2. The electronic pen according to claim 1, wherein the control unit is configured to generate pen data which is used to reproduce the user's writing on the medium based on the handwritten image.

3. The electronic pen according to claim 1, wherein the second pen core includes a first electrode which generates a first electric field having a first effective distance,
wherein the second pen module includes a second electrode that is spaced apart from the first electrode pen core along a central axis of the main body in a direction to the first pen core, wherein the second electrode generates a second electric field having a second effective distance,
wherein the control unit is configured to further generate stylus data which includes angle information, and
wherein the angle information indicates an angle of the electronic pen with respect to the input surface of the electronic device.

4. The electronic pen according to claim 1, further comprising a first pressure sensor and a second pressure sensor, wherein the first pressure sensor is electrically connected to an unexposed end of the first pen core inside the main body to sense a first pressure which is applied to the first pen core,
wherein the second pressure sensor is disposed in the second pen module and electrically connected to the second pen core to sense a second pressure which is applied to the second pen core,
wherein the pen data further includes first pressure information which is information on the first pressure, and
wherein the stylus data includes second pressure information which is information on the second pressure.

5. The electronic pen according to claim 4, further comprising a substrate connected to the pattern sensing unit, wherein the substrate comprises a first substrate and a second substrate,
wherein the first substrate is disposed close to the first end of the main body to which the first pen core is exposed, and
wherein the second substrate is disposed close to the second end of the main body.

6. The electronic pen according to claim 4, further comprising a battery that supplies power to the first pen module and the second pen module.

7. The electronic pen according to claim 6, wherein the control unit includes a first control unit which is configured to control power supply from the battery to the first pen module, and a second control unit which is configured to control power supply from the battery to the second pen module.

8. The electronic pen according to claim 7, wherein the first control unit is disposed on the first substrate and
wherein the second control unit is disposed on the second substrate.

9. The electronic pen according to claim 1, further comprising a cap and at least one magnet sensor, wherein the cap is inserted into at least one of the first end and the second end of the main body and has a predetermined inner space and a magnet to protect at least one of the first pen core and the second pen core, and
wherein at least one magnet sensor is disposed on at least one of the first end and the second end and capable of detecting the magnet.

10. The electronic pen according to claim 4, further comprising a vibration unit which is mounted on the main body and configured to generate vibration when a predetermined condition is satisfied, wherein the predetermined condition is a state in which the pressure is sensed from the first pressure sensor while the writing image is not obtained by the pattern sensing unit.

11. The electronic pen according to claim 1, wherein the first pen core is spaced apart from a center of a longitudinal axis of the main body to an outer surface of the main body and inserted into the main body,
wherein the second pen core is inserted into the second pen module in a direction to a center of the longitudinal axis of the main body, and
wherein a longitudinal axis of the first pen core and a longitudinal axis of the second pen core are spaced apart from each other.

12. The electronic pen according to claim 1, further comprising at least one of a first display and a second display, wherein the first display is disposed on one side of the main body adjacent to the first end and outputs visible light based on information of the first pen module, and
wherein the second display is disposed on the other side of the main body adjacent to the second end and outputs visible light based on information of the second pen module.

13. The electronic pen according to claim 12, wherein the information of the first pen module includes first color information recognized through the first pen module, and
wherein the information of the second pen module includes second color information recognized based on a first electric field transmitted from the second pen module.

14. The electronic pen according to claim 12, wherein the control unit is configured to control at least one of the first display and the second display based on the user's input.

* * * * *